(12) United States Patent
Orlamünder et al.

(10) Patent No.: US 6,409,002 B1
(45) Date of Patent: Jun. 25, 2002

(54) PRESSURE PLATE SUBASSEMBLY

(75) Inventors: Andreas Orlamünder; Achim Link, both of Schweinfurt; Wolfgang Reiber, Sennfeld; Sebastian Vogt, Bad Neustadt, all of (DE)

(73) Assignee: Mannesmann Sachs AG, Schweinfurt (DE)

(*) Notice: Subject to any disclaimer, the term of this patent is extended or adjusted under 35 U.S.C. 154(b) by 0 days.

(21) Appl. No.: 09/602,804

(22) Filed: Jun. 23, 2000

(30) Foreign Application Priority Data

Jun. 23, 1999 (DE) .......................... 199 28 710
May 23, 2000 (DE) .......................... 100 25 533

(51) Int. Cl.$^7$ .......................... F16D 13/56; F16D 13/71
(52) U.S. Cl. .................. 192/70.17; 192/70.19; 192/70.27; 192/89.23; 29/436; 29/439
(58) Field of Search .................. 192/70.12, 70.17, 192/70.18, 70.19, 70.25, 70.27, 70.28, 89.23; 29/434, 436, 446, 469

(56) References Cited

U.S. PATENT DOCUMENTS

| 3,300,007 A | * | 1/1967 | Motsch .................... 192/70.17 |
| 3,450,241 A | * | 6/1969 | Kuno ...................... 192/70.18 |
| 3,785,466 A | | 1/1974 | Murai et al. ............... 192/89 B |
| 4,081,064 A | * | 3/1978 | Smith et al. .............. 192/70.13 |
| 4,667,793 A | | 5/1987 | Kunz et al. ............... 192/70.12 |
| 5,010,992 A | | 4/1991 | Maurer .................... 192/70.27 |
| 5,641,047 A | * | 6/1997 | Dequesnes et al. ......... 192/70.18 |
| 5,715,920 A | * | 2/1998 | Lindner et al. ............ 192/70.25 |

FOREIGN PATENT DOCUMENTS

| DE | 195 45 972 | 6/1997 | .......... F16D/13/60 |
| EP | 0 797 016 A2 | 9/1997 | .......... F16D/13/56 |
| GB | 1327774 | 8/1973 | .......... F16D/13/44 |
| GB | 2075618 | 11/1981 | .......... F16D/13/70 |
| GB | 2 287 994 | 10/1995 | .......... F16D/13/75 |
| JP | 58-146721 A | * 9/1983 | ............ 192/70.27 |
| JP | 07-310755 | 11/1995 | .......... F16D/13/52 |
| WO | 97/28383 | 8/1997 | .......... F16D/13/71 |

* cited by examiner

Primary Examiner—Richard M. Lorence
(74) Attorney, Agent, or Firm—Cohen, Pontani, Lieberman & Payne

(57) ABSTRACT

A pressure plate subassembly for a friction clutch includes a housing connectable to an abutment arrangement for joint rotation about an axis of rotation, a pressure plate arranged in the housing so that the pressure plate is rotatable together with the housing about the axis of rotation (A) and so that the pressure plate is displaceable relative to the housing in the direction of the axis of rotation, and a force accumulator for generating a pressure force, the force accumulator being supported on the housing and on the pressure plate. The force accumulator is arranged outside the housing.

24 Claims, 37 Drawing Sheets

PRESSURE PLATE SUBASSEMBLY

BACKGROUND OF THE INVENTION

1. Field of the Invention

The present invention relates to a pressure plate subassembly for a multidisk friction clutch including a housing which is connectable or connected to an abutment arrangement for joint rotation about an axis of rotation, a pressure plate arranged in the housing so that the pressure plate is rotatable together with the housing and axially displaceable relative to the housing relative to the axis of rotation, and a force accumulator for generating a pressure force, the force accumulator being supported or supportable on the housing and on the pressure plate.

2. Description of the Related Art

German reference DE 195 45 972 A1 discloses a multidisk friction clutch in which a plurality of clutch disks are designed in the form of lamellae connected to a common hub part. A pressure plate capable of being loaded by a force accumulator is provided in the clutch housing. Furthermore, a plurality of intermediate disks are connected fixedly in terms of rotation to the clutch housing, these intermediate disks in each case engaging between two lamellae of the clutch disks. The intermediate disks and the lamellae are capable of being pressed against one another by the force accumulator to generate mutual frictional bearing contact. The force accumulator is designed in the form of a diaphragm spring and lies within the housing essentially parallel to a housing bottom such that the diaphragm spring may be supported on the housing and on the pressure plate to generates the necessary pressure force on the pressure plate to effect the frictional bearing contact.

In friction clutches of this type, there is a problem that the supply of cooling air into the interior of the clutch is limited, with the result that overheating of the clutch may occur, at least when the clutch is operated for a relatively long time with slip.

Furthermore, in this known friction clutch, there is the problem that sufficient construction space for the pivoting movement of the force accumulator must be provided in the housing itself to allow the greatest possible lift-off travel.

SUMMARY OF THE INVENTION

The object of the present invention is to provide a pressure plate subassembly for a friction clutch including an improved supply of cooling air to the components of the friction clutch which are heated during operation and a reduction in the overall available construction space.

According to an embodiment of the present invention, the object is achieved by a pressure plate subassembly for a multidisk friction clutch comprising a housing which is connectable or connected to an abutment arrangement for joint rotation about an axis of rotation, a pressure plate operatively arranged in the housing for rotation with the housing about the axis of rotation and for axial displacement relative to the housing in the direction of the axis of rotation, and a force accumulator for generating a pressure force arranged so that it is supported or supportable on the housing and on the pressure plate.

In the clutch according to the present invention, the force accumulator is arranged outside the housing.

The measure of arranging the force accumulator outside the housing of the pressure plate subassembly markedly reduces the overall size of the clutch which is determined essentially by the size of the housing. The maximum lift-off travel of the pressure plate may be defined by stops formed in the housing itself. When the pressure plate butts against these stops, the force accumulator may be further loaded without an enormous increase in force such as, for example, by pedal actuation. Accordingly, the construction space allowing for this further loading of the force accumulator does not have to be provided within the housing. Moreover, arranging the force accumulator outside the housing affords the possibility in a simple way of guiding cooling air, without it being impeded by the force accumulator, through the housing to the pressure plate and to other components arranged in the housing.

The force accumulator may, for example, be arranged on a side of the housing which faces away from the pressure plate.

To simplify the interaction between the force accumulator and the pressure plate, the pressure plate comprises at least one force accumulator support region which passes through an orifice in the housing and on which the force accumulator can act.

It is noted here, that the statement that the force accumulator is supported on the housing and on the pressure plate in corresponding regions does not necessarily mean the direct physical contact of the force accumulator with these components. Rather, support may be effected either directly, that is to say without any components being interposed, or indirectly, that is to say by the inclusion of the force transmission function of various components in the force transmission from the force accumulator to the pressure plate and/or from the force accumulator to the housing.

If the at least one force accumulator support region includes a surface region running obliquely and/or in a contoured manner relative to a radial direction and a circumferential direction, then care is taken to ensure that, in the rotational mode, air is conveyed into the inner regions by this obliquely running surface resembling a turbine blade and then contributes, for example, to cooling the pressure plate.

To reinforce this conveying effect and to ensure that the pressure plate is loaded as uniformly as possible, a plurality of force accumulator support regions succeeding one another in the circumferential direction are arranged on the pressure plate.

When the pressure plate subassembly according to the present invention is used in a friction clutch with a clutch disk provided with friction linings, the friction linings may become abraded during slippage. The abrasion, i.e., wear of the friction linings, causes the pressure plate and the force accumulator become displaced. To avoid changes in the operating characteristics, in particular the force characteristic of the force accumulator, which are induced by displacements of this nature, it is possible to provide a wear-compensation arrangement to automatically compensate for wear which occurs during operation.

The wear-compensation arrangement may comprise a wear-adjustment device arranged in the support path between the force accumulator and the pressure plate and/or in the support path between the force accumulator and the housing. The wear-adjustment device includes at least one wear-adjustment element which can be displaced to compensate for wear. Furthermore, the wear-adjustment device also includes at least one blocking/detection element with a blocking section that is preloaded against the wear-adjustment device and acts on this device to prevent movement of the at least one wear-adjustment element and a detection section which interacts with or is made to interact with a component whose position can be affected in the event of wear to detect the level of wear. In response to wear, the at least one blocking/detection element is moved counter to its preloading into a position in which the at least one wear-adjustment element is released.

To ensure that the automatic wear compensation occurs during the next clutch release operation, a locking element is arranged for locking the blocking/detection element against movement in its preloading direction once the at least one blocking/detection element has been moved into this position. For this purpose, the at least one locking element may comprise a locking slide element, preferably a locking wedge element, which is preloaded to move in a locking direction.

In the pressure plate subassembly according to the present invention, the wear-adjustment device may be arranged between the force accumulator and the at least one support region. The at least one locking element may then also be supported on at least one support region.

To obtain rotational coupling between the pressure plate and the housing, the pressure plate may comprise at least one rotational coupling projection which extends essentially radially outward and which engages displaceably in the direction of the axis of rotation and with a first circumferential direction movement play in a rotational coupling recess formed in the housing. After a relatively long service life, material wear may cause the at least one rotational coupling projection to dig at least slightly into the housing material surrounding the rotational coupling recess. If this occurs, the pressure plate will be fixed by a shoulder region formed on the housing and will not release the friction linings of the clutch disk during the clutch disengagement operation. To avoid this detrimental effect, a return arrangement is provided by for bringing the at least one rotational coupling projection into a position relative to the rotational coupling recess in which there is essentially no mutual bearing contact between the at least one rotational coupling projection and the housing.

The return arrangement may include at least one return projection on the pressure plate which extends essentially radially outward and which engages displaceably in the direction of the axis of rotation and with a second circumferential direction movement play into a return recess formed in the housing. Furthermore, at least one return force generating element is arranged between the at least one return projection and the housing for prestressing the at least one return projection and/or the at least one rotational coupling projection into a preferably essentially central position relative to the circumferential direction, in the return recess or rotational coupling recess. Furthermore, the first circumferential direction movement play is preferably smaller than the second circumferential direction movement play.

To generate a suitable return force irrespective of the direction of relative rotation, at least one spring element supported relative to the housing and to the return projection is arranged in each case on the two circumferential sides of the at least one return projection. The at least one spring element preferably comprises a tube spring element.

The pressure plate subassembly according to the invention is particularly suitable for use in multidisk clutches. For this purpose, there may be provision for arranging in the housing, at an axial distance from the pressure plate, at least one intermediate plate which is axially displaceable relative to the housing and is rotatable together with the latter about the axis of rotation.

So that the rotational coupling of the intermediate plate to the housing may be effected in a simple way, the at least one intermediate plate may have at least one rotational coupling projection which extends essentially radially outward and which engages displaceably in the direction of the axis of rotation and with a first circumferential direction movement play into a rotational coupling recess formed in the housing.

The intermediate plate may also have a return arrangement which is the same as the return arrangement used for the pressure plate. In the return arrangement for the intermediate plate, the at least one rotational coupling projection is capable of being brought, relative to the rotational coupling recess, into a position in which there is essentially no mutual bearing contact between the at least one rotational coupling projection and the housing.

The return arrangement for the intermediate plate may include at least one return projection which extends essentially radially outward and which engages in a return recess formed in the housing, the at least one return projection being displaceable in the direction of the axis of rotation and displaceable with a second circumferential direction movement play. At least one return force generating element is arranged between the at least one return projection and the housing for prestressing the at least one return projection and/or the at least one rotational coupling projection into a preferably essentially central position in the return recess or rotation coupling recess relative to the circumferential direction. The first circumferential direction movement play is preferably smaller than the second circumferential direction movement play.

Furthermore, at least one spring element which is preferably a tube spring element may be supported relative to the housing and to the return projection and arranged in each case on the two sides of the at least one return projection which are located in the circumferential direction.

A lifting force generating arrangement may be provided for generating a lifting force that prestresses the pressure plate toward the force accumulator. The lifting force generating arrangement ensures the separation of frictional surfaces bearing against one another when clutch disengagement operations are carried out.

When used in a multidisk clutch, the lifting force generating arrangement is then designed, furthermore, for generating a lifting force prestressing the pressure plate and the at least one intermediate plate axially away from one another.

Furthermore, in this case, the lifting force generating arrangement is designed for generating a force prestressing the at least one intermediate plate axially away from an abutment arrangement connectable or connected to the housing.

In a particularly simple and reliably acting way, the lifting force generating arrangement may include a first lifting spring arrangement arranged between the pressure plate and the at least one intermediate plate and a second lifting spring arrangement acting between the at least one intermediate plate and the abutment arrangement.

The construction space taken up by the pressure plate subassembly according to the present invention may be even further reduced in that the force accumulator comprises a diaphragm spring, this diaphragm spring then being arranged preferably essentially parallel to a bottom region of the bowl-like housing.

In the pressure plate subassembly according to the present invention, the housing may comprise a plurality of passage orifices for receiving of fastening elements, preferably screw bolts or the like, for attaching the pressure plate subassembly to the abutment arrangement.

To ensure that the radial dimension of the force accumulator may be designed essentially independently of the method of fastening the pressure plate subassembly to the abutment arrangement, a clearance may be provided in the force accumulator corresponding to the location of each passage orifice. The clearance on the force accumulator allows a respective fastening element to be introduced through the clearance and into the passage orifice.

Moreover, the force accumulator may be held on the housing by a plurality of holding elements.

In an alternative embodiment, the holding elements for holding the force accumulator onto the housing may be attached to the housing after the housing is attached to the abutment arrangement. This arrangement allows the largest possible force accumulator to be used.

In this embodiment, the holding elements may, for example, comprise holding screws, holding rivets or the like.

The passage orifices for the passage of the fastening elements are preferably arranged in a radially outer region of the housing. Furthermore, the radially outward extent of the force accumulator may be designed to correspond essentially to the radial extent of the housing.

The present invention relates to a friction clutch comprising a pressure plate subassembly according to the present invention connected to an abutment arrangement for joint rotation about an axis of rotation. The abutment arrangement preferably comprises a flywheel mass arrangement.

As already mentioned, this friction clutch is preferably a multidisk clutch.

The present invention relates to a method for assembling a friction clutch, comprising the steps of (a) attaching a pressure plate subassembly to an abutment arrangement, and (b) attaching a force accumulator to a housing of the pressure plate subassembly.

Step (a) may also comprise attaching the housing to the abutment arrangement via a plurality of fastening elements, preferably screw bolts or the like. Furthermore, step (b) may comprise attaching a force accumulator to an outer side of the housing via a plurality of holding elements.

According to an alternative embodiment, the method according to the present invention may comprise the following steps of (a') attaching a force accumulator to an outer side of a housing of a pressure plate subassembly, and (b') attaching the pressure plate subassembly to an abutment arrangement. Step (b') may comprise the attachment of the pressure plate subassembly to the abutment arrangement by guiding a plurality of fastening elements through passage orifices in the housing and through clearances in the force accumulator which correspond to the passage orifices.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

In the drawings, wherein like reference characters denote similar elements throughout the several views.

DETAILED DESCRIPTION OF THE PRESENTLY PREFERRED EMBODIMENTS

Figure 1:
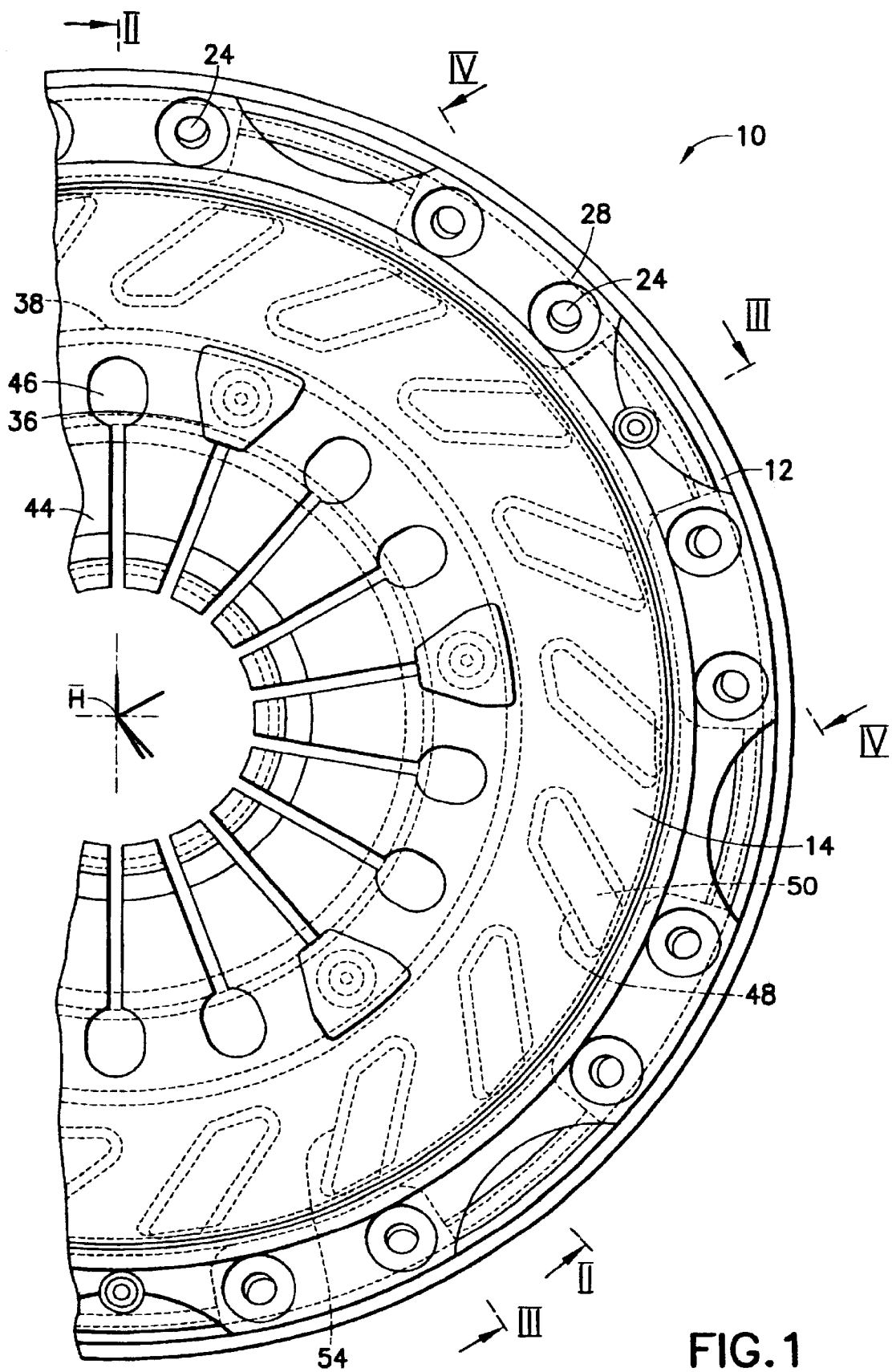
FIG. 1 is a partial axial view of a friction clutch according to the present invention.
Figure 2:
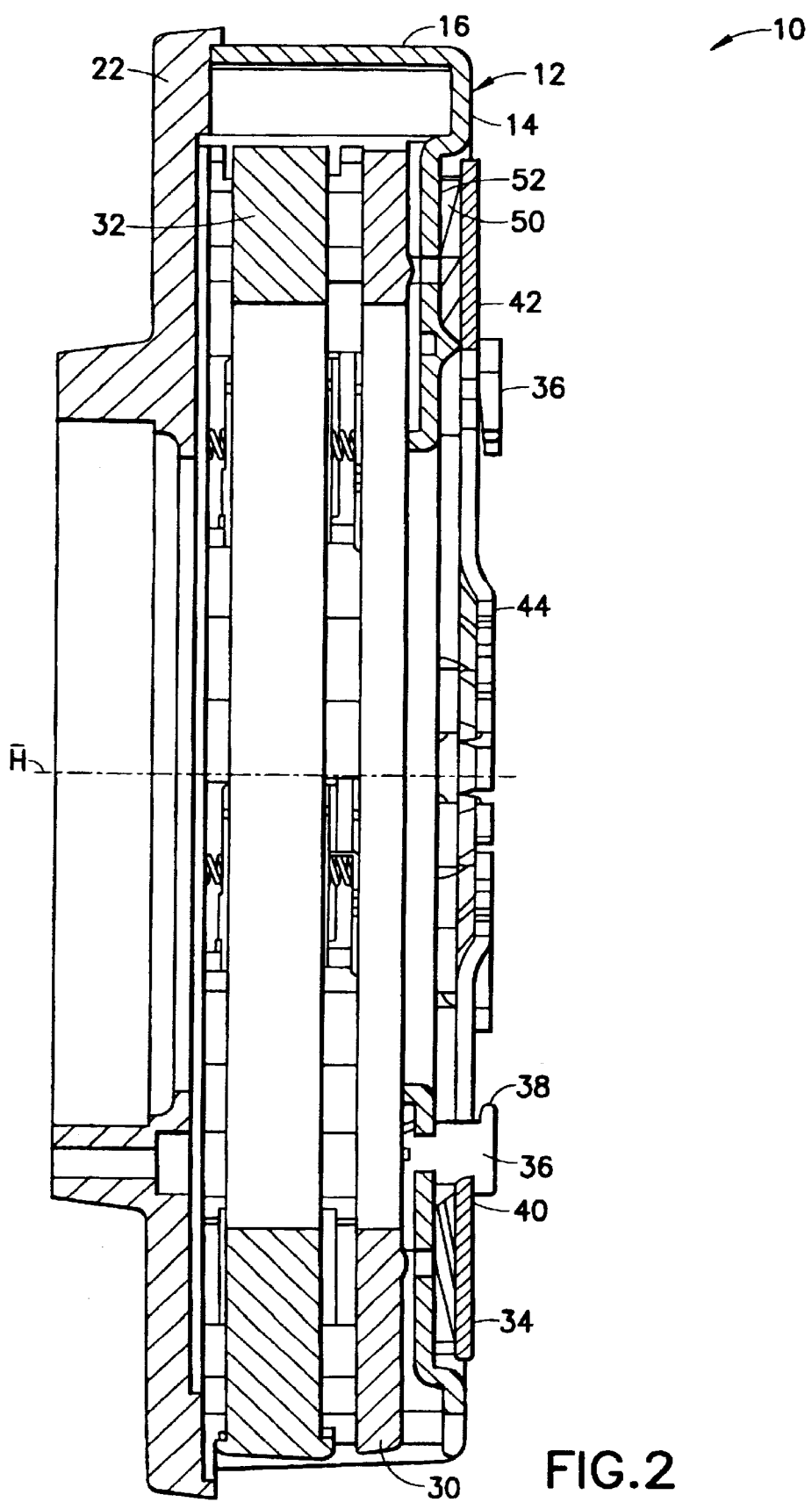
FIG. 2 is a longitudinal sectional view along a line II—II in FIG. 1.
Figure 3:
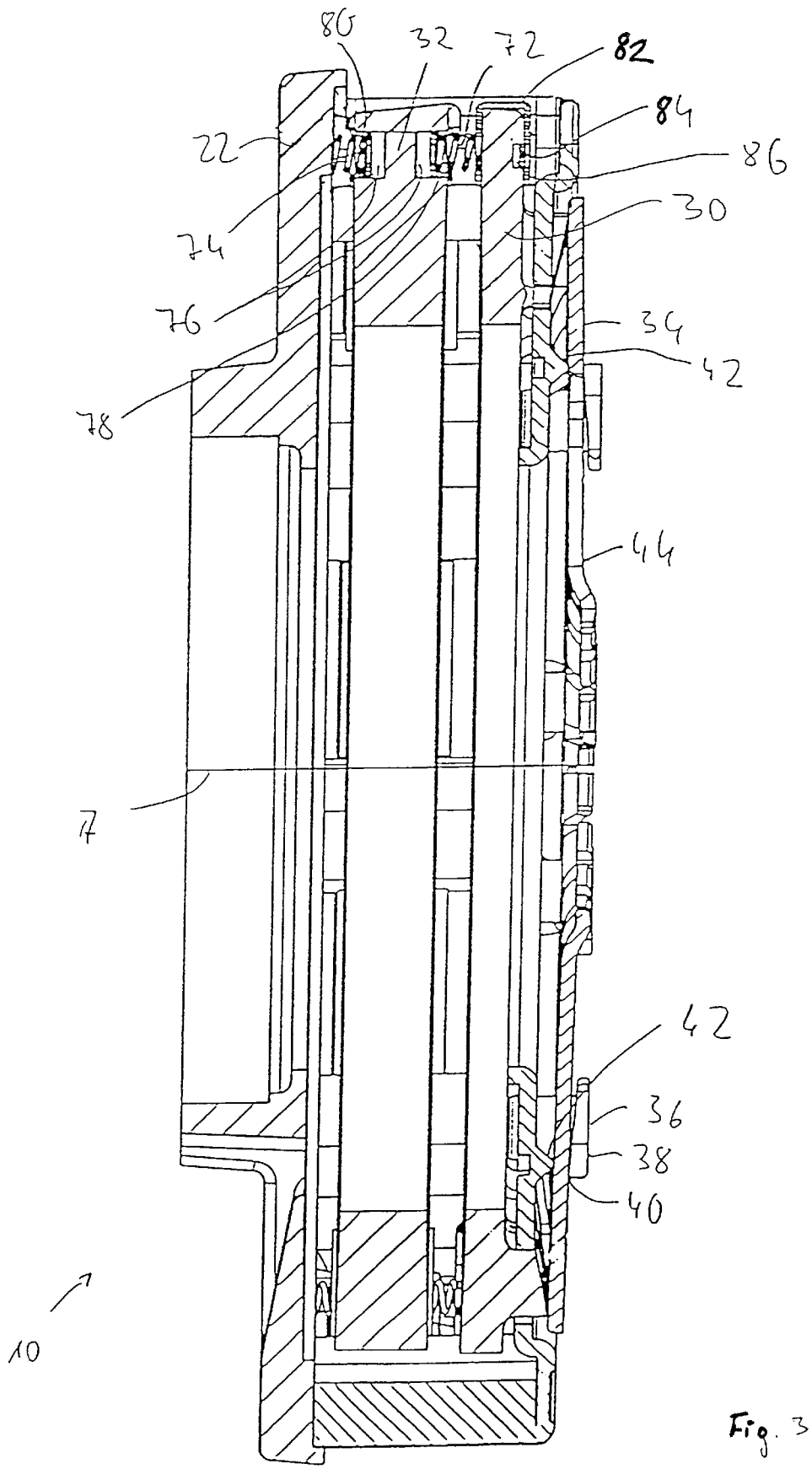
FIG. 3 is a longitudinal sectional view along a line III—III in FIG. 1.

FIGS. 1–6 show a friction clutch 10 according to an embodiment of the present invention. The friction clutch 10 is designed as a multidisk clutch and comprises a clutch housing 12 having an approximately bowl-like design with a bottom region 14 and a wall region 16. The wall region 16 comprises web portions 18 arranged at a circumferential distance from one another along the circumferential direction. A recess 20 is formed between each adjacent pair of web portions. Screws or rivet bolts may be used to firmly connect the housing 12 via the web regions 18 to a flywheel 22 forming an abutment arrangement. For this purpose, the housing 12 has passage orifices 24 in the region of the webs through which the screws or rivet bolts may pass. The screws or rivet bolts may then be secured in threaded orifices or corresponding orifices 26 of the flywheel 22.

The housing 12 is preferably formed from a singular planar sheet metal blank. The recesses 20 may be produced by bending tab portions 28 which laterally adjoin the web portions 18. The tab portions 28 are bent such that they at least partially surround the space through which the screws or rivet bolts pass when the screws or rivet bolts are inserted through the orifices 24. Furthermore, the tab portions 28 may be arranged to counteract a deformation of the housing 12 which is generated, for example, when screws are tightened during fastening of the housing 12 fastened to the flywheel 22.

A pressure plate 30 and an intermediate plate 32 are arranged in the volume region of the housing 12 formed between the bottom region 14 and the flywheel 22. As described below, the pressure plate 30 is loaded by a force accumulator 34 designed as a diaphragm spring such that the pressure plate 30 is pressed toward the flywheel 22. The respective clutch disks or friction lining units of one or more clutch disks lie between the pressure plate 30 and the intermediate plate 32, on the one hand, and between the intermediate plate 32 and the flywheel 22, on the other hand, so that, when the pressure plate 30 is loaded by the force accumulator 34, one clutch disk region is clamped between the pressure plate 30 and the intermediate plate 32 and a further clutch disk region is clamped between the intermediate plate 32 and the flywheel 22.

Figure 5:
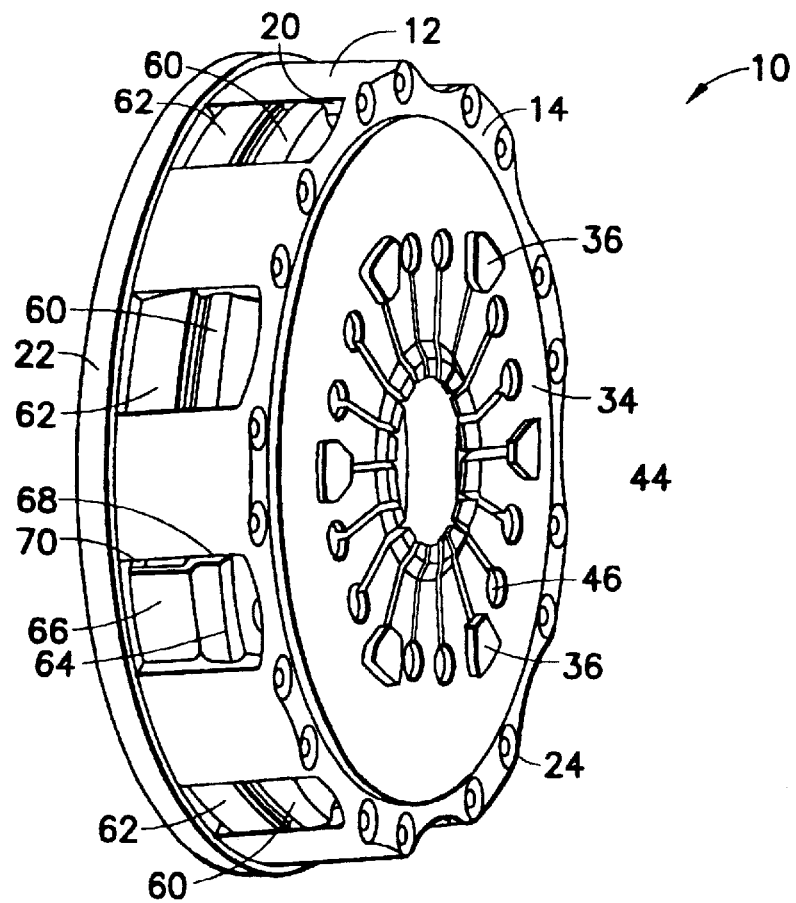
FIG. 5 is a perspective view of the friction clutch according to the embodiment of the present invention shown in FIG. 1.

In this embodiment of the present invention, the diaphragm spring 34 is not arranged within the housing 12, that is to say within the bottom region 14 and the pressure plate 30. Rather, the diaphragm spring 34 is arranged on the side of the bottom region 14 of the housing 12 which faces away from the pressure plate 30—i.e., outside the housing 12. For this purpose, a plurality of spacer bolts 36 distributed in the circumferential direction are secured to the bottom region 14 of the housing 12. The spacer bolts 36 each include a head 38 with a radially outer region of the head 38 having a knife-edge-like bearing region or support region 40 for the diaphragm spring 34. On the other axial side, the diaphragm spring 34 is supported relative to the housing via a knife-edge region 42 which is provided at least in discrete circumferential regions and which lies at approximately the same radial location as the region of the supporting region 40 formed at the spacer bolts 36 and is preferably located directly opposite said supporting region 40. The diaphragm spring 34 is thus carried on the outer side of the bottom region 14 of the housing 12—i.e., the diaphragm spring is supported by force on the housing 12. FIG. 5 shows that the diaphragm spring 34 may comprise a conventional design with a plurality of spring tongues 44. The spacer bolts 36 pass through respective widened orifice regions 46 between the individual spring tongues 44. The spring tongues 44 project radially inward and are capable of being loaded there by a clutch disengagement mechanism (not shown).

Figure 9:
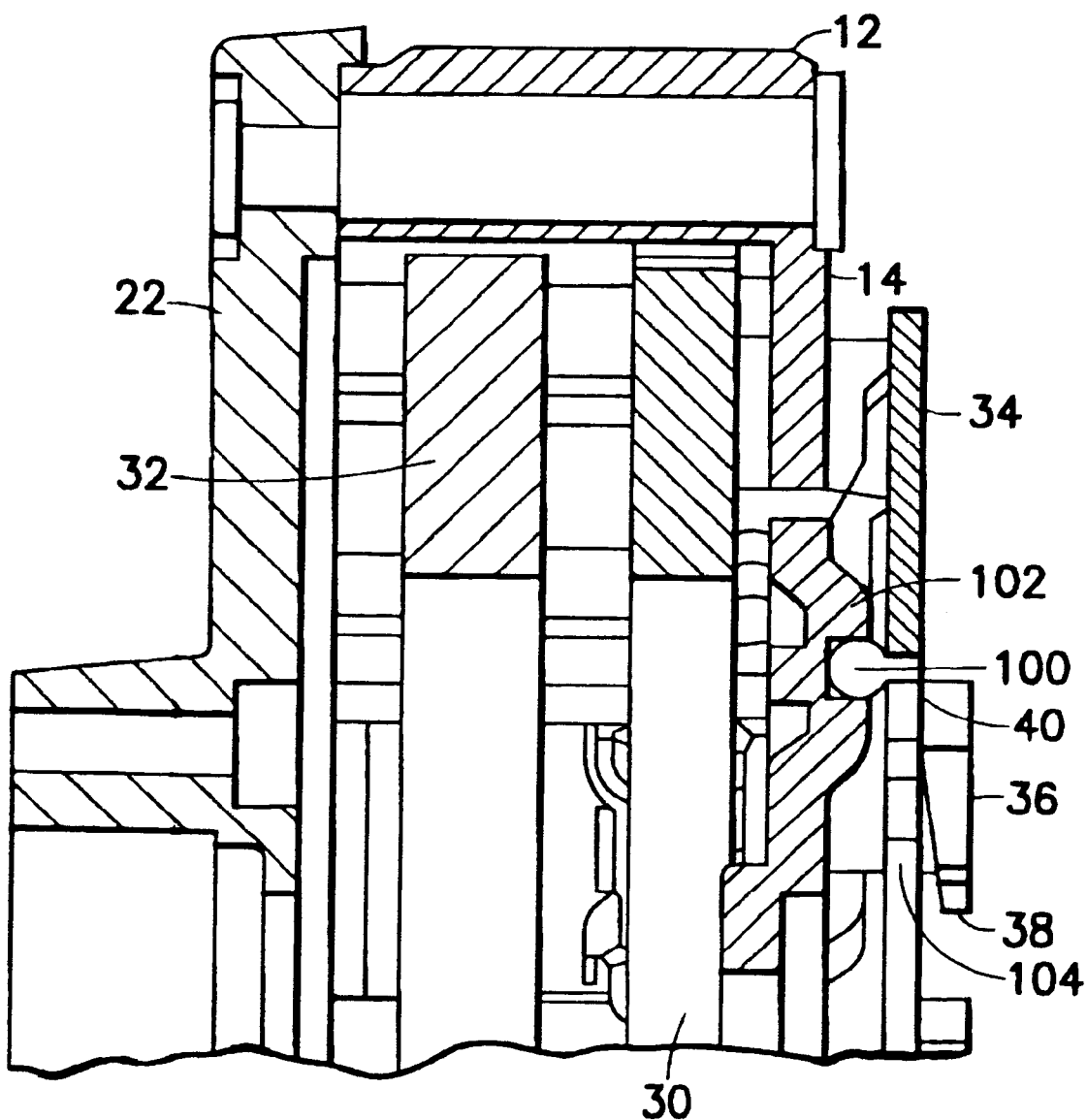
FIG. 9 is a partial sectional view corresponding to the view of FIG. 3, of a further embodiment of the present invention.

A modification of the embodiment of the diaphragm spring support of FIGS. 1–6 is shown in FIG. 9 in which the diaphragm spring 34 is supported relative to the housing 12, that is to say to the housing bottom 14, on the one hand, by the knife-edges 40 formed at the spacer bolts 46 and, on the other hand, via a support ring comprising, for example, a wire ring 100. Furthermore, shaped-out portions 102, 104 are formed at intervals on the radially inner side and the radially outer side of the wire ring 100, for example, by spinning or pressing to ensure the proper radial positioning of the wire ring 100 and thus the centering of the latter.

Referring back to the embodiment of FIGS. 1–6, orifices 48 running obliquely and/or in a contoured manner relative to a radial direction and relative to a circumferential direction are formed in the bottom region 14 of the housing 12. Through these orifices 48 pass in each case correspondingly shaped support projections 50 which are formed on the side of the pressure plate 30 which faces the bottom region 14. These support projections 50 have a projection length in the axial direction which increases from the radial inner side to the radial outer side. The radially outer region of the support projections 50 form respective knife-edge portions 52 on which the radially outer region of the diaphragm spring 34 lies. The diaphragm spring 34 is thus supported on the housing 12 via the spacer bolts 36 or the knife-edge regions 42 and supported on the pressure plate 30 via the knife-edge regions 52 of the support projections 50. The friction clutch 10 shown in FIGS. 1–6 is a push-type clutch in which the radially outer region of the diaphragm spring 34 is moved away from the knife-edge regions 52 by pressing onto the spring tongues 44 in their radially inner region, so that the loading of the pressure plate 30 with force by the diaphragm spring 34 for disengaging the clutch 10 may be at least partially canceled.

Figure 6:
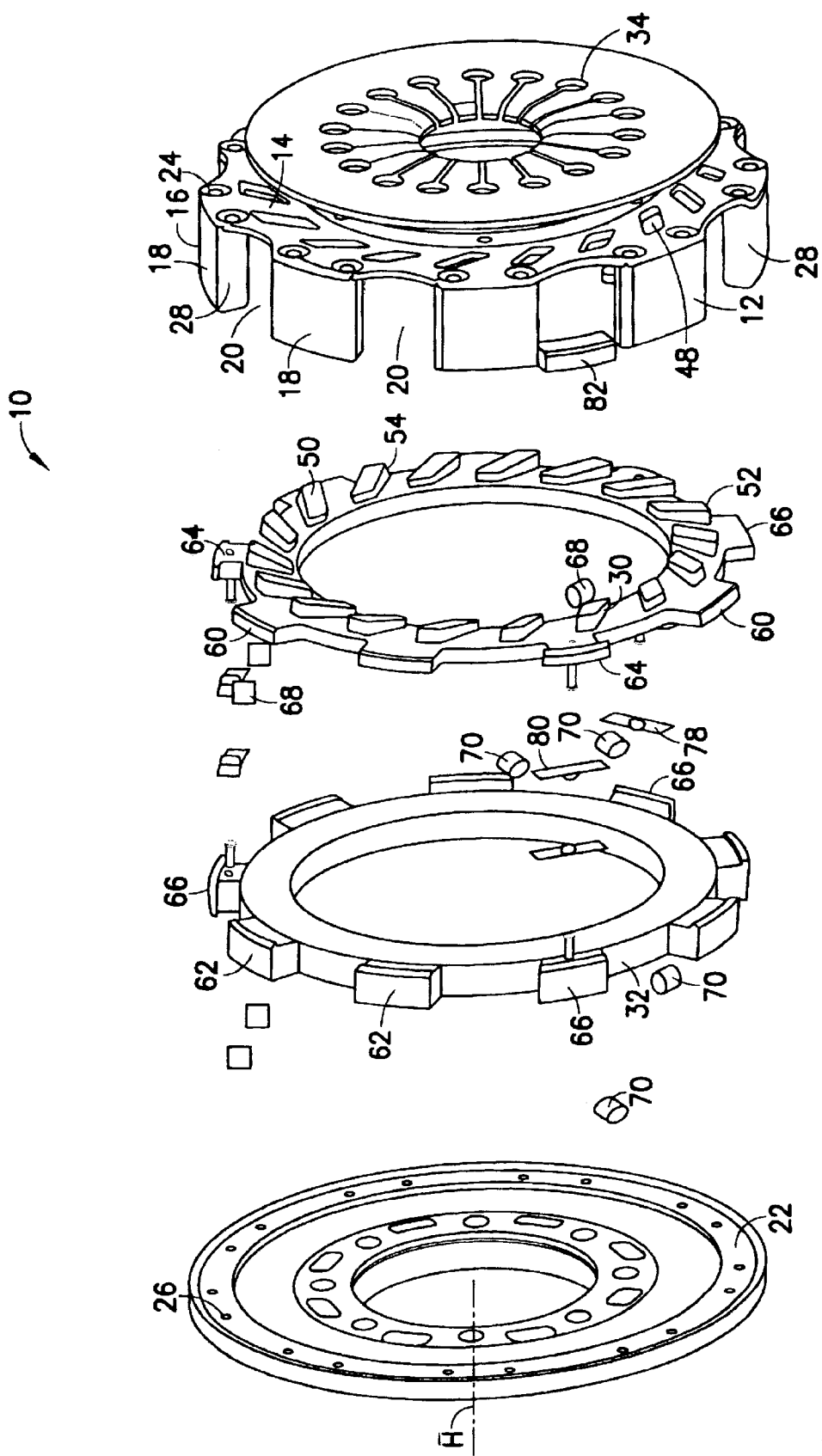
FIG. 6 is an exploded view of the friction clutch according to the embodiment of the present invention shown in FIG. 1.

FIGS. 1 and 6 show that surface regions 54 which are oblique relative to the radial direction and relative to the circumferential direction are formed on the support projections 50 due to the oblique position of the orifices 48 and support projections 50. In the rotational mode, the support projections 50 interact with these surface regions 54 in the manner of turbine blades and during the rotation of the clutch, convey air radially inward from the radially outer region into the interior of the friction clutch 10. The cooling action for the clutch is thus improved. Furthermore, the support projections 50 projecting out of the housing 12 themselves act as cooling ribs. Accordingly, heat may be dissipated outward from the pressure plate 30 which is subjected to very high thermal load. To further assist this action, the support projections 50 and the associated orifices 48 may, in addition to their oblique position, be contoured so that they have a profile which corresponds, for example, to the profile of turbine blades or wings. For example, the support projections may be designed with a decreasing width or thickness in the flow direction and then be curved in the flow direction. Furthermore, depending on the shape of the support projections 50, an action of conveying the cooling air radially from inside radially outward may also be established.

The positioning of the diaphragm spring 34 on the outer side of the housing 12 also has the following advantage. In general, when a clutch disengagement operation is carried out, the aim is, in general, to avoid the situation where, when the pressure plate 30 has reached its maximum disengagement position, the diaphragm spring 34 is also prevented from further movement, since this would become noticeable as an unpleasant increase in force to a vehicle driver who actuates a clutch pedal. In conventional clutches, in which the diaphragm spring is located inside the housing, therefore, sufficient stroke space, that is to say pivoting space, for the diaphragm spring must be provided in the housing. In the embodiment according to the invention of the friction clutch, the provision of sufficient stroke space in the housing is not necessary. A stop for the pressure plate 30 may be formed on the housing 12 and may, for example, comprise the bottom region 14 itself. When the pressure plate 30 butts against this stop, the diaphragm spring 34 may, without being impeded, be pivoted further, without any construction space having to be made available for this purpose within the housing 12.

Figure 4:
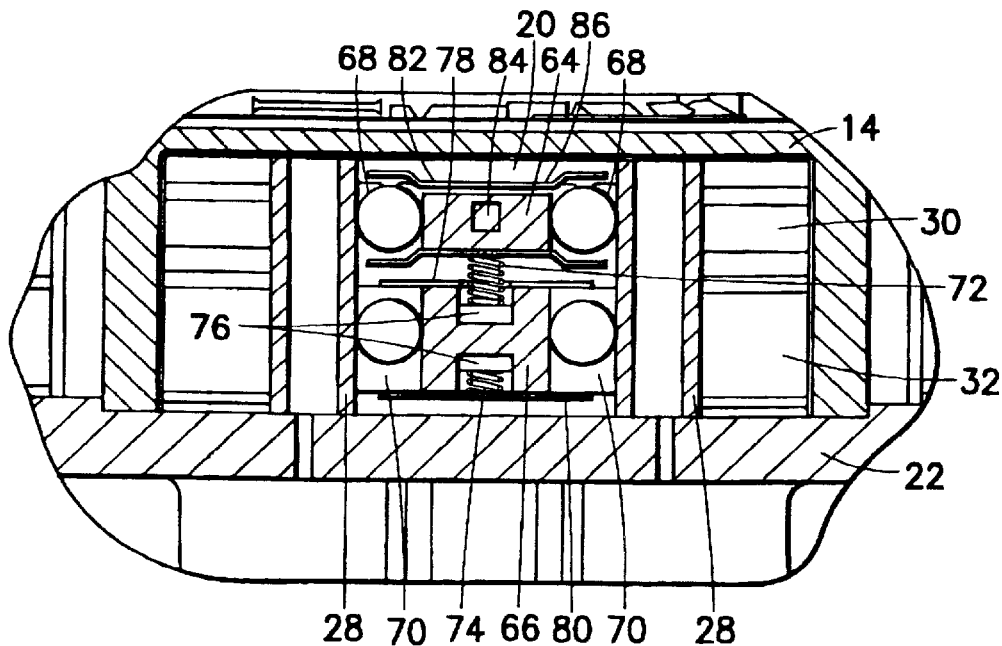
FIG. 4 is a partial longitudinal sectional view along a line IV—IV in FIG. 1.

To ensure that both the pressure plate 30 and the intermediate plate 32 are connected to the housing 12 for joint rotation about the axis of rotation A and axially displaceable relative to housing 12, the pressure plate 30 and the intermediate plate 32 have a plurality of rotational coupling projections 60 and 62 which engage into associated recesses 20 in the circumferential wall region 16 of the housing 12—i.e., between two respective webs 18. The engagement of these clutch parts is such that a slight first circumferential movement play between these rotational coupling projections 60 and 62 and the portions of the housing 12 which delimit the orifices or recesses 20 in the circumferential direction is formed. In addition to the rotational coupling projections 60 and 62, the pressure plate 30 and the intermediate plate 32 respectively have a plurality of return projections 64 and 66 which likewise engage into associated orifices or recesses 20 and are received in these with second circumferential movement play. In contrast to the rotational coupling projections 60 and 62, the return projections 64 and 66 have a T-shaped contour and are designed to be narrower than the rotational coupling projections 60, 62 in the circumferential direction in the region interacting with the housing 12. Since all the orifices or recesses 20 in the housing 16 have the same dimensions for the sake of simpler manufacture, the configuration described above is thus obtained, whereby the second circumferential movement play of the return projections 64, 66 is greater than the first circumferential movement play of the rotational coupling projections 60, 62. A spring element 68 or 70 designed in the form of a tube spring lies in the circumferential direction between each of the return projections 64, 66 and the housing 12. More specifically, the spring elements are arranged on the bent-round tab portions 28 on the housing. These tube springs 68, 70 may be formed, for example, by cutting out, rolling and welding together of a spring plate material. The function of these tube springs 68, 70 is to prestress the return projections 64, 66 into the central circumferential position in the recess 20 as shown in FIG. 4. This position of the return projections 64, 66 also corresponds to a position of the rotational coupling projections 60, 62, in which the latter are held centrally in their associated recesses 20. The rotational coupling projections 60, 62 do not bear against the housing 12 in this position.

During clutch operation, the housing 12 may wear due to the repeated butting or action of the rotational coupling projections 60, 62 on the housing 12 such that the rotational coupling projections 60, 62 dig at least slightly into the housing material and form a material shoulder on the housing. This shoulder may grow large enough to lead to the situation where, during a clutch disengagement operation, because of this material shoulder the pressure plate 30 or the intermediate plate 32 cannot execute the desired disengagement stroke and the clutch therefore cannot be brought into the disengaged state. However, the return projections 64, 66 and therefore also the rotational coupling projections 60, 62 are brought into a central position by the tube springs 68, 70 preferably arranged in the associated recesses 20. Therefore, even when a slight digging of the rotational coupling projections 60, 62 into the material of the housing 12 has taken place, the rotational coupling projections 60, 62 are brought out of engagement with the housing or with the dug-on shoulders formed there when the pressure plate 30 is relieved of stress so that the desired disengagement stroke may be carried out. Since the tube springs 68, 70 are capable both of being deformed as a result of their compression and of executing a rolling movement, the disengagement stroke of the pressure plate 30 and of the intermediate plate 32 is not appreciably impeded by the tube springs 68 and 70. The tube springs 68, 70 are held radially outwardly, counter to the action of centrifugal force, by the T-shaped return projections 64, 66.

FIG. 6 shows that altogether six rotational coupling projections 60 and 62 are distributed on the circumference of the pressure plate 30 and of the intermediate plate 32 respectively so that a return projection 64 and 66 is arranged between two rotational coupling projections 60, 62 combined in pairs. This results in a highly symmetric load during rotational coupling between the pressure plate 30 or intermediate plate 32 and the housing 12. There is likewise a highly symmetric force distribution when the return force is generated.

Furthermore, a lifting force is also generated by respective spring elements, for example helical compression springs. For this purpose, a first set of lifting springs 72 is arranged between the pressure plate 30 and the intermediate plate 32 and a second set of lifting springs 74 is arranged between the intermediate plate 32 and the flywheel 22. Preferably, each of these spring sets has the same number of lifting springs 72 and 74, for example, in each case, at the return projections, and the springs 72 and 74 are designed to be essentially identical to one another. This ensures that, when a clutch disengagement movement is carried out, the intermediate plate 32 is always held centrally between the pressure plate 30 and the flywheel 22. Thus, an identical clutch disengagement stroke takes place for each of the clutch disk regions positioned between the pressure plate 30 and the intermediate plate 32 and between the intermediate plate 30 and the flywheel 22. If clutch disk regions of different dimensions are provided here, this may be achieved by a corresponding change in, for example, the spring lengths of the lifting springs 72 and/or 74 or in the spring constants of these springs.

The lifting springs 72 and 74 of the various spring sets are in each case positioned preferably so as to be assigned to the return projections 64 and 66. FIG. 4 shows that each return projection 66 of the intermediate plate 32 has, on its two axial sides, depressions 76, into which a quill 78 or 80 engages. The lifting springs 72 and 74 are thus held on the return projection 66 against movement both in the circumferential direction and in the radial direction. Furthermore, the quills 78, 80 provide thermal insulation of the springs 72, 74 relative to the intermediate plate 32. In their portions projecting in the circumferential direction beyond the relatively narrow region of the return projections 66, the quills 78 form an axial movement stop for the tube springs 70. This ensures that the tube springs 70, too, are always held in a suitable positioning relative to the return projection 66 and cannot move out of axial overlap with the latter.

In the region of the return projection 64 of the pressure plate 30, a U-shaped holding clamp 82 is provided, which is pushed radially from outside onto a respective return projection 64 of the pressure plate 30 and which snaps by means of a shaped-out catch portion 86 into a catch recess 84 of the return projection 64 and is thereby retained there. Portions of the clamp 82 project in the circumferential direction beyond the respective return projections 64 to provide a function of securing the spring elements 68. The use of the clamp element 82 is preferred in conjunction with the pressure plate 30 because there is no lifting spring on the side of the pressure plate 30 which faces the bottom region 14. The absence of the lifting spring prevents a quill, as used in conjunction with the return projection 64 of the intermediate plate 32, to be held on the pressure plate 30. It should be pointed out that, for example, in the region facing the intermediate plate 32, the clamp 82 could likewise be of quill-shaped design and the lifting spring 72 could be insulated thermally relative to the pressure plate 30 or a separate quill could be used in this region.

Figure 8:
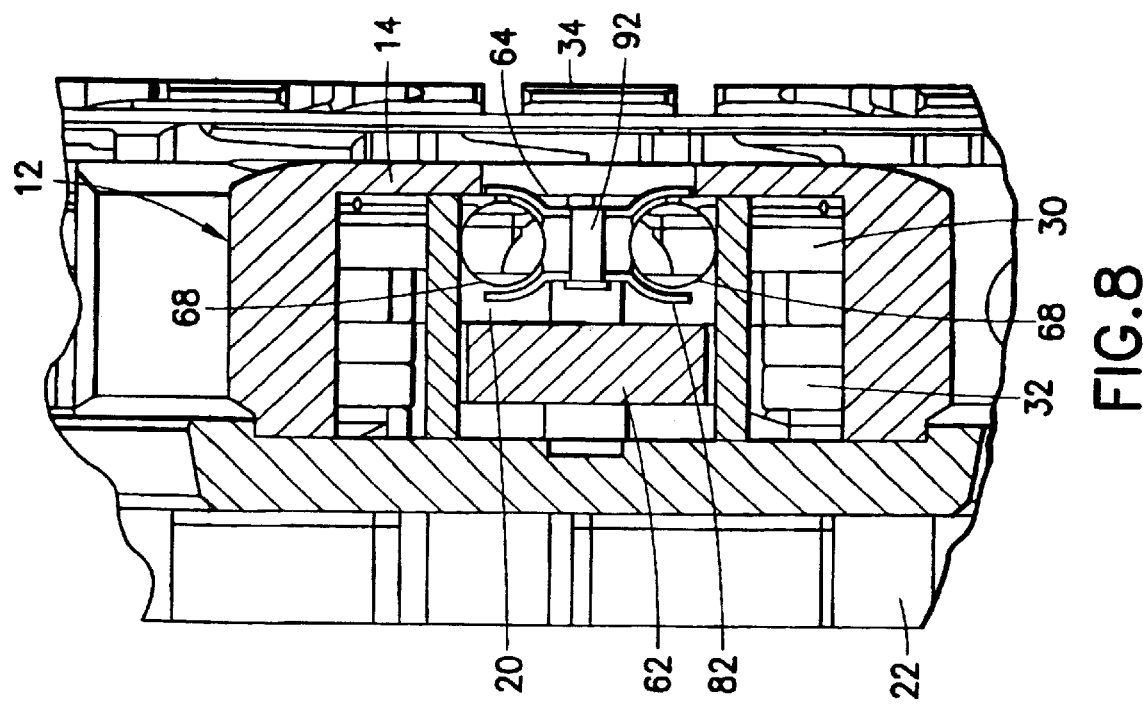
FIG. 8 is a sectional view of the embodiment shown in FIG. 7 corresponding to the view of FIG. 4 in different circumferential region.
Figure 7:
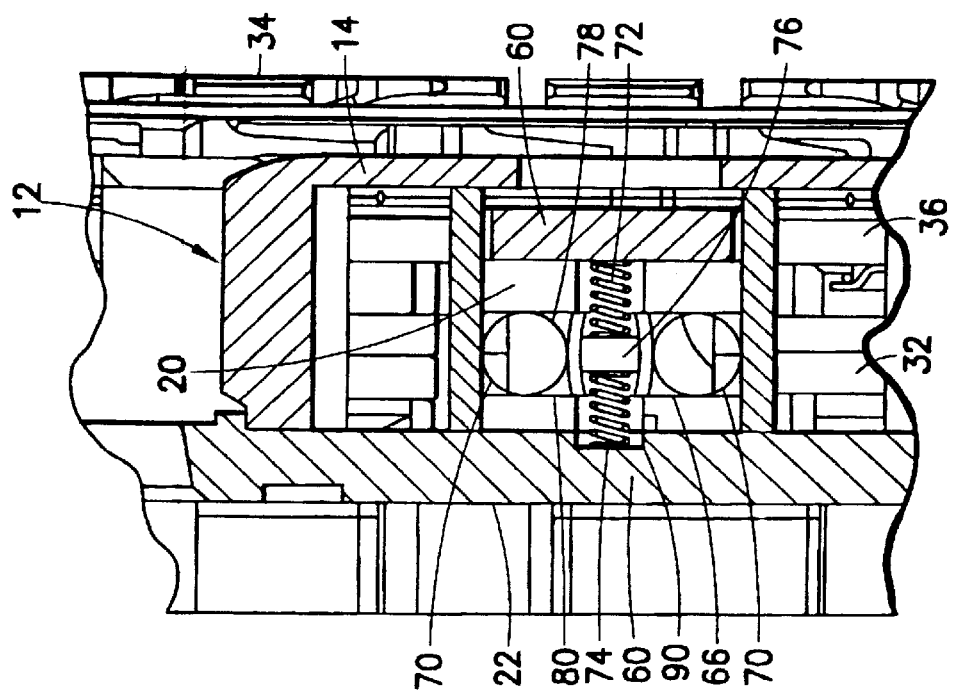
FIG. 7 is a sectional view of an alternative embodiment of a friction clutch corresponding to the view of FIG. 4.

FIGS. 7 and 8 show a modification of the above-described embodiment in the region of the rotational coupling projections 60, 62 or of the return projections 64, 66, in particular also as regards the positioning of the rotational coupling projections 60, 62 and the return projections 64, 66. FIG. 7 shows a first circumferential region with a recess 20, in which, in this case, a rotational coupling projection 60 of the pressure plate 30 and the return projection 66 of the intermediate plate 32 are arranged. FIG. 8 shows a circumferential region offset to the region of FIG. 7 in the circumferential direction and having a recess 20, in which a rotational coupling projection 62 of the intermediate plate 32 and a return projection 64 of the pressure plate 30 are arranged. Compared to the embodiment of FIG. 4, the pressure plate 30 and the intermediate plate 32 of the present embodiment are arranged in the housing 12 so as to be rotated relative to one another in the circumferential direction. The lifting springs 72, 74 are provided again, which are held on the intermediate plate 32 via the quills 78, 80. In addition, the lifting spring 72 is supported on a rotational coupling projection 60 of the pressure plate 30 and the lifting spring 74 is supported in a depression 90 in the flywheel 22, to ensure that the springs 74 are secured against movement. Furthermore, the return projection 66 of the intermediate plate 32 or in all the return projections 66, the recesses 76 of this embodiment is designed as a continuous orifice into which the quills 78, 80 engage. The continuous orifice is preferred for production reasons.

FIG. 8 shows that the clamps 82 are secured to the return projections 64 of the pressure plate 30 by rivet bolts 92 and, as described above, with their laterally projecting portions secure the tube springs 68 against unintentional axial movement relative to the return projections 64. In this embodiment, the clamp 82 may two parts which are illustrated in FIG. 8. The two parts of the clamp 82 are connected together and to the return projection 64 by the rivet bolt 92. Since, in the embodiment illustrated in FIGS. 7 and 8, the return projections 64 of the pressure plate 30 and the return projections 66 of the intermediate plate 32 are offset in the circumferential direction, the lifting springs 72 may be supported, without being impeded by the rivet bolts 92, on the pressure plate 30. Otherwise, the embodiment illustrated in FIGS. 7 and 8 corresponds in design and functioning to the embodiment described above.

Figure 13:
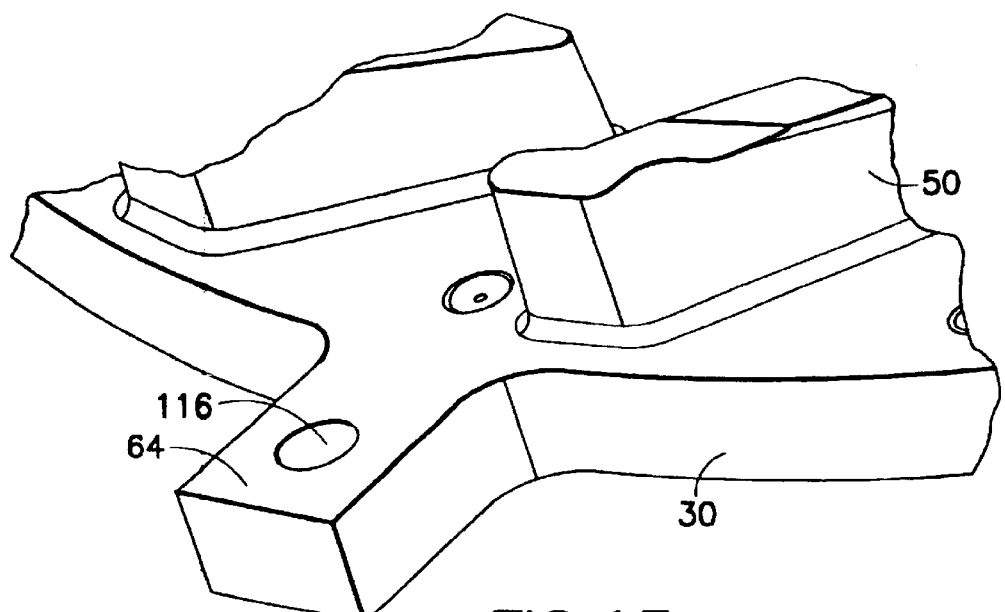
FIG. 13 is a perspective part view of a pressure plate according to an embodiment of the present invention which may be used with the clamp of FIG. 9.

A further embodiment, particularly in the region of the return projections 64 of the pressure plate 30, is illustrated in FIGS. 10–14. Referring to FIG. 13, each of the return projections 64 is designed to extend essentially radially outward in a straight line instead of having the T-shaped configuration described above. This embodiment is useful when the pressure plate is manufactured from relatively brittle cast material. Damage to the T-extensions during assembly is thereby avoided. Nevertheless, in this embodiment too, the return projections 64 have a smaller circumferential play than that of the respective rotational coupling projections 60, 62.

Figure 10:
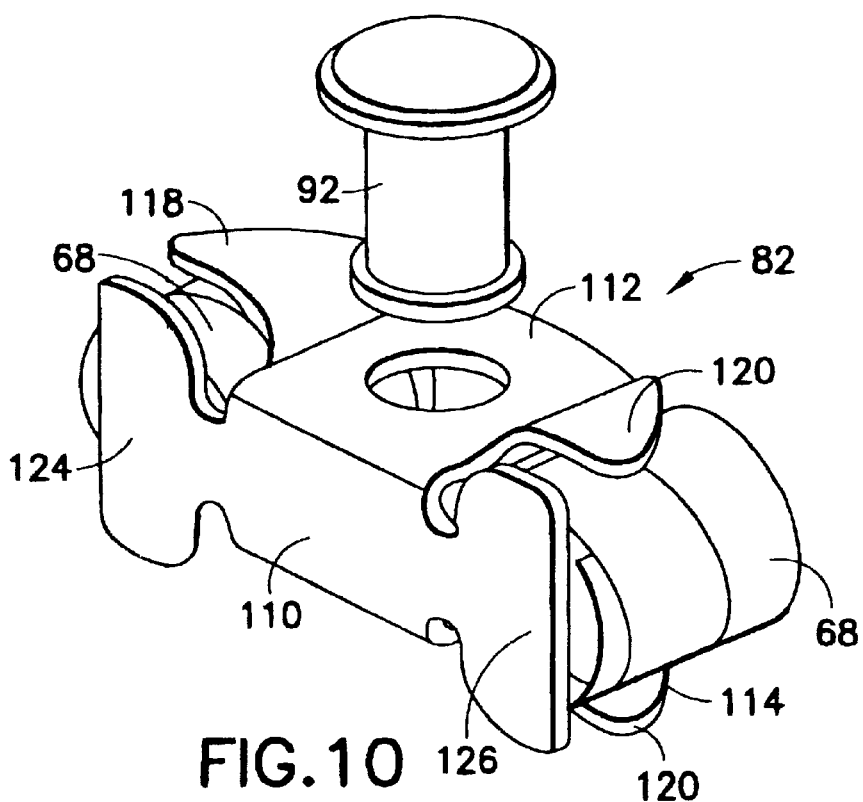
FIG. 10 shows an embodiment of a clamp element according to a further embodiment of the present invention.
Figure 11:
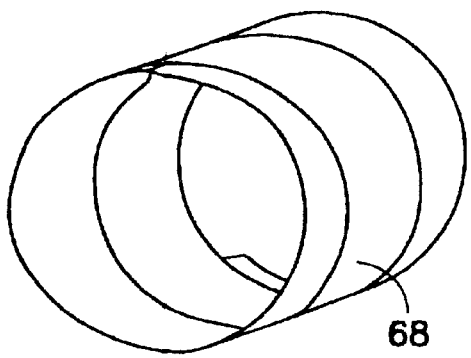
FIG. 11 is a perspective view of a tube-like spring element usable with the clamp of FIG. 10.
Figure 12:
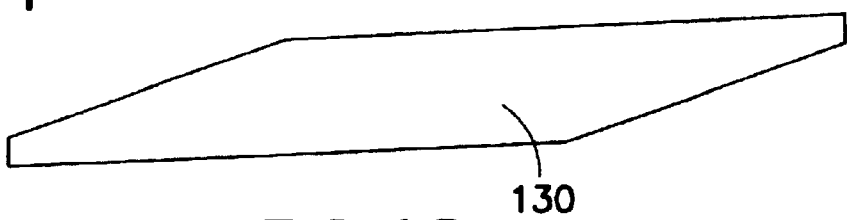
FIG. 12 is a plan view of the spring element of FIG. 11 in the unwound state.
Figure 14:
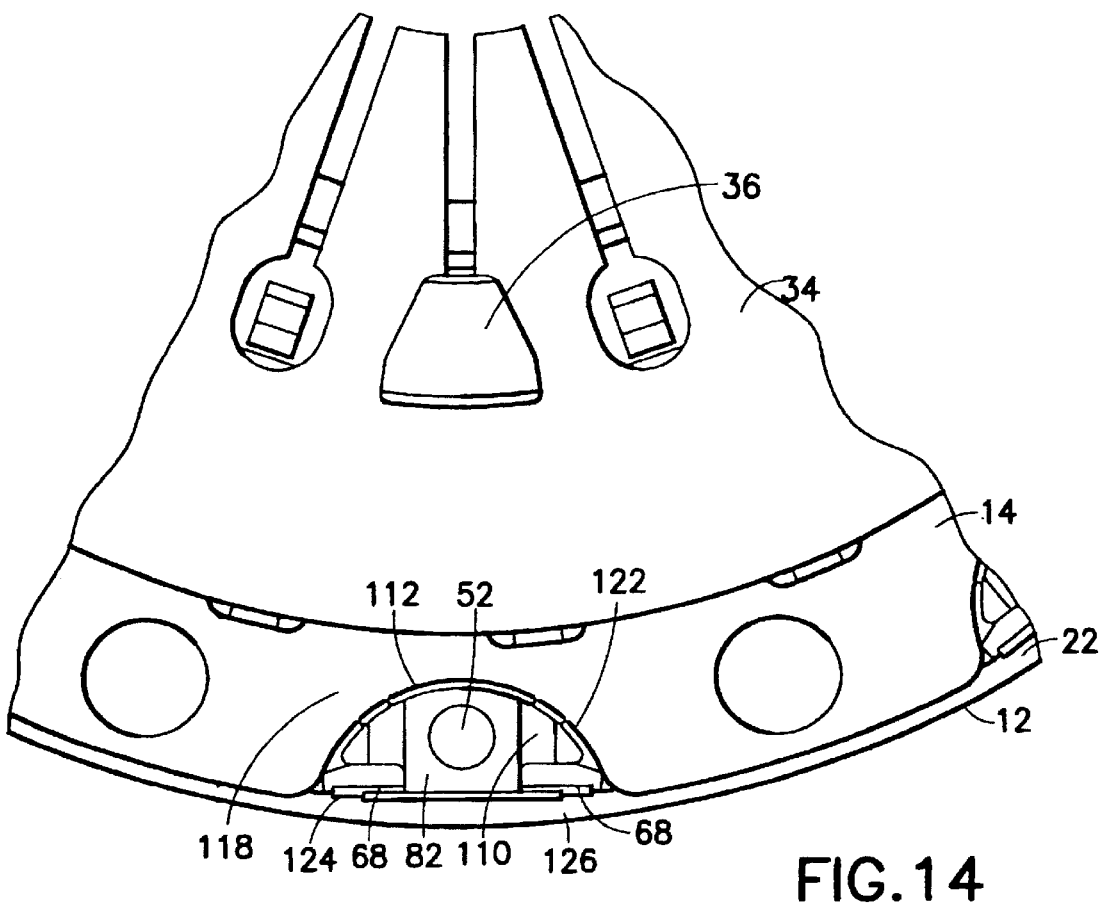
FIG. 14 is a partial axial view of a friction clutch according to an embodiment of the present invention including the pressure plate of FIG. 13, the clamp of FIG. 10 and the spring of FIG. 11.

Since the radial securing function can, in this case, no longer be performed by the T-extensions, this embodiment use of a clamp 82, see FIG. 10. The clamp 82 has an essentially U-shaped profile, with a connecting part 110 and U-parts 112 and 114 projecting from the connecting part 110. The two U-parts 112, 114 are secured to the respective return projection 64, in the same was as described above, by a rivet bolt 92 which passes through the orifice 116 of the return projection 64. FIG. 14 further shows that tab-like portions 118, 120 emanate in each case from the U-parts 112, 114 in both circumferential directions and, together with the U-part 112 or 114 associated in each case, form a circular termination, to which a correspondingly shaped circular recess 122 in the housing 12 is adapted. Furthermore, the tab-like portions 118, 120 are curved to receive the spring elements 68 therebetween. Moreover, radial securing tabs 124, 126 project from the connecting part 110 in both circumferential directions and, in this case, perform the function of holding the spring elements 68 counter to the action of centrifugal force. FIG. 11 shows, in perspective, a spring element 68 of this type, which, in contrast to the preceding embodiment, is in this case designed as a tube element wound from spring band material. Production may be carried out, for example, by the oblique winding of a spring steel band and then by the cutting off of individual spring segments, so that, after a spring segment of this type is unwound, a band element 130 is obtained, see FIG. 12. The edges of spring elements of this type are preferably rounded, in order to avoid sharp-edged bearing contact against a counterface and therefore the risk of digging in. It should be pointed out that a spring element of this type may, of course, also be used in an embodiment, as described with reference to FIGS. 1–8.

Figure 15:
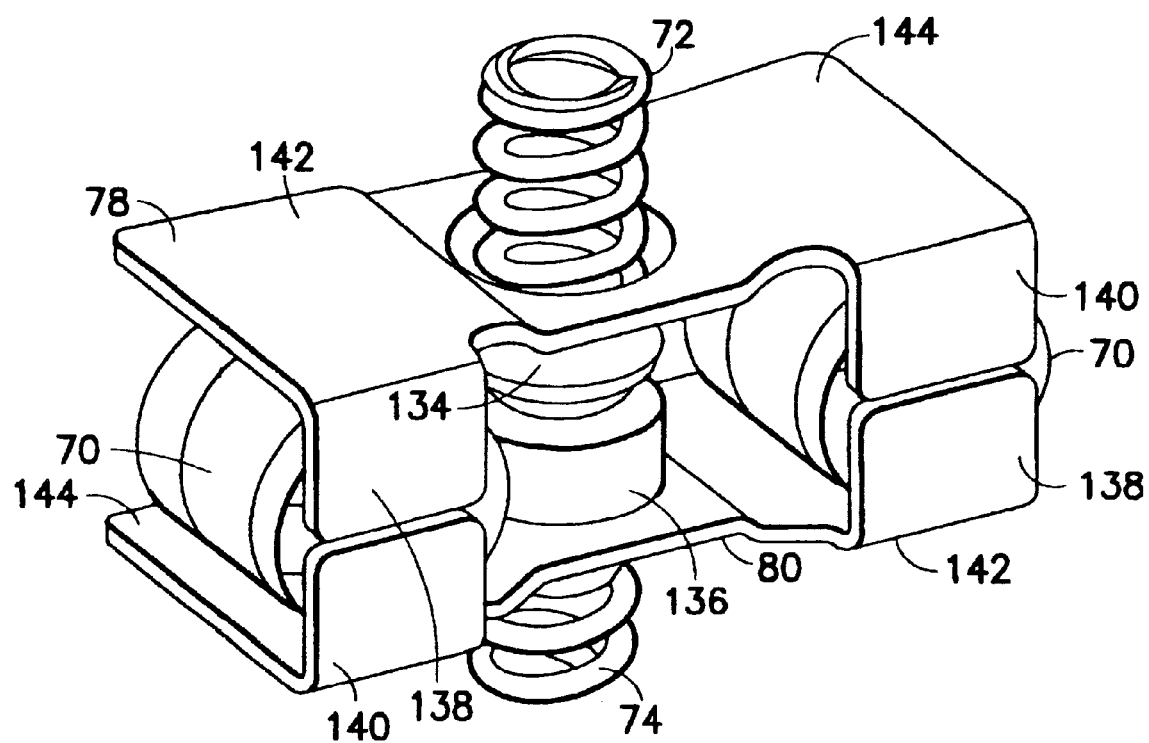
FIG. 15 is a perspective view of an alternative embodiment of spring cups for use with an intermediate plate of a friction clutch according to the present invention.

FIG. 15 shows an alternative embodiment of the quills 78, 80 which are assigned to the return projections 66 of the intermediate plate 32. Each of the quills 78, 80 has, once again, an indentation or depression portion 134 and 136 which engage into an associated recess of the return projection 66 and into which one of the springs 72, 74 then projects. Furthermore, two radial securing projections 138, 140 are provided, assigned to each of the quills 78, 80, for the spring elements 70, which may again be designed, as described with reference to FIGS. 11 and 12. The radial securing projections 138, 140 may be integrally formed on or bent away from axial securing portions 142, 144 for the spring elements 70. The axial securing portions 142, 144 extend in the circumferential direction beyond the return projection 66. This arrangement also provides axial and radial securing for the spring elements 70. Accordingly, the T-shaped contouring of the return projections 66 of the intermediate plate 32 is no longer necessary.

It should also be pointed out that the various embodiments of the clamps 82 and of the quills 78, 80 and of the spring elements 68, 70 may be combined in any desired way. Correspondingly, in that case, it is necessary, if appropriate, on the pressure plate 30 and/or the intermediate plate 32, to ensure, in the case of the return projections 64 and 66, that these have a T-shaped profiling or an essentially undercut-free contouring preferred for reduction reasons.

Figure 16:
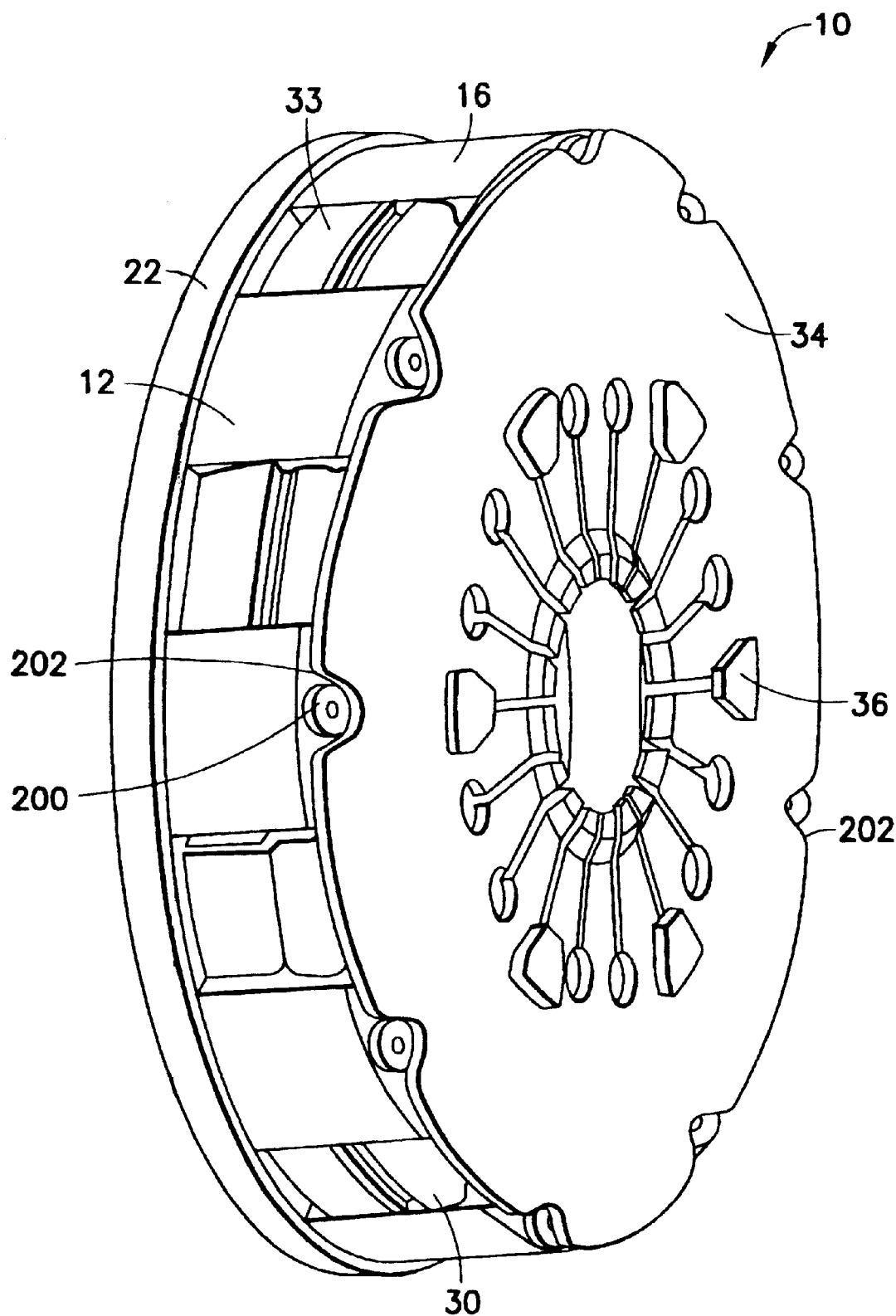
FIG. 16 is a perspective view of a friction clutch according to the present invention with a modified force accumulator.
Figure 17:
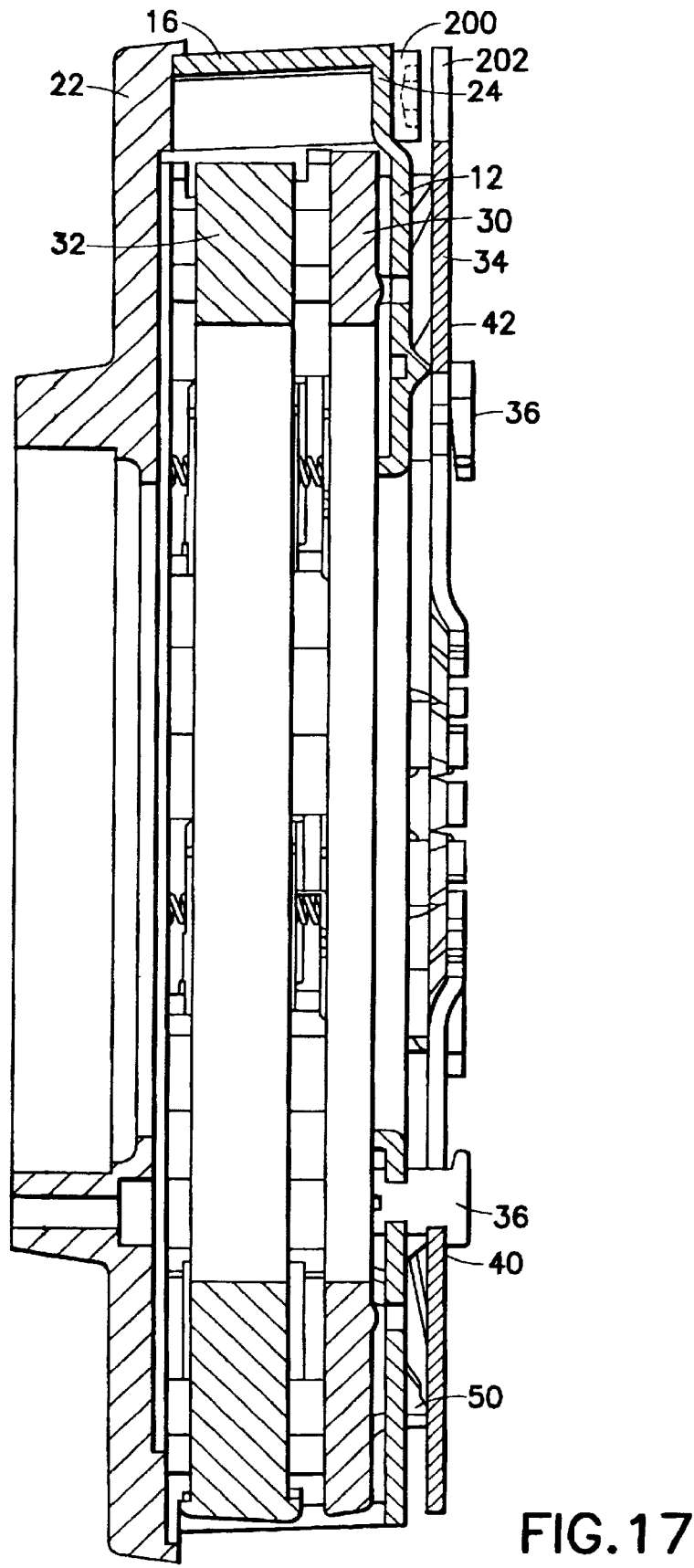
FIG. 17 is a longitudinal sectional view of the friction clutch of FIG. 16.

FIGS. 16 and 17 show a further embodiment of the friction clutch 10 according to the present invention. In the embodiment according to FIGS. 16 and 17, the force accumulator 34 is prolonged radially outward relative to the embodiment in FIGS. 1–6. Specifically, the force accumulator is prolonged radially outward so far that its outer circumferential region terminates essentially radially level with the wall region 16 of the housing 12. That is to say, the force accumulator 34 and the housing 12 have approximately identical radially outward extents. Moreover, clearances or indentations 202 are provided in the outer circumferential region of the force accumulator 34. After the force accumulator 34 has been attached to the housing 12, the indentations 202 are axially aligned with the above-described passage orifice regions or clearances 24 which are located in the housing 12 by means of the spacer bolts 36, see FIG. 17. Thus, to secure the pressure plate subassembly to the flywheel 22 which forms the abutment arrangement, the fastening screws 200 may first be introduced through the clearances 202 and then into the orifices or recesses 24 and screwed into the flywheel 22. In this embodiment, the force accumulator, that is to say diaphragm spring 34, may have a greater radial extent with a correspondingly modified force characteristic than the diaphragm spring 34 in the embodiment of FIGS. 1–6. In particular, a force accumulator of increased spring force can be provided in this way, since its radially outer annular region, which is not interrupted by incisions, is likewise enlarged in the radial direction.

The clearances or recesses 202 have a smooth transition into the outer circumferential region of the diaphragm spring 34. Accordingly, the form factor may be minimized and the stresses capable of being absorbed in the force accumulator may be increased.

Figure 18:
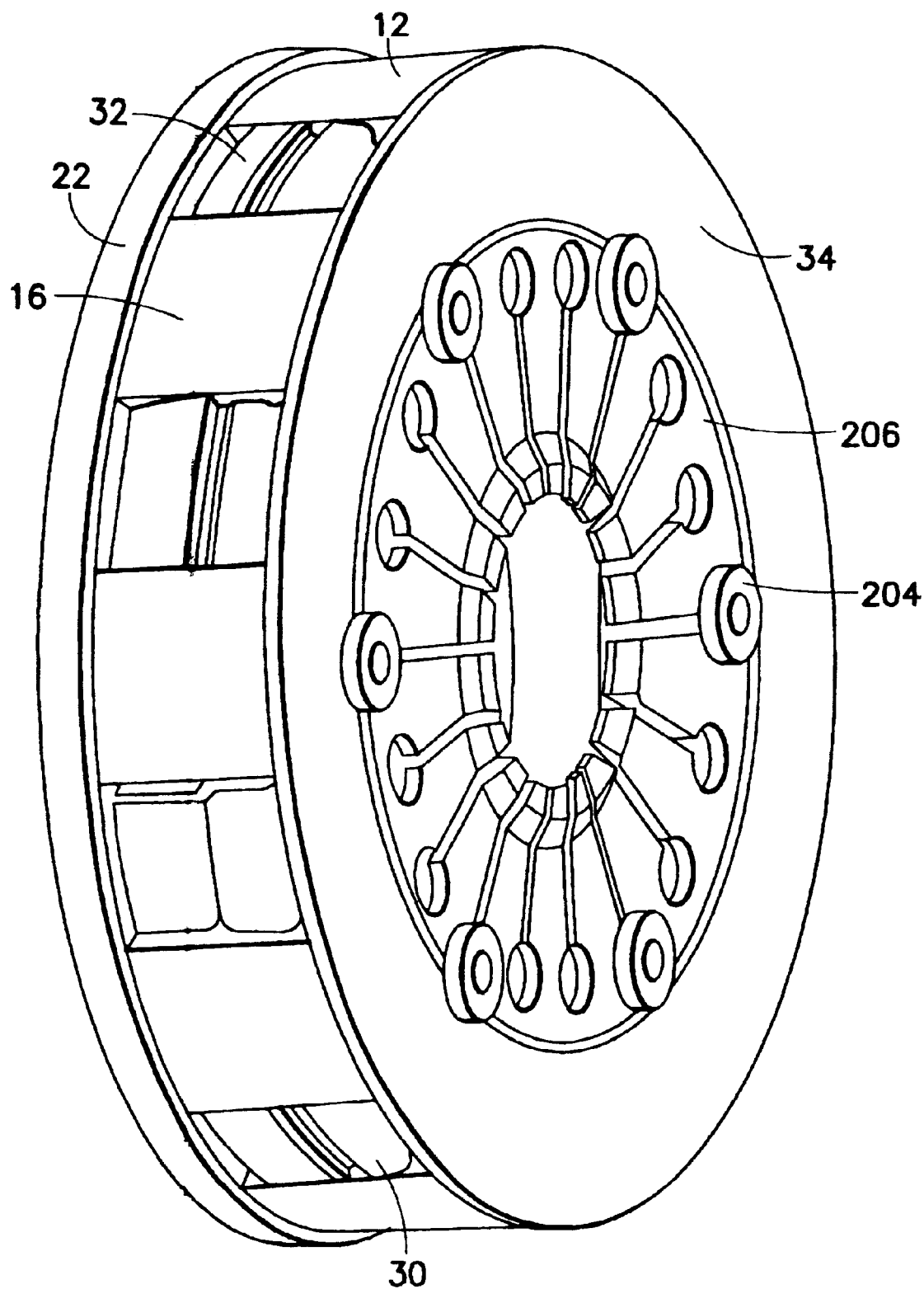
FIG. 18 is a perspective view of a further embodiment of the friction clutch according to the present invention.
Figure 19:
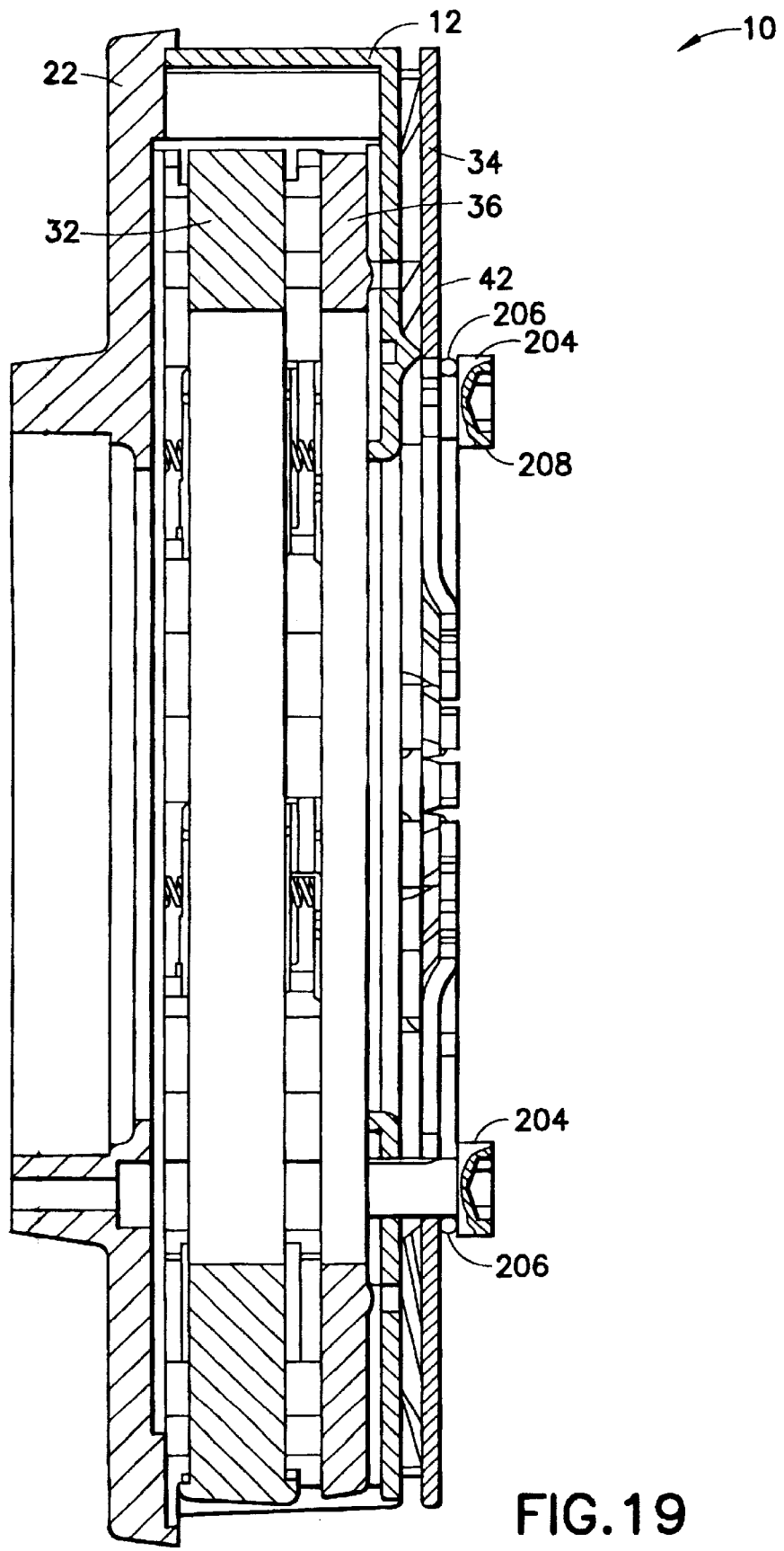
FIG. 19 is a longitudinal sectional view of the friction clutch FIG. 18.

An alternative embodiment which also allows the force accumulator to be radially enlarged is shown in FIGS. 18 and 19. Here, the force accumulator 34 is carried on the bottom region 14 of the essentially bowl-like housing 12 by a plurality of holding elements 204 such as, for example, holding screws, which can be screwed into associated orifices of the housing 12. The force accumulator 34 is held axially between the knife-edge region 42 shaped-out on the housing 12 and a supporting or wire ring 206 which is also supported on the heads 208 of the holding elements 204. As in the embodiments described above, the housing 12 itself is once again capable of being secured to a flywheel 22 by a plurality of fastening screws (which cannot be seen in FIGS. 18 and 19). When the friction clutch 10 of FIGS. 18 and 19 is being assembled, the procedure is then such that, in the first place, the entire pressure plate subassembly except for the force accumulator 34, is secured to the flywheel 22 by the fastening screws (cf. 200 in FIG. 17). Subsequently, the force accumulator is attached to the outer side of the housing 12 remote from the flywheel 22 by the holding elements or holding screws 204 being led through the orifices formed in the region of the spring tongues and into receiving orifices provided in the housing 12. Thus, as shown in FIG. 18, further clearances or shaped-out portions on the force accumulator are not required which would allow the fastening elements for the entire pressure plate subassembly to be led up or through. It is thereby possible to implement a design in which the force accumulator 34 is prolonged radially outward and, in particular can reach as far as the radially outer region of the housing or even beyond this.

It should be pointed out, in the embodiment according to FIGS. 18 and 19, that the holding elements 204 could be designed in the same way as the spacer bolts 36 described above. That is, the supporting ring 206 does not necessarily have to be provided and the diaphragm spring 34 could also be supported directly on the heads 208 or knife-edge portions of the heads 208. Moreover, it is also possible, in principle, to provide a supporting or wire ring additionally or alternatively, as illustrated, for example, in FIG. 9 instead of the knife-edge region 42 on the housing 12.

Otherwise, the embodiments of FIGS. 16–19 correspond, in terms of the design of the intermediate plate 32 and of the pressure plate 30 or of the other elements provided in the friction clutch 10, to the embodiments described above. Here too, any of the various embodiments illustrated may be used.

Figure 20:
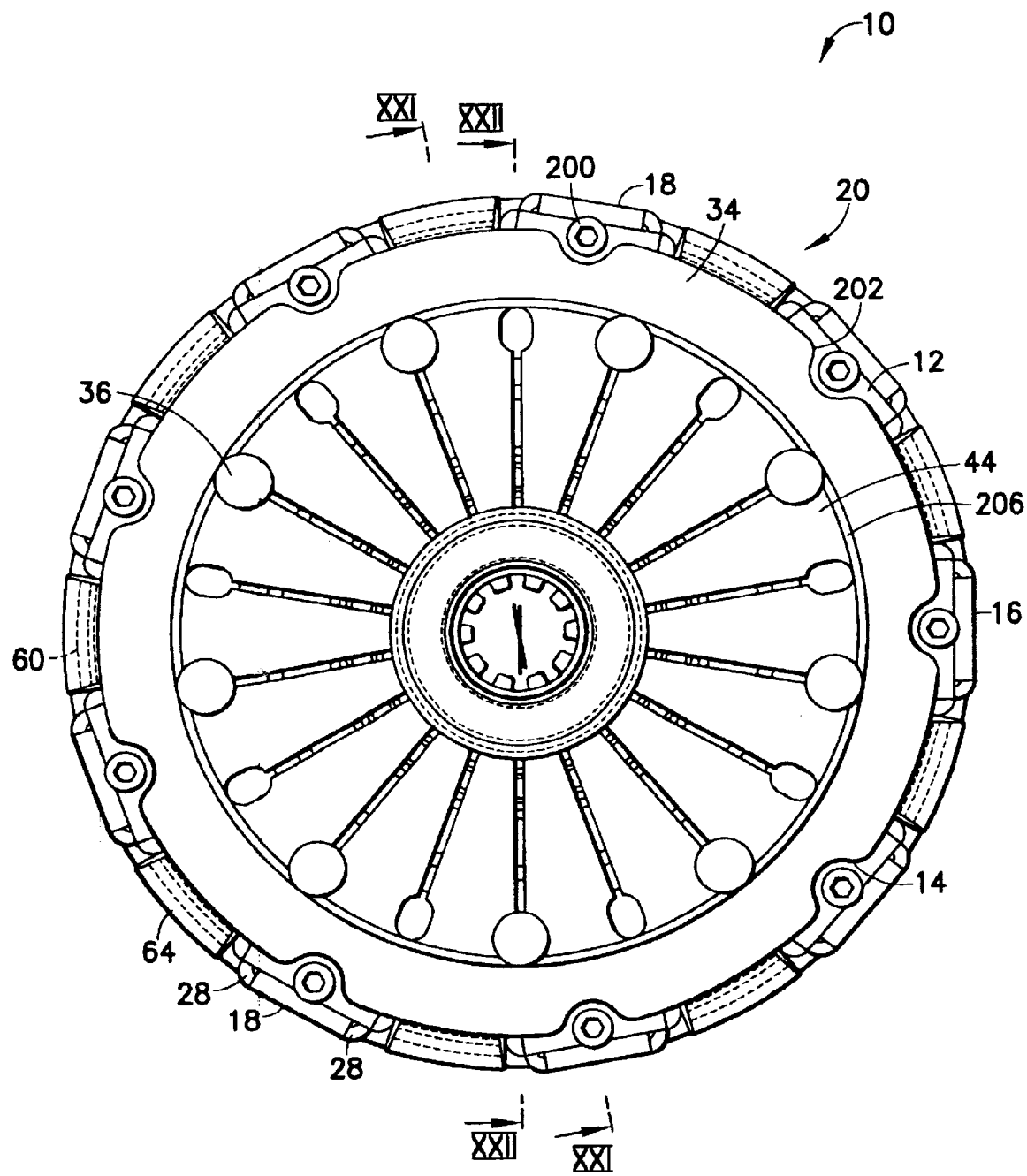
FIG. 20 is an axial view of a friction clutch according to a further embodiment of the present invention.
Figure 20A:
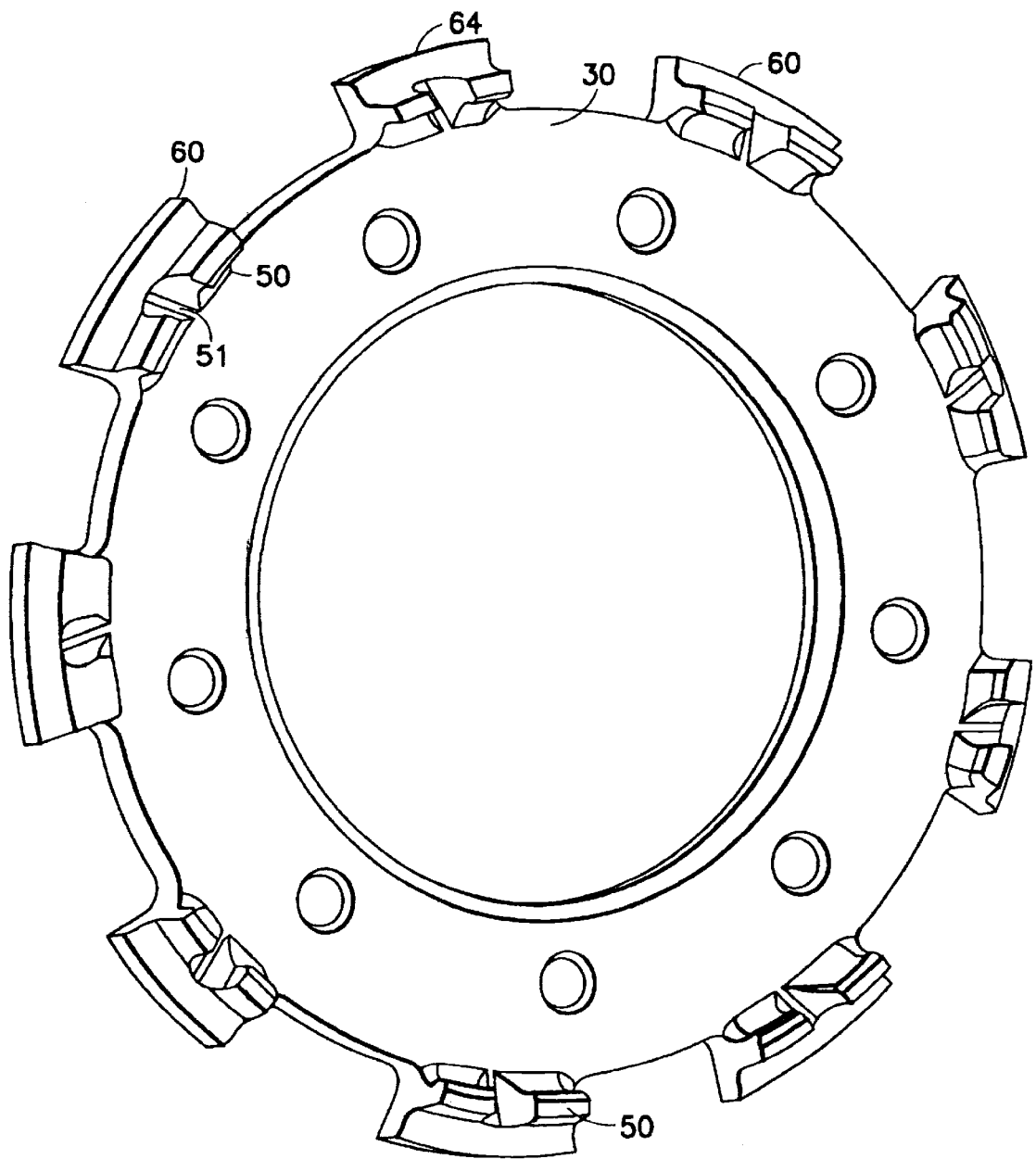
FIG. 20a is a perspective view of the pressure plate used in the friction clutch according to FIG. 20.
Figure 22:
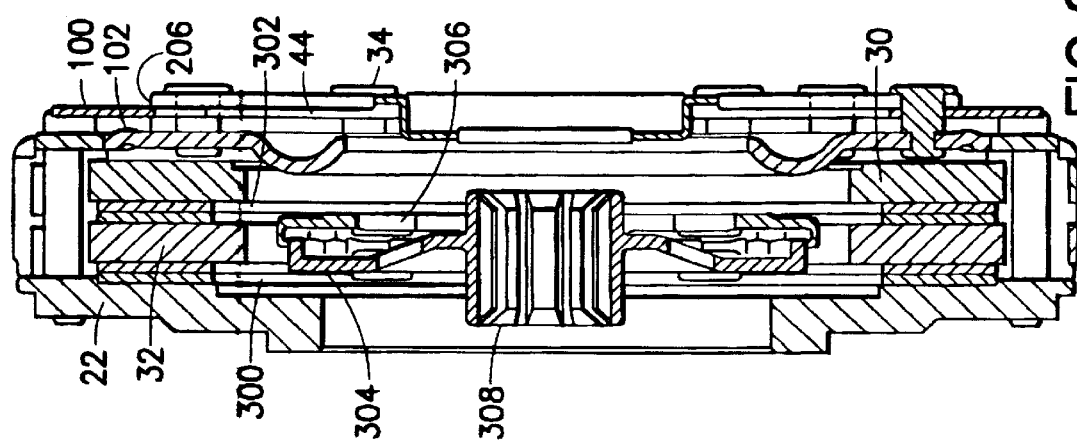
FIG. 22 is a longitudinal sectional view of the friction clutch of FIG. 20 along a line XXII—XXII in FIG. 20.
Figure 21:
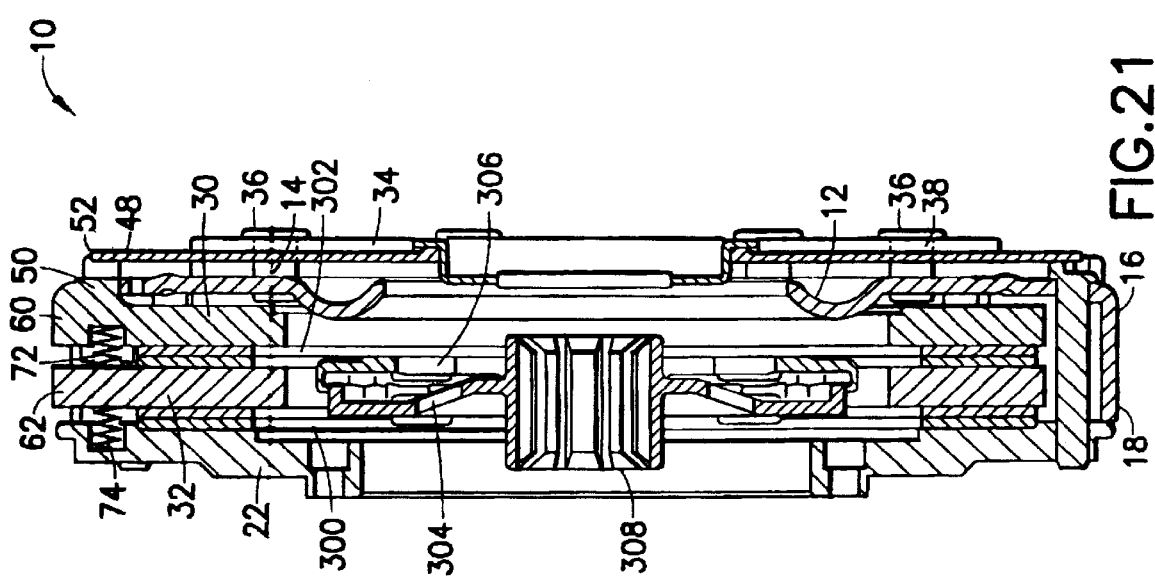
FIG. 21 is a longitudinal sectional view of the friction clutch of FIG. 20 along a line XXI—XXI in FIG. 20.

FIGS. 20–22 show a further embodiment of the friction clutch 10 according to the present invention, which corresponds essentially to the embodiment of FIG. 19. It can be seen clearly, in the embodiment according to FIGS. 20–22 that the supporting projections 50 on the pressure plate 30 are positioned radially completely on the outside and pass through orifices 48 in the pressure plate 30 which are located in this region and which extend, for example, approximately in a circumferential direction. For example, the assignment may be such that the supporting projections 50 are provided in each case on rotary coupling projections 60 and return projections 64 of the pressure plate 30, as can be seen in FIG. 20a. Ultimately, the orifices 48 are provided or formed by the recesses 20 and are therefore also open radially outward. The supporting projections 50 are pierced with incisions or groove-like depressions 51 which extend approximately radially and which divide the supporting projections into two regions located next to one another in circumferential direction. Hot air present in the region of the friction clutch 10 is allowed to escape radially outward through these depressions 51 and the mass of the supporting projections 50 is reduced. This increases the bursting strength. Furthermore, FIGS. 21 and 22 show the two clutch disks 300 and 302 which lie with their respective friction linings between the flywheel 22 and the intermediate plate 32 or between the intermediate plate 32 and the pressure plate 30. The friction linings of the clutch disk 300, 302 are carried, for example via lining springing, on respective ring-like carrier elements 304, 306 which are in circumferential take-up engagement with one another, the circumferential take-up connection being formed, for example, via an axially extending toothing, so that these two carrier elements 304, 306 are axially displaceable relative to one another.

Furthermore, the carrier element 304 is connected to a hub region 308 which is provided for the rotationally fixed coupling of the two clutch disks 300, 302 to an output shaft, for example a gear input shaft. It is pointed out that a double clutch disk designed in this way, with the two individual clutch disks 300, 302, may also be used in the embodiments described above.

It is further pointed out that in the embodiment according to FIGS. 20–22, the diaphragm spring 34 is supported axially via two supporting rings 100 and 206, as was already described above.

Various embodiments of subassemblies or spring elements which serve for the return in the circumferential direction and which may be used, for example, in the friction clutch according to FIGS. 20–22 are described below. It may be pointed out, thus far, that for cooperation with the arrangements described below in the friction clutch 10 according to FIGS. 20–22, the essentially axially extending web portions 18, together with the tab portions 28 laterally adjoining them, are designed with an essentially U-shaped cross-sectional contour, as can be seen, for example, in FIGS. 23 and 24. An arrangement of this type could, of course, also be provided in the embodiments of the friction clutch 10 already described above.

Figure 23:
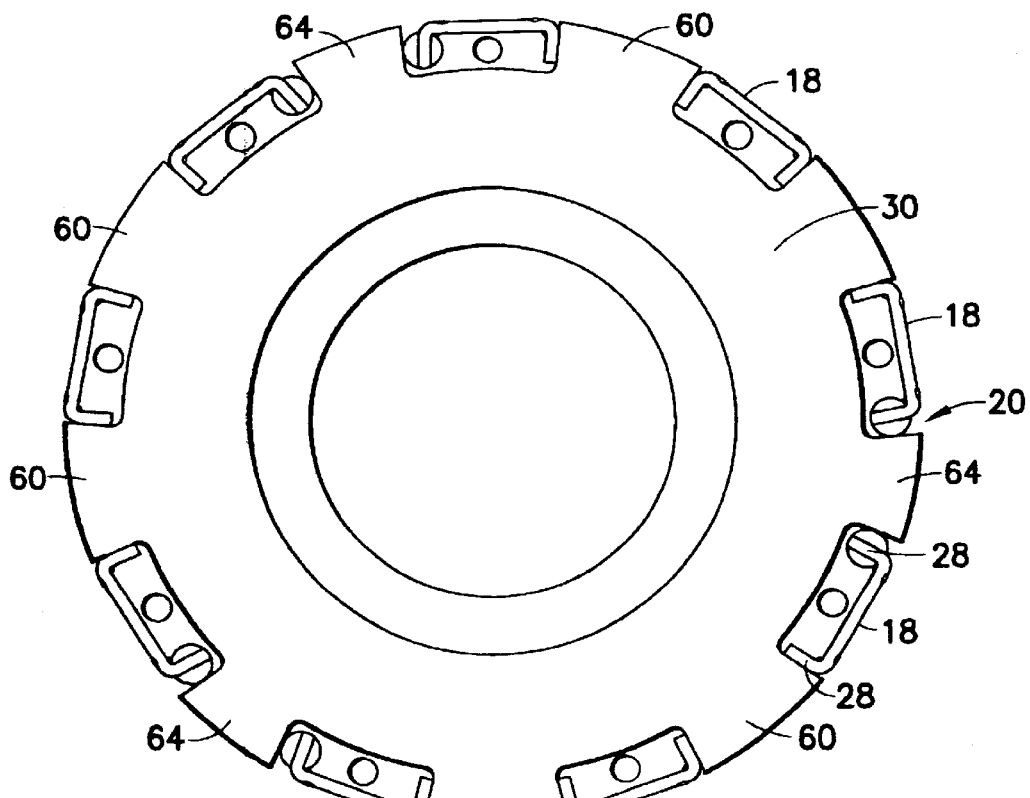
FIG. 23 is a diagrammatic axial view showing a pressure plate and its cooperation with a housing of a friction clutch according to an embodiment of the present invention.
Figure 24:
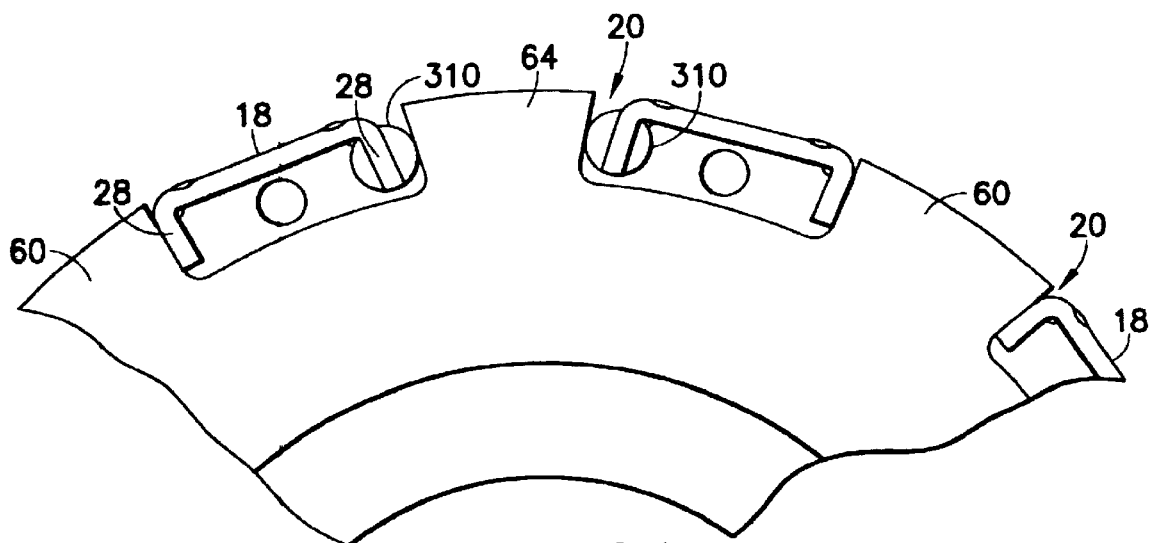
FIG. 24 is a detailed view of a part of a portion of FIG. 23.
Figure 25:
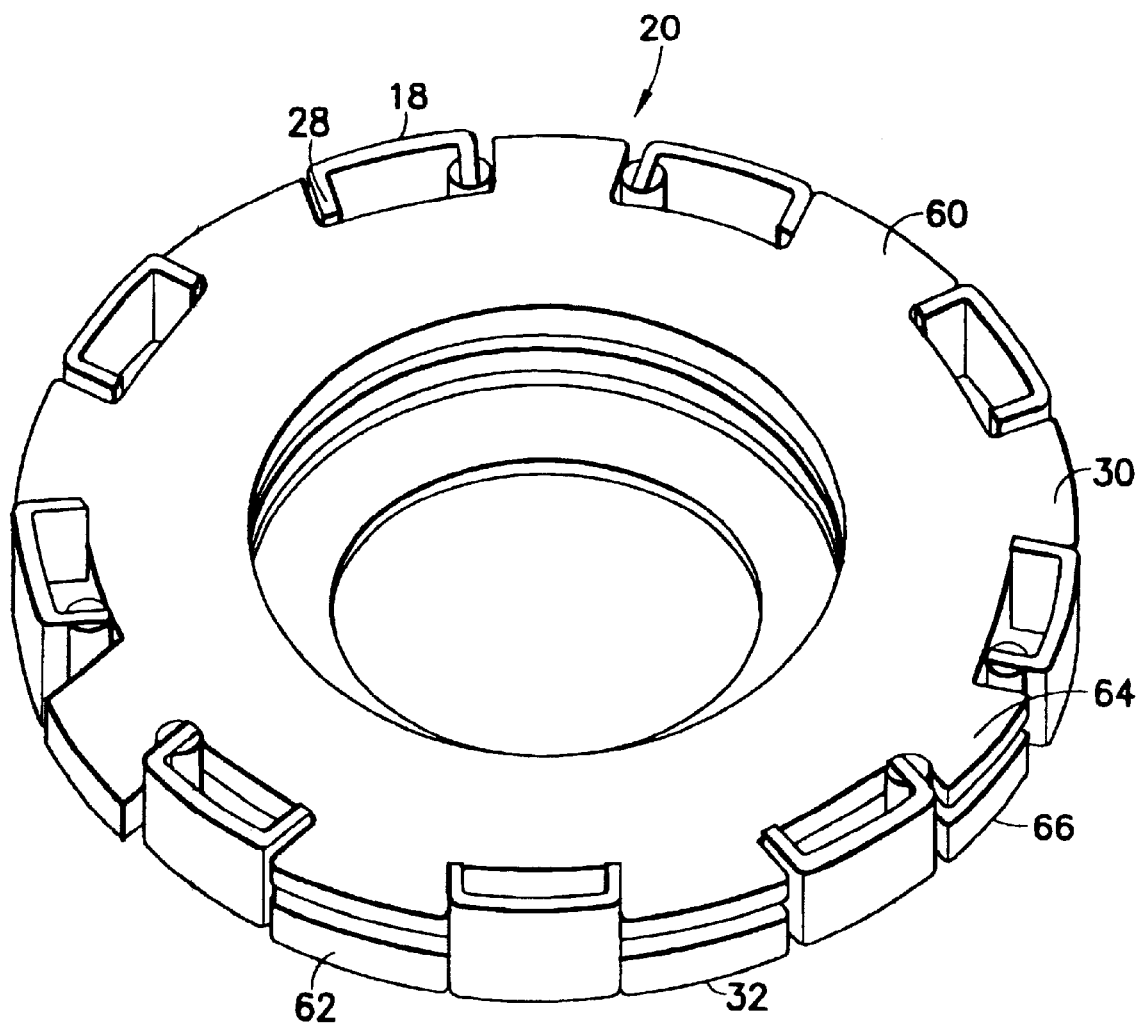
FIG. 25 is a perspective view the friction clutch of FIG. 23.
Figure 26:
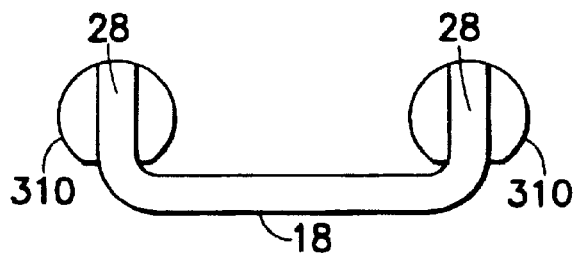
FIG. 26 is an axial view of a housing portion with two return springs carried on it.
Figure 27A:
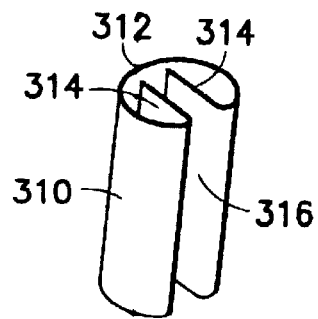
FIGS. 27a and 27b are perspective views of spring elements which may be used on the housing portion shown in FIG. 26.

As can be seen, in particular, in FIGS. 23 and 24, the recesses 20 are formed again in each case between the web portions 18 succeeding one another in the circumferential direction. The rotary coupling projections 60, 62 of the pressure plate 30 and the intermediate plate 32 and, offset in a circumferential direction thereto, the return projections 64, 66 of the pressure plate 30 and of the intermediate plate 32 engage the recesses 20 such that the circumferential movement play already described above is present for the pressure plate 30 and the intermediate plate 32. Each return projection 64, 66 of the pressure plate 30 or of the intermediate plate 32 is assigned a spring element 310 arranged on a respective tab portion 28 which delimits a recess 20 receiving a return projection 64 or 66. As shown in FIGS. 26 and 27a, the spring elements 310 have an axially elongate cylindrical springing portion 312 which merges in its end regions into respective clamping tab portions 314 bent into the cylindrical contour. These clamping portions 314 delimit a clamping orifice, into which a respective tab portion 28 of a web portion 18 is pushed so that the spring elements 310 are clamped on these tab portions 28. FIGS. 23–25 show that each return projection 64 or 66 is assigned two spring elements 310 of this type fixed to the housing 12 so that when a torque is introduced in the circumferential direction, the spring elements 310 located on one circumferential side of the return projections 64, 66 are compressed in their cylindrical portion 312 in the circumferential direction and at the same time are also deformed in the radial direction. This deformation persists until the rotary coupling projections 60, 62 ultimately come to bear on the associated web portions 18 or tab portions 28.

Referring to FIG. 24, the individual spring elements 310 are pushed onto the tab portions 28 radially from inside and are thus at the same time also secured against coming loose radially outward. To obtain the desired centering function for the pressure plate 30 or the intermediate plate 32, three return projections 64, 66 are provided which are distributed symmetrically in a circumferential direction respectively on the pressure plate 30 and the intermediate plate 32. Each of the return projections 64, 66 are assigned corresponding pairs of spring elements 310.

Figure 27B:
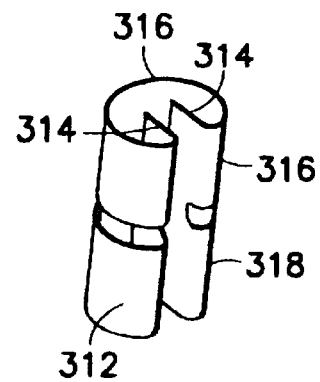

FIG. 27b shows a modified embodiment of a spring element 310 in which the cylindrical portion 312 is subdivided into two axially successive regions 316, 318 which are ultimately connected to one another by means of the clamping tab portions 314. Each of these regions 316, 318 is then assigned to the intermediate plate 32 or the pressure plate 30. It is pointed out, in principle, that a respective spring element could also be clamped to a tab portion 28 of the housing 12 separately for each of the pressure plate 30 and the intermediate plate 32.

Figure 28A:
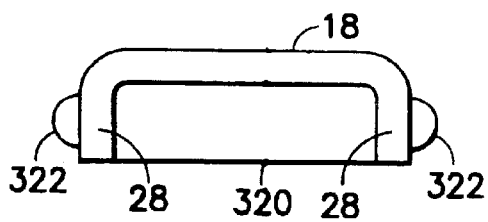
FIGS. 28a and 28b are axial and perspective views of another embodiment of a spring elements which may be used on the housing portion shown in FIG. 26.

Referring now to FIGS. 28a–33b, further alternative embodiments of a spring 320 for generating the return force are described below. A first embodiment of the spring 320 is shown in FIGS. 28a and 28b. The spring 320 has an approximately U-shaped contour and is slipped onto a respective web portion 18 or radially inwardly bent tab portions 28 of the web portion 18. Spring elements 322 are formed on the two U-legs. These spring elements 322 are supported in the circumferential direction on those surfaces of the tab portions 28 which delimit respective recesses 20. As seen in FIG. 28a, the spring elements 322 have a bulged contour. The two spring elements 322 are connected fixedly to one another by a connecting portion 324 to complete the U-contour. FIG. 28b shows that the spring elements 322 assigned to the pressure plate 30 and to the intermediate plate 32 may in each case be subdivided into two portions 326, 328, so that a separate springing action may be provided. In an embodiment of this type, therefore, the springs 320 are pushed radially from inside in each case onto the two web portions 18 delimiting a recess 20.

Figure 28B:
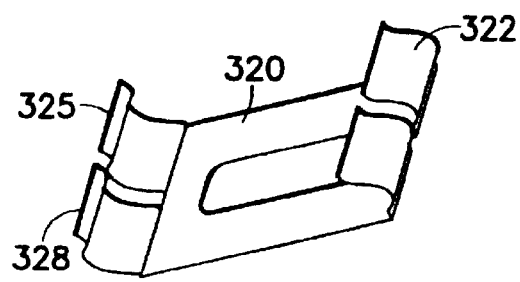
Figure 29A:
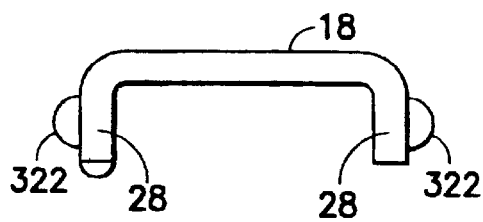
FIGS. 29a and 29b are axial and perspective views of another embodiment of a spring elements which may be used on the housing portion shown in FIG. 26.
Figure 29B:
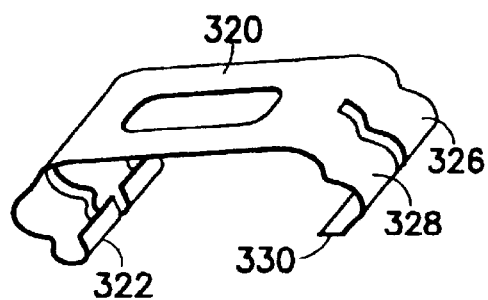

In the embodiment according to FIGS. 29a and 29b, the spring 320 corresponds basically to the spring 320 of FIGS. 28a and 28b, is pushed onto the web portions 18 or the tab portions 28 radially from outside. However, to secure the spring 320 against removal radially outward, one of the spring elements 322 includes a holding projection 330 engaging radially from inside, approximately in a circumferential direction, over an associated tab portion 28. A holding clip portion 332 of approximately U-shaped contour adjoins the other of the spring elements 322. During mounting, therefore, first this holding clip portion 332 is slipped over the associated tab portion 28 and the spring 320 is then tilted such that the holding portion 330 engages behind the associated tab portion 328. In this embodiment, the spring elements 322 are preferably subdivided again into the two portions 326 and 328.

Figure 30A:
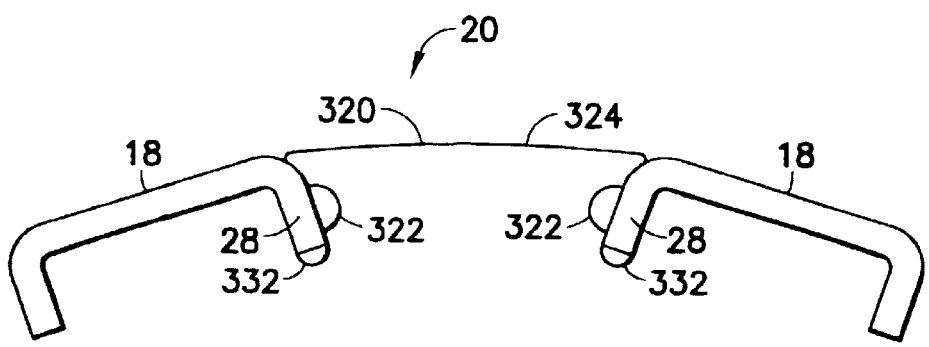
FIGS. 30a and 30b are axial and perspective views of another embodiment of a spring elements which may be used on the housing portion shown in FIG. 26.
Figure 30B:
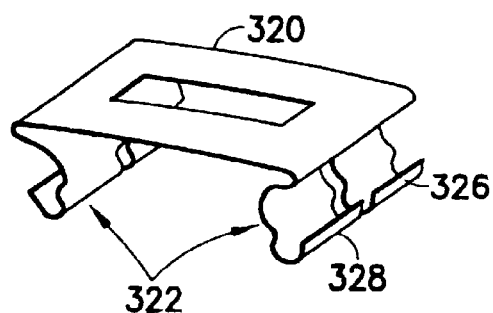

In the embodiment according to FIGS. 30a and 30b, the spring element 320 is clamped between two web portions 18 succeeding one another in the circumferential direction. Here too, the spring 320 again has approximately a U-shaped contour with the connecting portion 324 and with the two respective spring elements 322 forming U-legs. Now formed on those end regions of the spring elements 322 which are located radially inward are holding clip portions 332 which are directed away from the connecting portion 324 in the circumferential direction and which engage radially from the inside behind the two tab portions 28 delimiting a recess 20 in the circumferential direction and thus ensure a firm hold of the spring 320 by a corresponding clamping action in conjunction with the connecting portion 324. When torque is introduced in the circumferential direction, a respective spring element of the two spring elements 322 will become compressed in the circumferential direction and at the same time will expand in the radial direction to generate the desired return action, as in the embodiments of FIGS. 28 and 29.

Figure 31A:
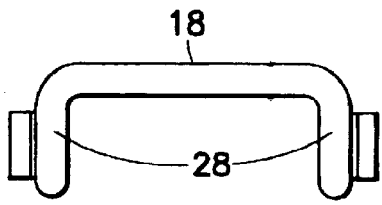
FIGS. 31a and 31b are axial and perspective views of another embodiment of a spring elements which may be used on the housing portion shown in FIG. 26.
Figure 31B:
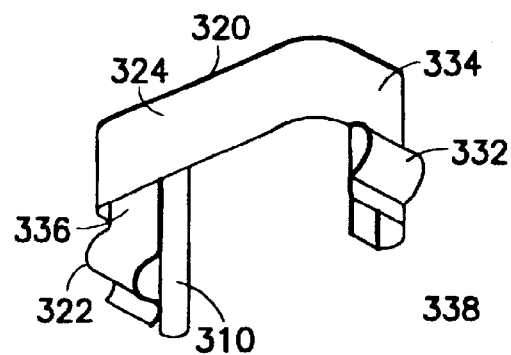

FIGS. 31a and 31b show a spring 320, in which the connecting portion 324 already has per se a U-shaped contour with U-legs 334, 336. The two spring elements 322 now adjoin the two U-legs 334, 336 in the axial direction (with respect to the axis of rotation of the friction clutch). Holding clip portions 338, 340 are arranged at the ends of the U-legs 334, 336. The spring 320 is pushed axially, with respective holding clip portions 338, 340 likewise extending axially and adjoining the U-legs 334, 336, onto the tab portions 28 of a web portion 18. The connecting portion 324 then bears essentially on the outside of the web portion 18. When torque is introduced, the spring elements 322 will again be compressed in a circumferential direction and at the same time will now expand in the axial direction. So that, in this embodiment, a return force both for the pressure plate 30 and for the intermediate plate 32 may be generated by means of a single spring 320, it would be conceivable to cause respective spring elements 322 to adjoin the two sides of the U-legs 334, 336 in the axial direction, so that the connecting portion 324 ultimately lies between the pressure plate 30 and the intermediate plate 32 in the axial direction.

Figure 32A:
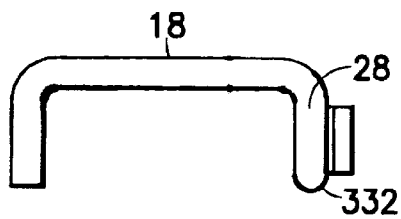
FIGS. 32a and 32b are axial and perspective views of another embodiment of a spring elements which may be used on the housing portion shown in FIG. 26.
Figure 32B:
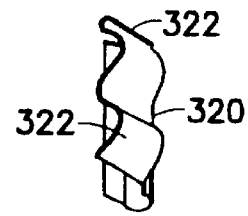

FIGS. 32a and 32b show a spring 320 which is to be mounted on a tab portion 28. The spring 320 has a holding portion 332 which has a U-shaped contour, as seen in the axial direction, and which engages round the tab portion 28 radially from inside. Connected fixedly to this holding portion 332 are two spring elements 322 which succeed one another in the axial direction and which, in their end regions facing one another, are fixedly connected to one another and to the holding portion 332. When a circumferential force is introduced, the two spring elements 322 can then, again, become pressed, at the same time expanding axially. In this embodiment, therefore, separate springs 320 are to be mounted in each case on the two tab portions 28 delimiting a recess 20.

Figure 33A:
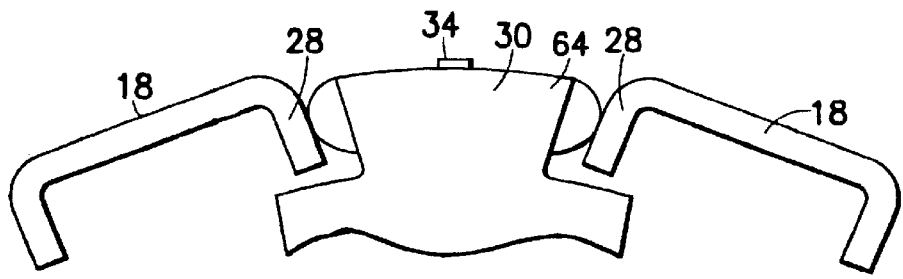
FIGS. 33a and 33b are axial and perspective views of yet another embodiment of a spring elements which may be used on the housing portion shown in FIG. 26.
Figure 33B:
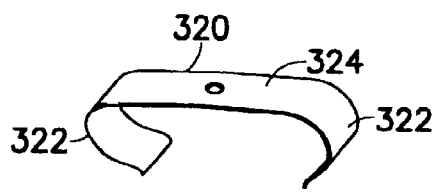
Figure 34:
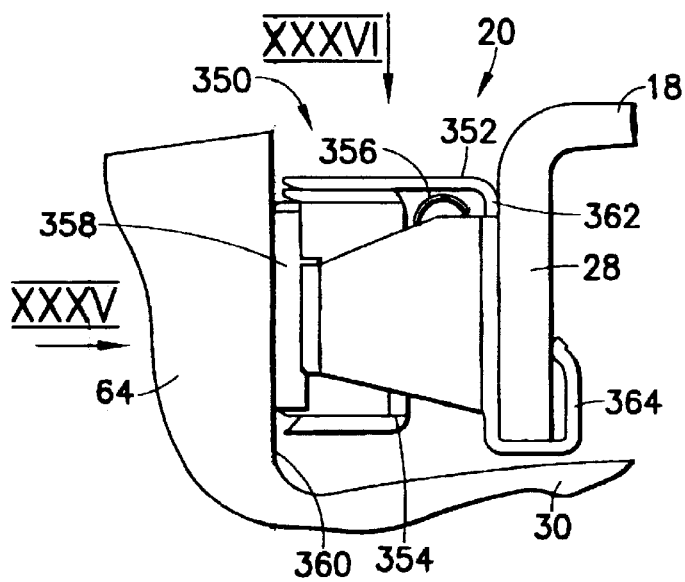
FIG. 34 is a partial axial view of a subassembly usable for generating a return force between a housing and a pressure plate or intermediate plate of a friction clutch according to the present invention.
Figure 35:
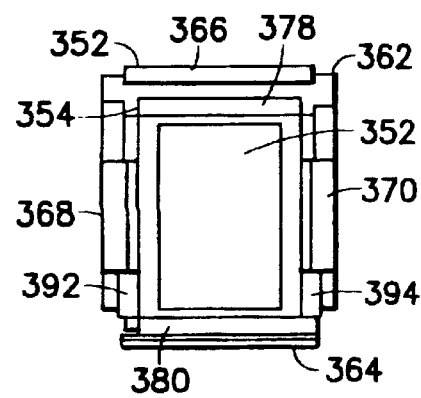
FIG. 35 is a view of the subassembly of FIG. 34 along the direction XXXV in FIG. 34.
Figure 36:
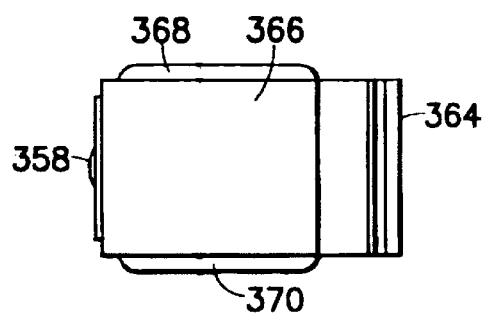
FIG. 36 is a view of the subassembly of FIG. 34 along the direction XXXVI in FIG. 34.
Figure 37:
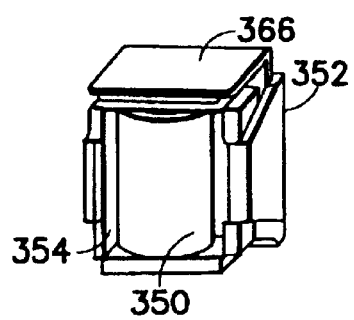
FIG. 37 is a perspective view of the subassembly of FIG. 34.

FIGS. 33a and 33b show an embodiment in which a spring 320 is now mounted, for example, on a return projection 64 of the pressure plate 30. The spring 320 has a to connecting portion 324 extending approximately in the circumferential direction and, adjoining the circumferential end regions of the latter, in each case bulged spring elements 322 which engage radially inward and are designed integrally with the connecting portion 324. In their radially inner end regions, the spring elements 322 are then supported on the side flanks of the associated return projection 64. Although, the return projection 64 is already designed with a dovetailed contour (see FIG. 33a) and the spring elements 322 engage behind this contour, thus already ensuring radial securing of the springs 320, it is advantageous to provide an additional fixing of the springs 320 to the pressure plate 30 (or the intermediate plate 32) by means of rivets or screw bolts 342 or the like.

It may be pointed out that, in the springs 320 described above, the respective spring elements 322 may also be designed with a convex, that is to say dome-like shape, to obstruct as little as possible relative movement occurring between these and the return projections.

Another embodiment of units serving in each case for generating a return force is described below with reference to FIGS. 34–37 and 40–43.

Referring to FIGS. 34–37 and 40–43, a return unit 350 is fixed to each of the two tab portions 28 which laterally delimit a recess 20 in which a return projection 64 or 66 is to be positioned. As may be gathered from the exploded views of FIGS. 40–42, each of these return units 350 comprises a first housing element 352 which is fixed to the tab portion 28, a second housing element 354 which is supported in a circumferential direction relative to the first housing element 352, a spring element 356 interposed and held on said first housing element 352, and a roller element 358, via which the unit 350 is then supported on a surface 360 of the return projection 64. The surface 360 lies or faces in the circumferential direction.

The first housing element 352 comprises a body portion 362 which bears laterally on a tab portion 28. Bent away radially inward from said body portion is a U-shaped or hook-shaped holding portion 364 used to hold the first housing element 352 on the tab portion 28 and prevent radially outward movement of the first housing element 352. A radial supporting portion 366 which extends away from the radially outer portion of the body portion 362 in the circumferential direction. The second housing element 354 is supported radially outward on the radial supporting portion 366. Furthermore, the body portion 362 has emanating from it, on its two end regions located in the axial direction, respective fixing portions 368, 370, which have respective catch projections 372, 374 on their end regions located in the circumferential direction.

The second housing element 354 likewise has a body portion 376, from which respective roller holding portions 378, 380 extend away in the circumferential direction radially on the outside and radially on the inside. Provided in each of these two roller holding portions 378, 380 is an axially elongate hole 382, into which respective mounting portions 384 or 386 of the roller element 358 engage.

When the return unit 350 is assembled, the procedure is such that the roller element 358 together with its two mounting portions 384, 386 is introduced into the elongate holes 382 for which purpose the housing element 354, which, for example, may be bent from sheet metal material, is slightly deformed elastically. Subsequently, with the spring element 356 interposed between the two body portions 362, 376, the second housing element 354 is offered up to the first housing element 352. At the same time, the fixing portions 368, 370 move with their catch projections 372, 374 along respective counterfixing portions 392, 394 of the second housing element 354 which are bent away from the body portion 376 in the circumferential direction on the two axial end regions of the latter. These counterfixing portions 392, 394 have, in their free circumferential end regions, respective catch recesses 396 into which the catch projections 372, 374 engage. Under the prestressing force generated by the spring element 356, the second housing element 354 is prestressed away from the first housing element 352 so that there is firm bearing contact between the catch projections 372, 374 and the catch recesses 396. In the assembled state shown in FIG. 34, the body portion 362 of the first housing element 352 is supported on a tab portion 28, while the roller element 358 is supported on the opposite return projection 64 and is prestressed into firm bearing contact with the return projection 64 by the spring element 356. When torque is introduced in the circumferential direction, the spring element 356 is compressed, so that the two housing elements 352, 354 are displaced relative to one another in the circumferential direction. So that the axial displacement of the pressure plate 30 and/or of the intermediate plate 32 which occurs during clutch disengagement and engagement operations is possible essentially without any frictional forces, the roller element 358 rolls in the axial direction on the associated return projection 64 or 66. In this embodiment of a return unit 350, therefore, functional uncoupling is provided between the function "generating a circumferential return force" and the function "allowing the axial movement". Each of these two functional regions may thus be designed in an optimized manner independently of the other.

To provide axial securing of the spring element 356 even radially inward, a shaped-out portion 398 is provided on the first housing element 352 or its body portions 362, so that the spring element 356 is ultimately held radially between said shaped-out portion 398 and the portion 366.

Figure 38:
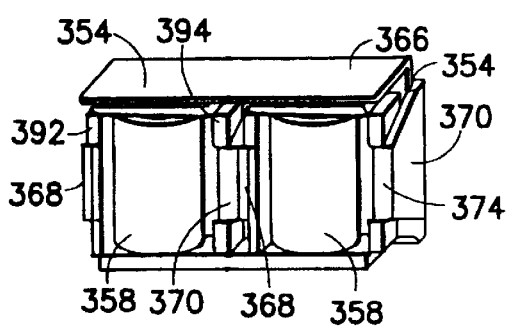
FIG. 38 is a perspective view of an alternative embodiment of the subassembly of FIG. 34.
Figure 39:
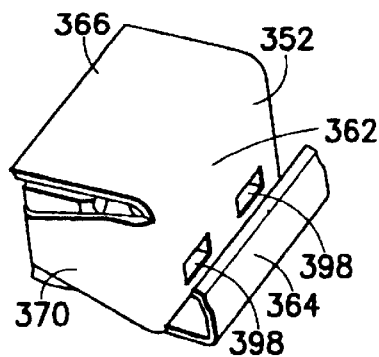
FIG. 39 is another perspective view of the subassembly of FIG. 38.
Figure 40:
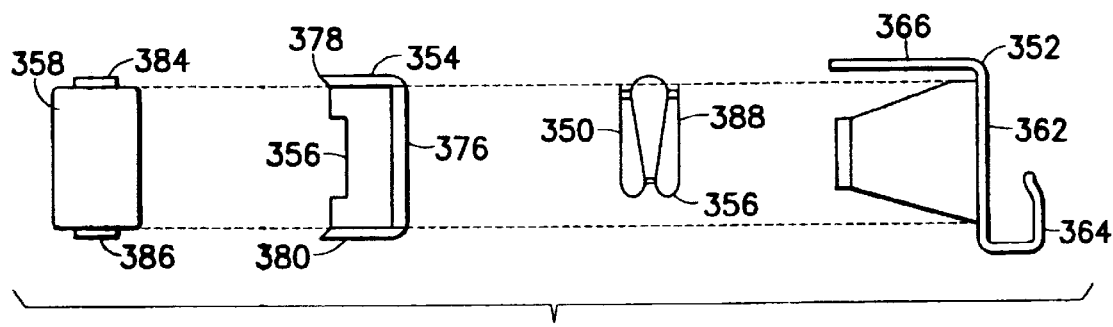
FIG. 40 is an exploded axial view showing the parts of the subassembly of FIG. 34.
Figure 41:
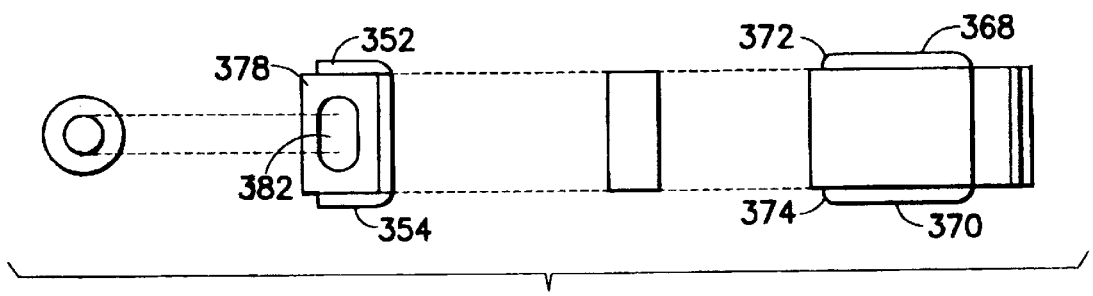
FIG. 41 is an exploded radial view of the subassembly of FIG. 34.
Figure 42:
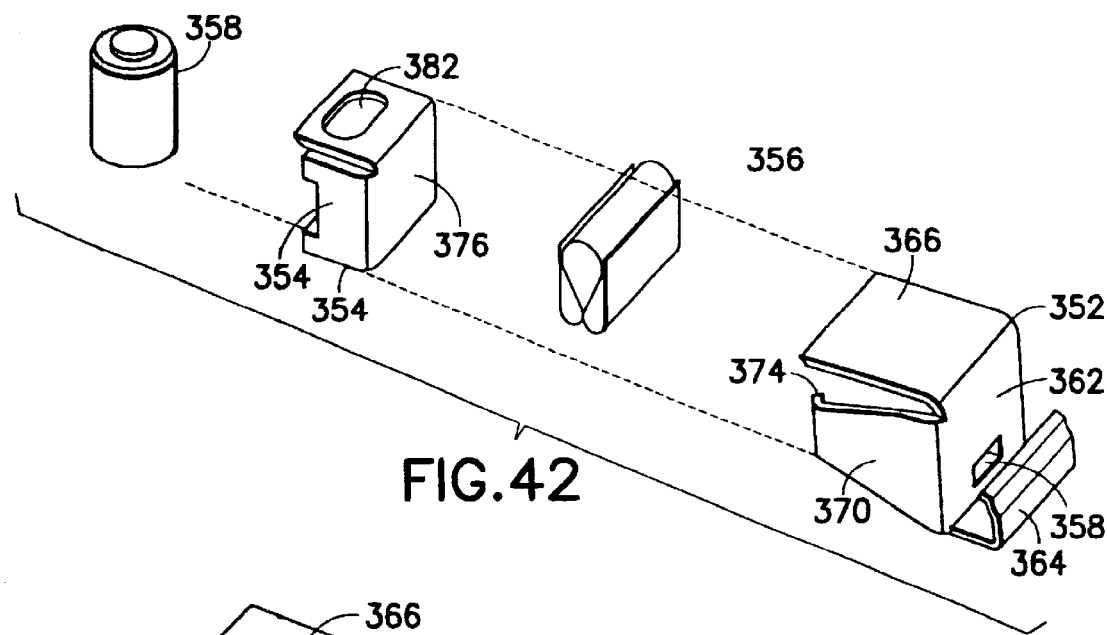
FIG. 42 is an exploded perspective view of the subassembly of FIG. 34.
Figure 43:
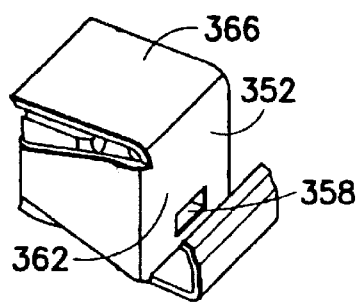
FIG. 43 is a further perspective view of the subassembly of FIG. 34.
Figure 45:
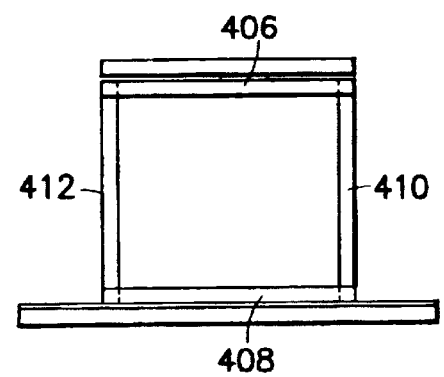
FIG. 45 is a view of the subassembly of FIG. 44 along the direction XLV in FIG. 44.

When a friction clutch having return units 350 of this type is being assembled, the procedure may be such that the pressure plate 30 and the intermediate plate 32 are first inserted into the housing 12 and then the respective units 350 are preferably provided again for three return projections 64 or 66 having an angular spacing of 120°. FIGS. 38 and 39 show a further embodiment in which the first housing element 352 is designed in such a way that it receives two second housing elements 354, one with the roller element 358 assigned to the pressure plate 30 and the other with the roller element 358 assigned to the intermediate plate 32. It may be pointed out, here, that, although not shown, the fixing portions 368, 370 located between the two roller elements 358 or between the two second housing elements 354 may be formed, for example, by appropriate stamping out and bending away from the body portion 362. Alternatively, it would also be possible for these two fixing portions 368, 370 to be formed from a separate component and for the latter then to be fixed to the body portion 362 of the housing element 352. As a result of the embodiment according to FIGS. 38 and 39, the operation of assembling a friction clutch is therefore made even easier, since the number of subassemblies to be mounted separately on the housing is reduced. In the embodiment according to FIGS. 34–37 and 40–43, a separate return unit 350 must be mounted on a respective tab portion 28 for each of the pressure plate 30 and for the intermediate plate 32.

It may also be pointed out that, in the embodiments illustrated in FIGS. 34–43, spring elements 256 may be designed differently and may, for example, comprise tubular springs or rubber blocks or blocks made of another elastic material.

An alternative embodiment of a return unit 350 is illustrated in FIGS. 44–48. This return unit 350 comprises a first housing element 352 and a second housing element 354. The first housing element 352 bears again with its body portion 362 on the side face of a tab portion 28. The first housing element 352 includes a radial supporting portion 366 for the second housing element 354. A second radial supporting portion 400 which extends essentially parallel to the radial supporting portion 366 is provided on the radially inner side of the first housing element. Extensions of the second radial supporting portion on both sides of the body portion 362 forms supporting projections 402, 404, on which the first housing element 352 may be supported radially outward on tab portion 28. The second housing element 354 likewise has a body portion 376, from the four circumferential sides of which extend away respective wall portions 406, 408, 410 and 412 extending toward the first housing element 352. Formed in the two wall portions 406 and 408, for example, by shaped-out portions, are mounting portions 414, 416 which engage into respective elongate orifices 418 in the radial supporting portions 366 and 400 of the first housing element 352. In this case, the elongate orifices 418 are elongated both in the axial direction and in their dimension in the circumferential direction, in such a way that the mounting portions 414, 416 are also received therein with movement play in the circumferential direction so that the first and second housing elements 352, 354 may also move away from one another.

A spring element 420 is received under prestress between the two body portions 362, 376. The spring element 420 may be designed as a tubular spring element or as another elastically deformable element. As a result of the prestressing force of the spring element 420, the first and second housing elements 352 and 354 are prestressed in the direction away from one another, so that the mounting portions 414, 416 come to bear on a long side wall delimiting the elongate recess 418.

When circumferential loads occur, the spring elements 420 are compressed, so that the first and second housing elements 352 and 354 are displaced relative to one another in the circumferential direction. When an axial movement of the pressure plate 30 or of the intermediate plate 32 occurs, the second housing element 354 may be displaced with its mounting portions 414, 416 in the elongate orifices 418.

Figure 44:
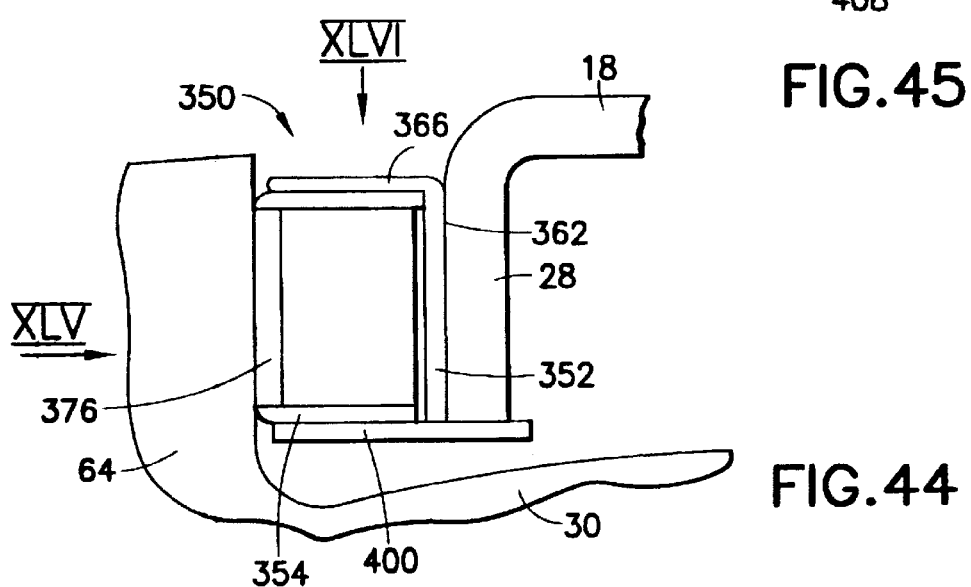
FIG. 44 is a partial axial view of an alternative embodiment of a subassembly for generating a return force.
Figure 46:
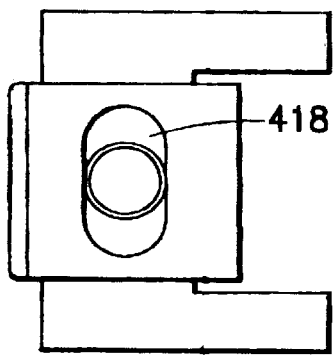
FIG. 46 is a view of the subassembly of FIG. 44 along the direction XLVI in FIG. 44.
Figure 47:
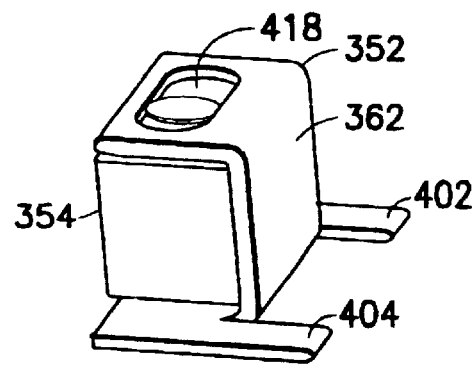
FIG. 47 is a perspective view of the subassembly of FIG. 44.
Figure 48:
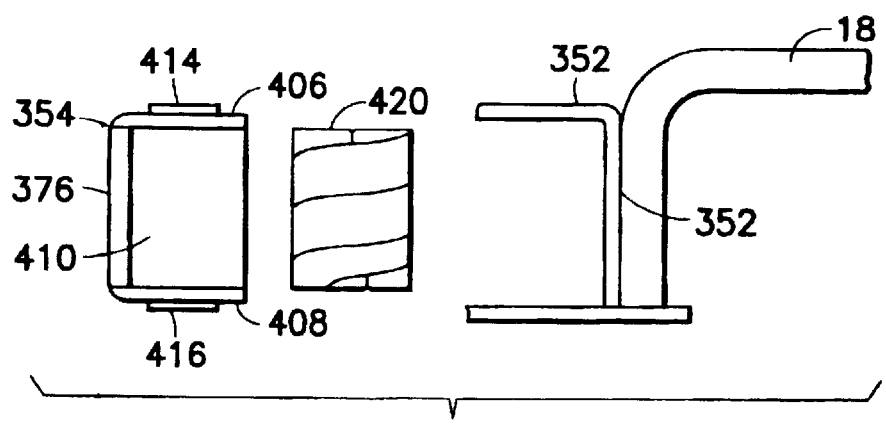
FIG. 48 is an exploded axial view of the subassembly of FIG. 44.

Referring to FIG. 44, the two body portions 362, 376 of the first and second housing elements 352, 354 bear on a tab portion 28 or a return projection 64 or 66 and therefore generate the necessary return force when a torque is introduced and at the same time compression of the spring element 420 is induced. In the design of the embodiment of FIGS. 44–48, return units 350 of this type are provided separately in each case for the pressure plate 30 and for the intermediate plate 32. The portions 400 of adjacent ones of the return units 350 bear laterally on one another and these two return units 350 which succeed one another in the axial direction being thereby retained in the axial direction between the housing 12 and the flywheel 22.

Figure 49:
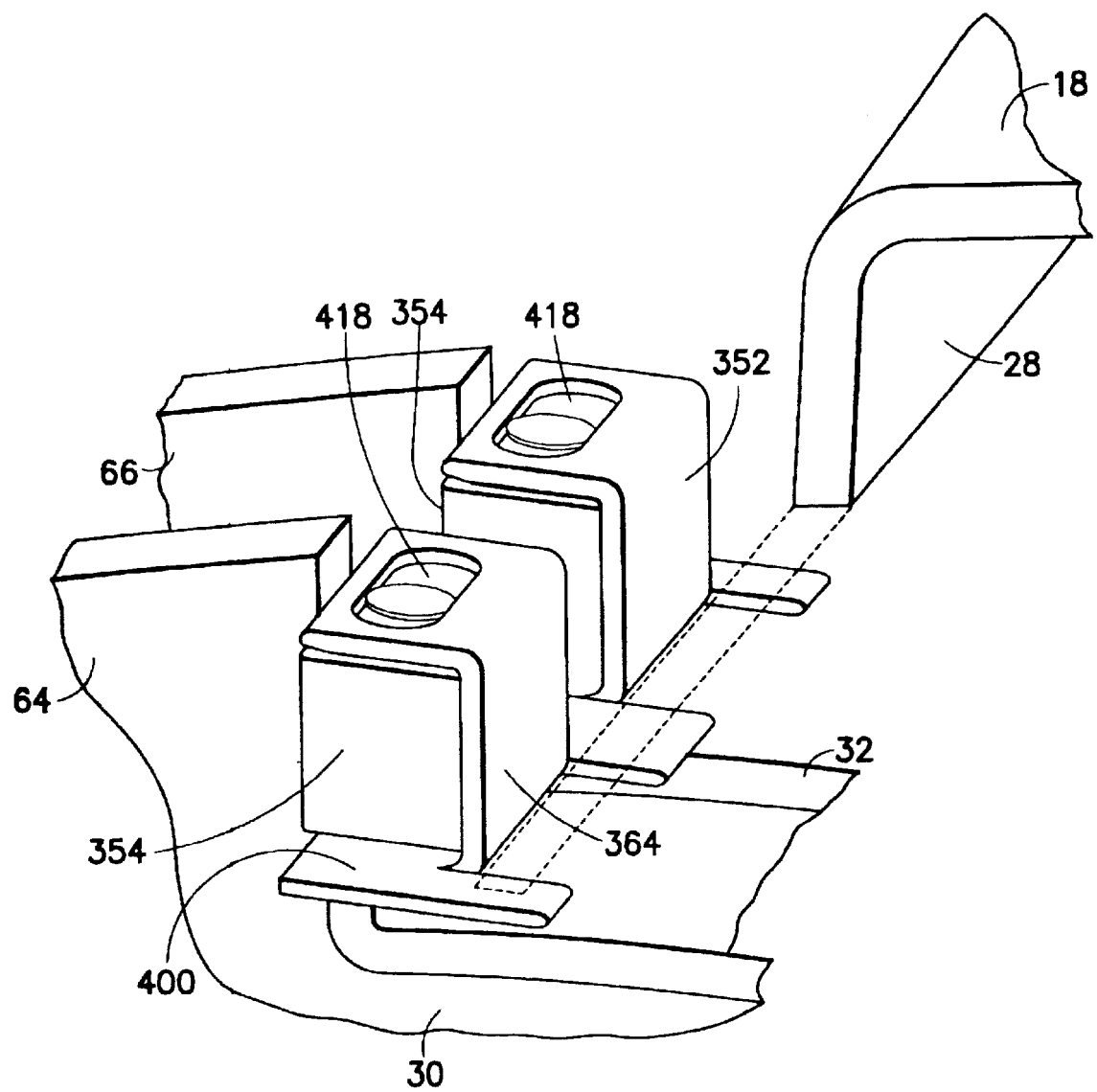
FIG. 49 is an alternative embodiment of the subassembly of FIG. 44.

In the design of a further embodiment of FIG. 49, the first housing element 352 has a configuration such that it is assigned both to the pressure plate 30 and to the intermediate plate 32 and ultimately has two body portions 362 and the associated components or portions. Here, there is a single radially inner portion 400 which can then be retained in the axial direction between the flywheel 22 and the housing 12.

The return units 350 of FIGS. 44–49 are assembled such that the spring element 420 is first inserted into the second housing element 354 and the second housing element 354 is then snapped with its mounting portions 414, 416 into the associated elongate orifices 418. The axial movement necessary in the operation of engaging and disengaging a friction clutch equipped with units of this type is ensured by the elongate design of the elongate orifices 418 and the elastic deformability of the tubular spring 420.

Referring to the return units 350 of the embodiments of FIGS. 34–49, it may also be noted that these can be provided in each case as premounted subassemblies which make it easier for a friction clutch to be assembled. Two units of this type are then provided, assigned to each return projection of the pressure plate 30 or of the intermediate plate 32, and then ensure that the return force may act in both circumferential directions.

It should be pointed out that, in the clutch 10 according to the present invention, a plurality of intermediate plates may also be provided, in which case this plurality of intermediate plates may all be designed as can be seen in the figures with regard to the intermediate plate 32. Springs providing the necessary lifting movement may then likewise be provided between the individual intermediate plates. Furthermore, instead of the flywheel 22, a different abutment arrangement, for example a disk-like abutment arrangement, may also be provided, so that the configuration of a lamellar clutch capable of being used, for example, in sports racing may ultimately be obtained.

Figure 50:
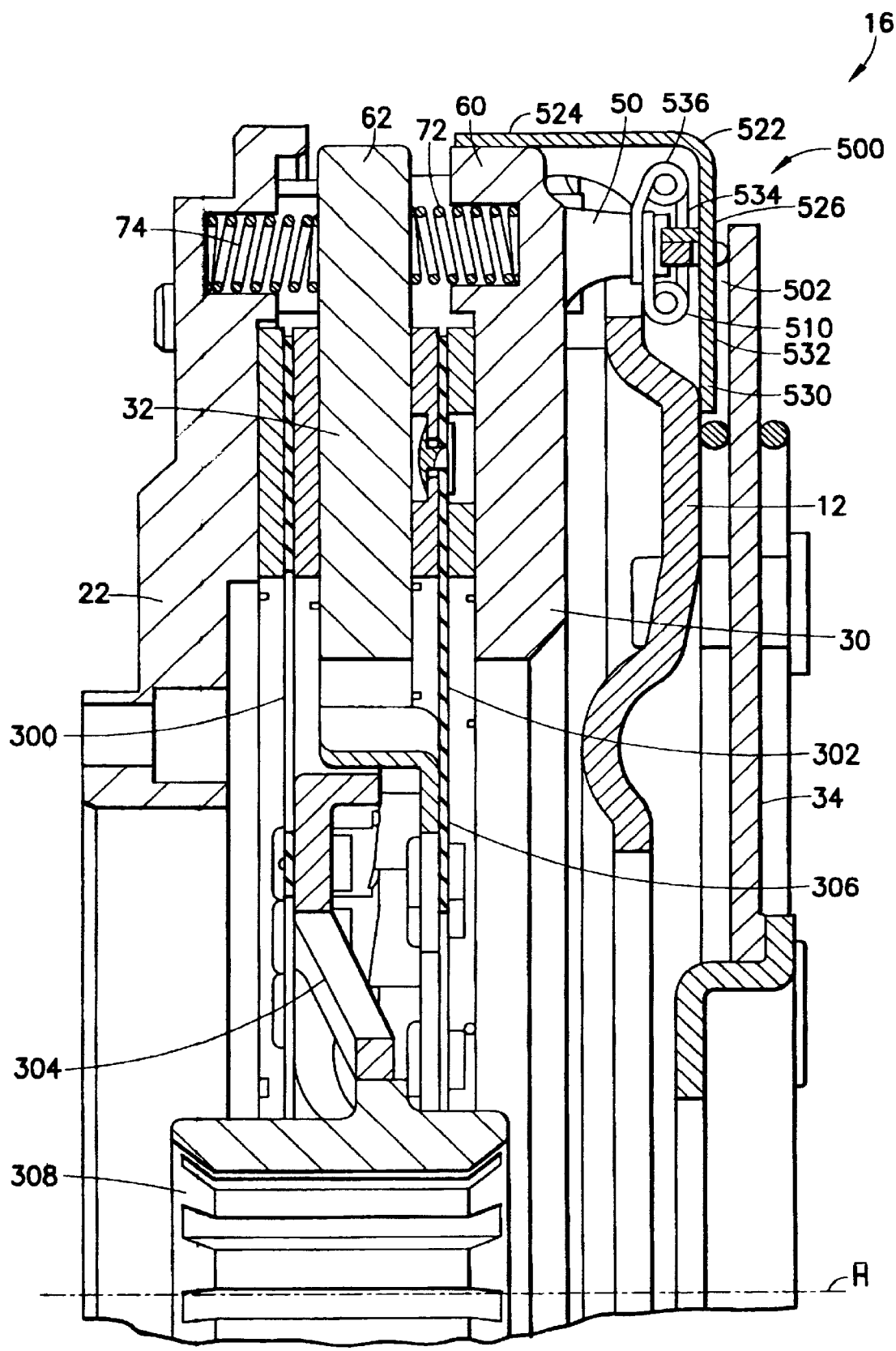
FIG. 50 is a partial longitudinal sectional view of further embodiment of the clutch according to the present invention including a wear compensation arrangement.
Figure 51:
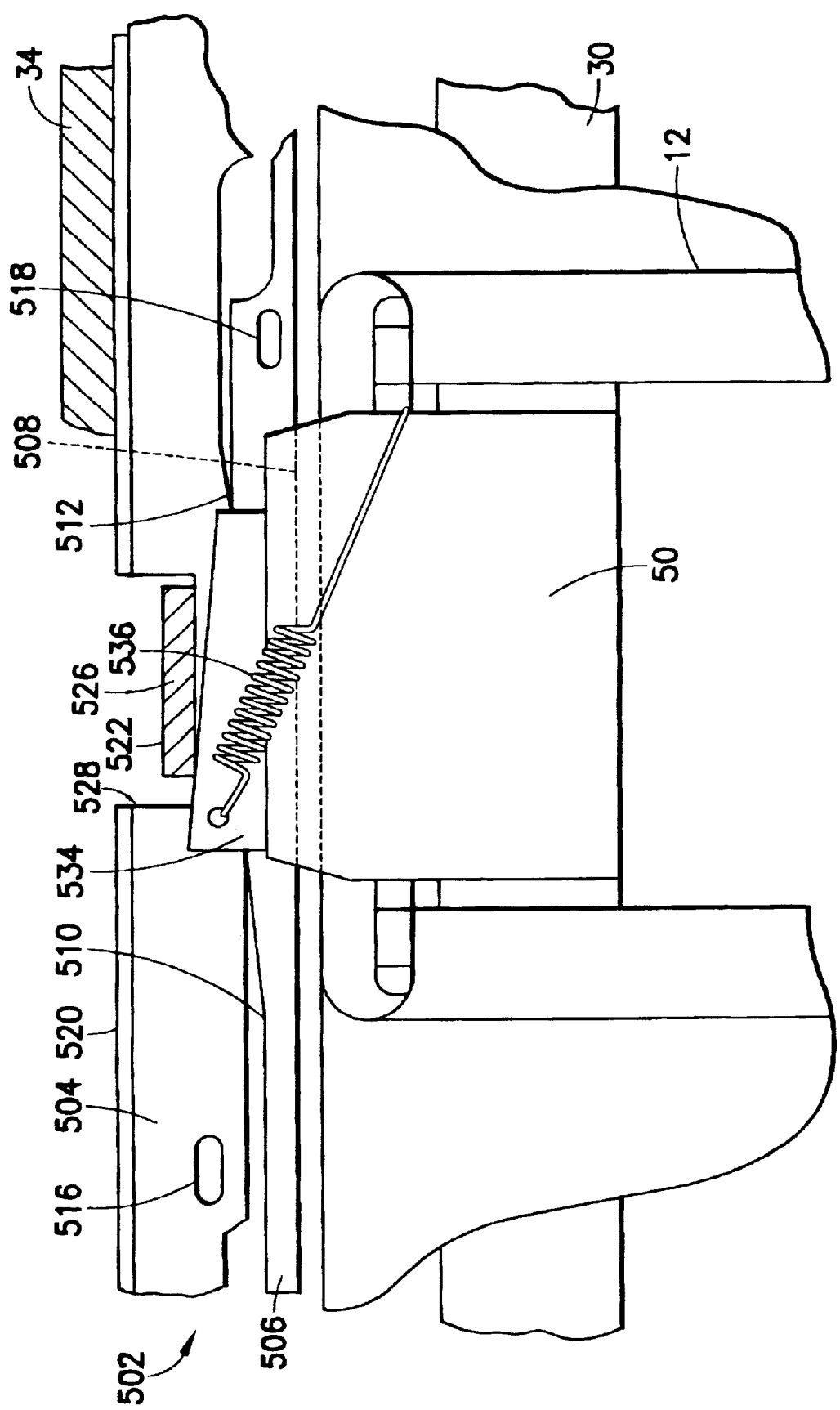
FIG. 51 is a detailed view of the wear compensation arrangement of FIG. 50 from the radial outer side of the clutch.

Further embodiments of the friction clutch 10 according to the present invention are described below with reference to FIGS. 50 to 59. In these embodiments, it is additionally possible to compensate for wear in the region of friction linings of the clutch disks 300, 302 which is produced during operation. The embodiment in FIGS. 50 and 51 shows a wear-compensation arrangement 500 arranged in the force-support path between the radially outer region of the diaphragm spring 34 and the support projections 50 of the pressure plate 30. The wear-compensation arrangement 500 comprises a wear-adjustment device 502 and comprises first and second wear-adjustment rings 504, 506. A side of the second wear-adjustment ring 506 facing toward the pressure plate 30 rests on a respective guide groove or guide sections 508 on the support projections 50 which extend in the circumferential direction. Accordingly, the second wear-adjustment ring 506 is movable in the circumferential direction with respect to the support projections 50. The first wear-adjustment ring 504 rests axially on the second wear-adjustment ring 506 and a surface 520 on a side of the first wear-adjustment ring 504 remote from the second wear-adjustment ring 506 is acted on by the force accumulator 34. The surface regions of the first and second wear-adjustment rings 504, 506 which face toward one another and bear against one another have respective associated inclined or wedge surface regions 510, 512. A rotary movement (to be described in more detail below) of the second wear-adjustment ring 506 about the axis of rotation A relative to the first wear-adjustment ring 504 causes the inclined surfaces 510, 512 to slide along one another and thereby change the axial dimension of the wear-adjustment device 502 including the first and second wear-adjustment rings 504, 506. For example, if the second wear-adjustment ring 506 in FIG. 51 rotates away to the left, the overall axial dimension of the wear-adjustment device 502 increases. One or more preloading springs 514 may be arranged between the first and second wear-adjustment rings 504, 506. The end regions of these preloading springs 514 may be suspended in respective openings 516, 518 in the first and second wear-adjustment rings 504, 506 and for the springs ultimately to extend on the inner circumferential side of these rings. Alternatively, one end region of the preloading springs 514 may be suspended from the second wear-adjustment ring 506 while the other end region of the preloading spring 514 may be supported on the support projection 50 (see FIG. 50). The spring 514 ensures that the second wear-adjustment ring 506 which is displaceable in the circumferential direction is preloaded toward a wear-adjustment direction, i.e. a circumferential direction of rotation, a movement in the wear-adjustment direction then resulting in the discussed axial displacement of the first wear-adjustment ring 504 and of the surface 520 which bears against the force accumulator 34.

The wear-compensation arrangement 500 according to the present invention further comprises a blocking/detection element 522. In the embodiment illustrated, the blocking/detection element 522 comprises a sheet-metal part which is bent off substantially at right angles and is fixed to the radially outer region of the pressure plate 30 via a limb section 524 extends substantially in the axial direction. A blocking section 526 of the blocking/detection element 522 acts on the wear-adjustment device 502 by resting axially on the first wear-adjustment ring 504 and may, for example, engage a recess 528 in the first wear-adjustment ring 504. Accordingly, the blocking device simultaneously forms a rotation-preventing means for the first wear-adjustment ring 504. Due to the elasticity of the blocking/detection element 522, this element bears against the adjustment ring 504 under a preloading force in the axial direction via the blocking section 526. Even in the disengaged position of the friction clutch 10, i.e. in the absence of force acting on the first wear-adjustment ring 504 through the force accumulator 34, the first wear-adjustment device 502 is fundamentally blocked from carrying out a wear compensation operation. In the disengaged position, the only action is from the preloading force of the lifting springs 74, 72.

If the friction linings of the clutch disks 300, 302 become worn during operation in the engaged position of the friction clutch 10, the pressure plate 30 and also the intermediate plate 32 will move closer to the flywheel 22 in the axial direction. During this movement, the limb section of the blocking/detection element 522 which is fixed to the pressure plate 30 will also be displaced in the axial direction until a detector section 530 on the radially inner end region of the other limb section 532 of the blocking/detection element 522 comes into contact with the housing 12. The detection section 530 of the blocking/detection element 522 detects the wear-induced displacement of the pressure plate 30 with respect to the housing 12. During the displacement, the detection section 530 abuts the housing 12 and therefore during further movement of the pressure plate 30 toward the flywheel 22 the elastically deformable blocking/detection element 522 is deformed so that its blocking section 526 is lifted off the first wear-adjustment ring 504. However, in the engaged position of the clutch, the first wear-adjustment ring 504 is acted on by the diaphragm spring 34, so that it is impossible for any rotary movement of the second wear-adjustment ring 506 induced by the spring 514 to take place.

As long as the clutch 10 remains in the engaged position and therefore the pressure plate 30 remains in its closest position to the flywheel 22, the blocking section 526 also remains lifted off the first wear-adjustment ring 504. The axial play which forms between these two elements (see FIG. 50) can then be compensated for during a subsequent clutch release operation. To ensure that the space between the first wear-adjustment ring 504 and the blocking section 526 is maintained but can be compensated for during the reduction of force acting on the wear-adjustment device 502 when the clutch is released and the resultant axial displacement of the pressure plate 30 toward the housing 12 takes place, a locking element 534 is assigned to the blocking/detection element 522. As shown in FIG. 51, the locking element 534 is arranged on the support projection 50 such that the locking element 534 is moveable in the circumferential direction and is under preloading from a preloading spring 536. The preloading spring 536 is suspended from the support projection 50 on one side and from the locking element 534 on the other side and acts on the locking element 534 to move the locking element 534 in the circumferential direction, i.e. substantially transversely with respect to the limb section 532 of the blocking/detection element 522. The locking element 534 is wedge-shaped with a thickness which changes in its direction of movement. Because of this configuration and due to the preloading via the spring 536, the inclined wedge surface of the locking element 534 is always preloaded so that it bears against either the blocking section 526 or the limb section 532. If, as described above, wear occurs and the limb section 532 is displaced in the axial direction with respect to the pressure plate 30, which ultimately also means an axial movement with respect to the support projections 50, the locking element 534 which is under spring preloading will immediately push into the enlarged space and prevent a return movement of the limb section 532 even if the pressure plate 30 subsequently moves onto the housing 12. The locking element 534 therefore ensures that the limb section 532, in particular the blocking section 526, remains lifted off the first wear-adjustment ring 504 by the amount corresponding to the level of wear. When the force exerted on the pressure plate 30 by the force accumulator or the diaphragm spring 34 is then reduced during the clutch release operation, the second wear-adjustment ring 506 rotates under preloading from the spring 514, with the result that, as mentioned above, the first wear-adjustment ring 504 is displaced in the axial direction, specifically until it once again comes into contact with the blocking section 526.

Accordingly, FIGS. 50 and 51 show a design of a wear-compensation arrangement 500 with two adjustment rings which extend in the circumferential direction around the axis of rotation A and are preloaded to execute a rotary movement with respect to one another via at least one preloading spring. In this embodiment, a single blocking/detection element and a single associated locking element are sufficient. However, it is of course possible for a plurality of such elements to be distributed over the circumference. Furthermore, it should also be pointed out that the detection section 530 could, of course, also detect the wear with respect to the force accumulator 34 via appropriate interaction through contact, since the pressure plate 30 also moves with respect to the force accumulator 34 in the event of wear.

The wear-compensation arrangement 500 ensures that the wear to all the clutch disks 300, 302 may be compensated for, irrespective of whether the clutch is designed as a single-disk clutch or as a multidisk clutch, since this wear will be reflected in an overall axial movement of the pressure plate 30. The wear-compensation arrangement 500 according to the present invention may be used in particular with a diaphragm spring located outside the housing and compensates for wear irrespective of which of the clutch disks the wear occurs. That is, uneven wear to various clutch disks is compensated for.

Figure 52:
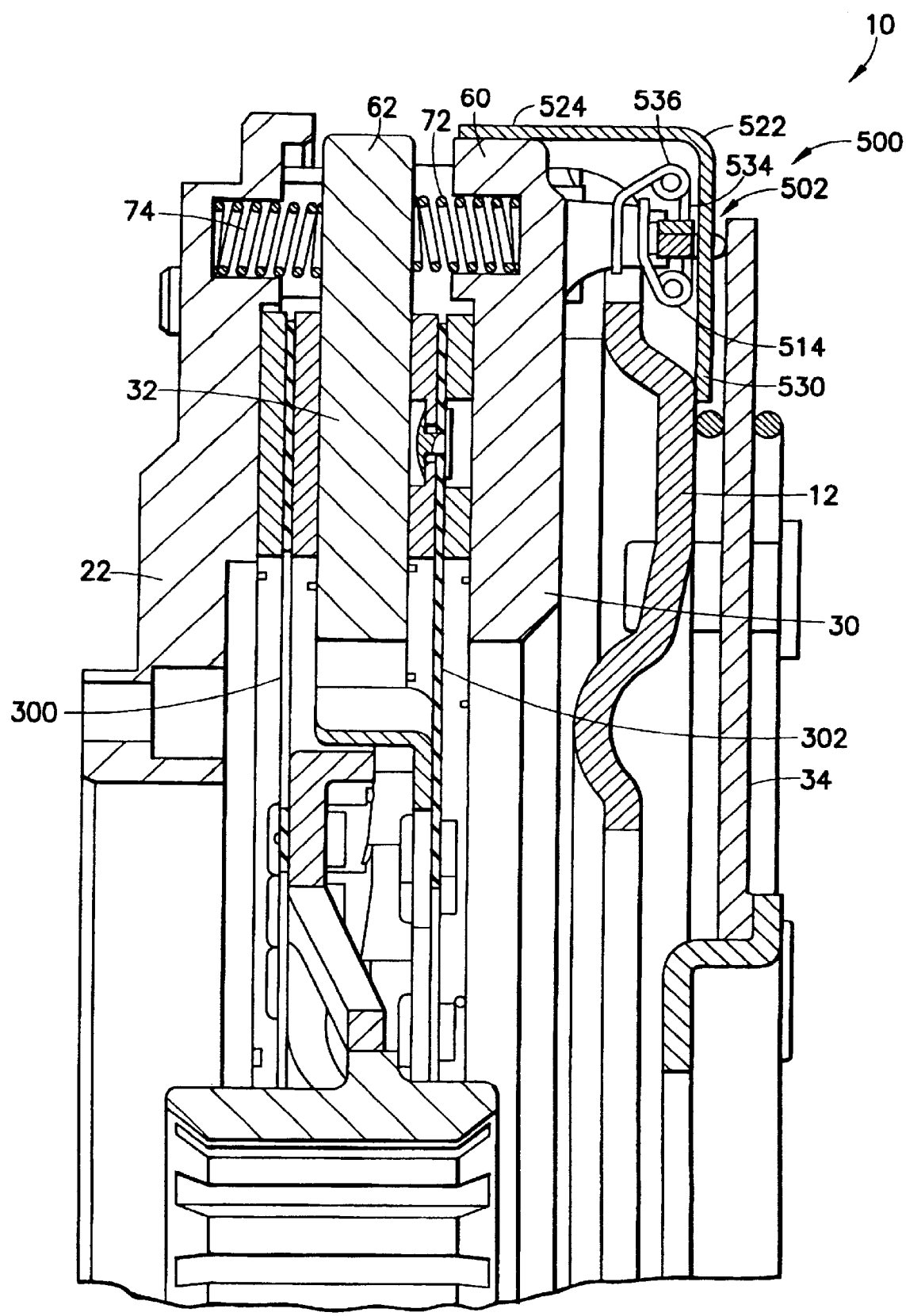
FIG. 52 is a partial longitudinal sectional view of a clutch with another embodiment of a wear compensation arrangement according to the present invention.
Figure 53:
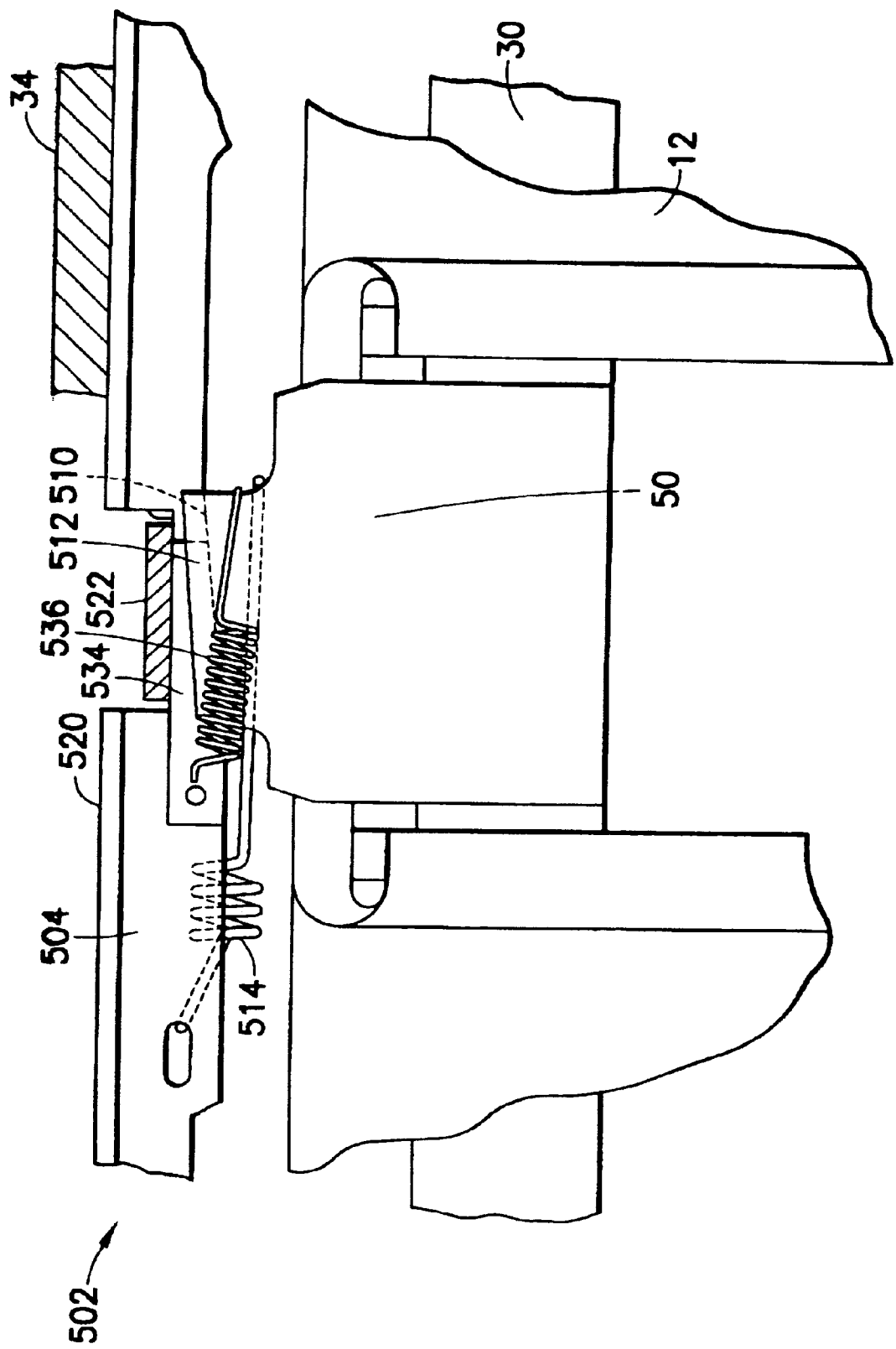
FIG. 53 is a detailed view of the wear compensation arrangement of FIG. 52 from the radial outer side of the clutch.

In the embodiment of the wear-compensation arrangement shown in FIGS. 52 and 53, the wear-adjustment device 502 comprises only a single adjustment ring 504 with an axial end face 520 on which the force accumulator 34 bears. An end side of the adjustment ring 504 facing the pressure plate 30 has inclined surfaces or wedge surfaces 512. Complementary wedge surfaces 510 are formed on the respective support projections 50 having an axial dimension which varies along the circumferential direction and are therefore formed with the wedge surfaces 510. The locking element 534 in this embodiment is displaceable on the wedge surface 510. The locking element 534 may comprise a corresponding mating wedge surface bearing against the blocking/detection element 522 with full surface-to-surface contact or the locking element may also be of wedge-shaped design. In this embodiment, a single blocking/detection element 522 is sufficient to prevent undesirable rotation of the adjustment ring 504 when there is no wear or wear which has already been compensated for.

The advantage of this embodiment is that the wear-adjustment device 502 may comprise a simpler structure and that the support projections 50 which are provided with corresponding inclined surfaces may be produced in a simple manner via a milling operation.

The operation of the embodiment of the wear-compensation arrangement 500 illustrated in FIGS. 52 and 53 corresponds to the embodiment which has already been extensively described above.

Figure 54:
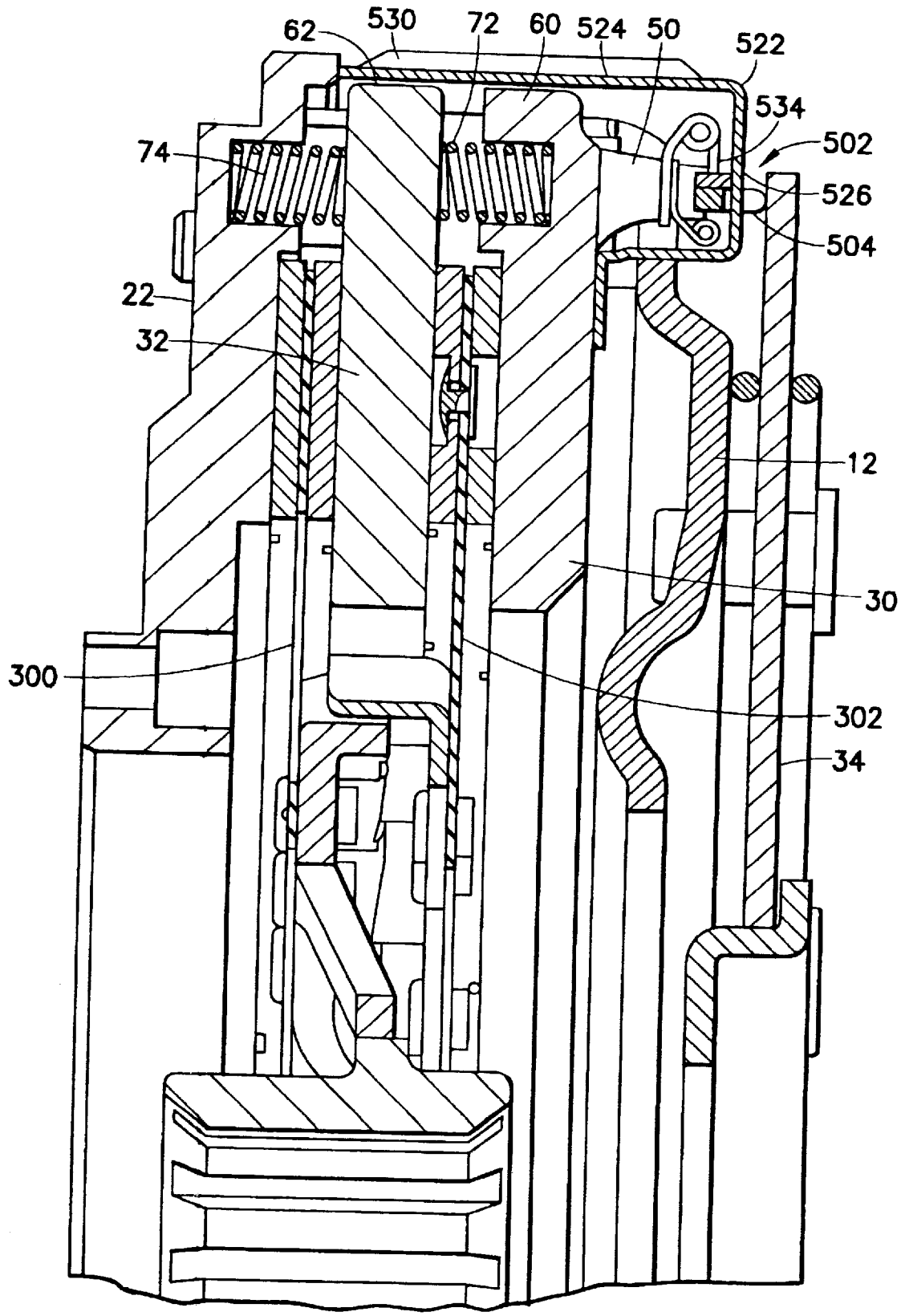
FIG. 54 is a partial longitudinal sectional view of a clutch with another embodiment of a wear compensation arrangement according to the present invention.
Figure 55:
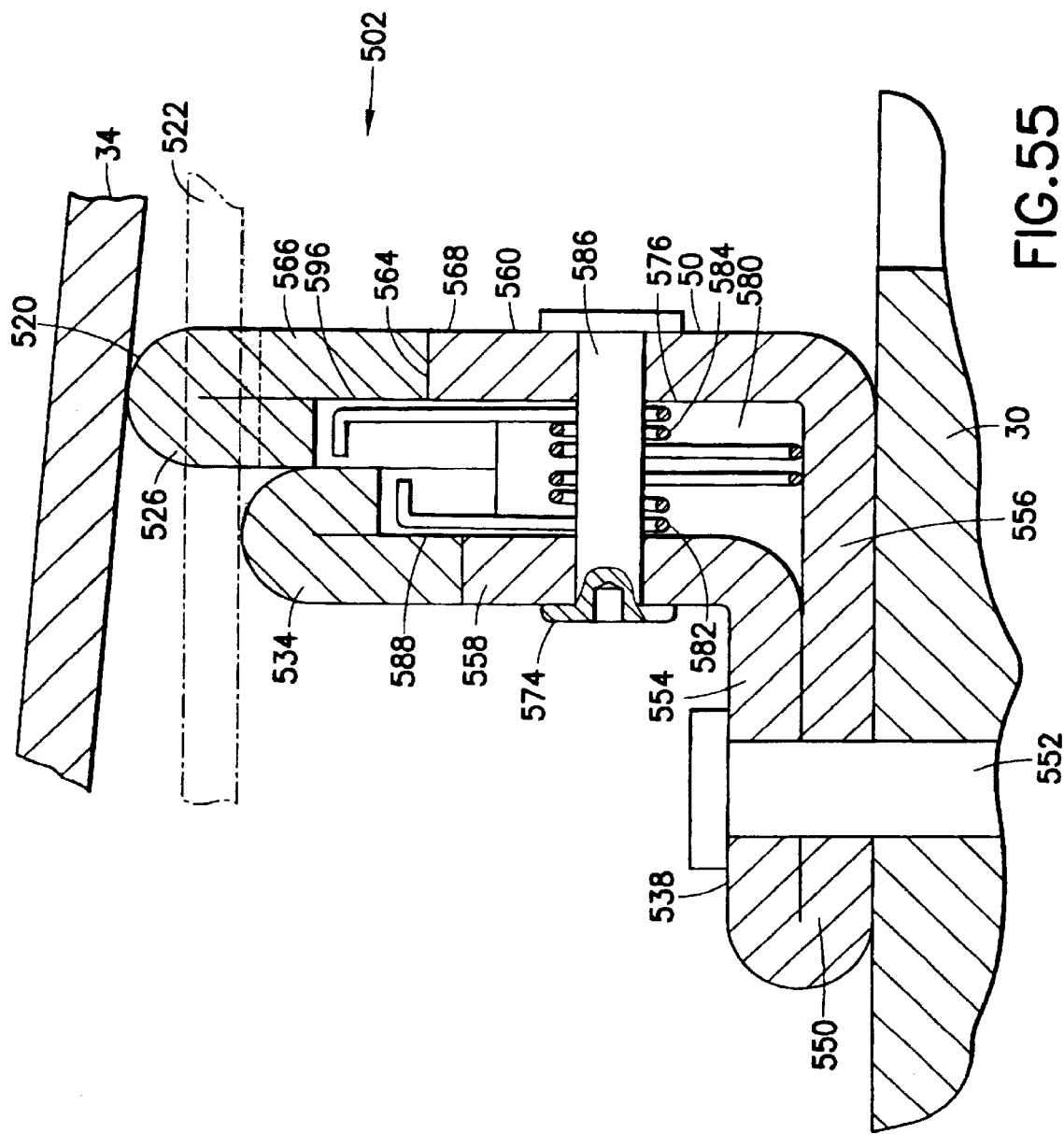
FIG. 55 is a detailed longitudinal sectional view of another embodiment of a support projection and a wear compensation arrangement according to the present invention.

FIG. 54 shows a further embodiment of the wear-compensation arrangement in which the blocking/detection element 522 detects wear with respect to the flywheel 22. In this embodiment, the blocking/detection element 522 comprises an approximately U-shaped contour and is fixed to the pressure plate 30, for example by welding or screwing, at a location radially inside the wear-adjustment device 502. The blocking/detection element 522 is designed to interact with the wear-adjustment device 502 via a bottom section of the U-shaped contour. The bottom section of the U-shaped contour of the blocking/detection element 522 extends radially outward and substantially forms the blocking section 526. The limb section 524 is the radially outer limb of the blocking/detection element 522 and extends approximately in the axial direction radially outside the pressure plate 30 or the intermediate plate 32. The limb section 524 is substantially flexurally rigid and extends toward the flywheel 22. Therefore, during wear which causes an axial displacement of the pressure plate 30 toward the flywheel 22, the limb section abuts the flywheel 22 and the axial movement of the pressure plate 30 causes the blocking section 526 to lift off from the wear-adjustment device 502. In this embodiment, the detection section 530 is arranged at the axial end region of the limb section 524 facing the flywheel 22.

Otherwise, it should be noted that this embodiment substantially corresponds to the embodiment described with reference to FIGS. 52 and 53, in which only a single wear-adjustment ring 504 is provided.

FIGS. 55 through 59 show an embodiment in which the support projection 50 (preferably all the support projections 50 of the pressure plate 30) is formed from a separate component obtained by stamping and bending sheet-metal material. The sheet-metal part is bent such that a radially inwardly engaging section 550 thereof is attached to the pressure plate 30 via a rivet bolt 552 or the like. This engaging section 550 is formed by two limb sections 554, 556 of the support projection 50 which bear against one another and are axially bent off at different radial positions to form first and second axial projections 558 and 560. These first and second axial projections 558, 560 are separated by a radial distance from one another.

Figure 56:
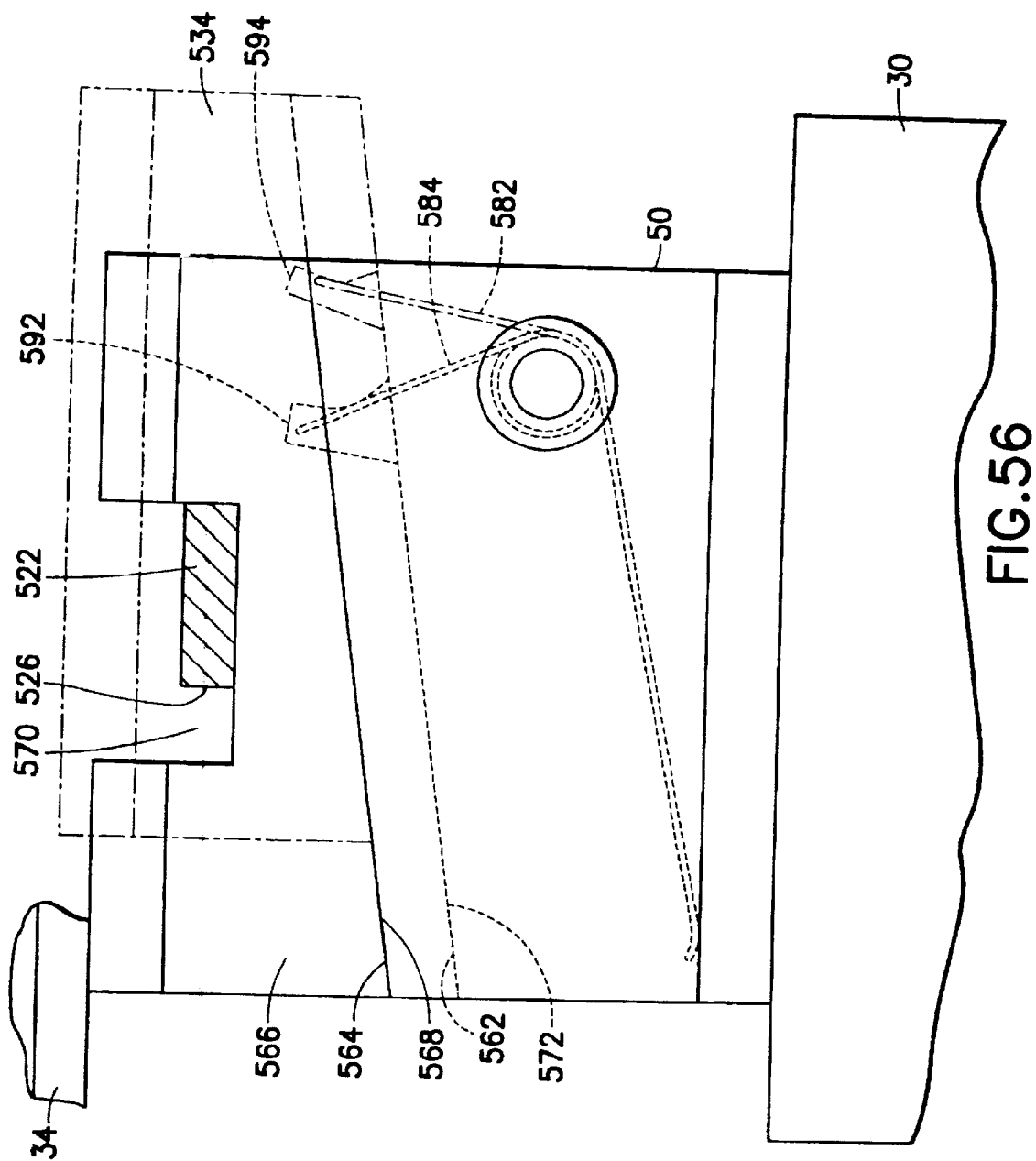
FIG. 56 is a detailed view of the wear compensation arrangement of FIG. 55 from the radial outside.
Figure 57:
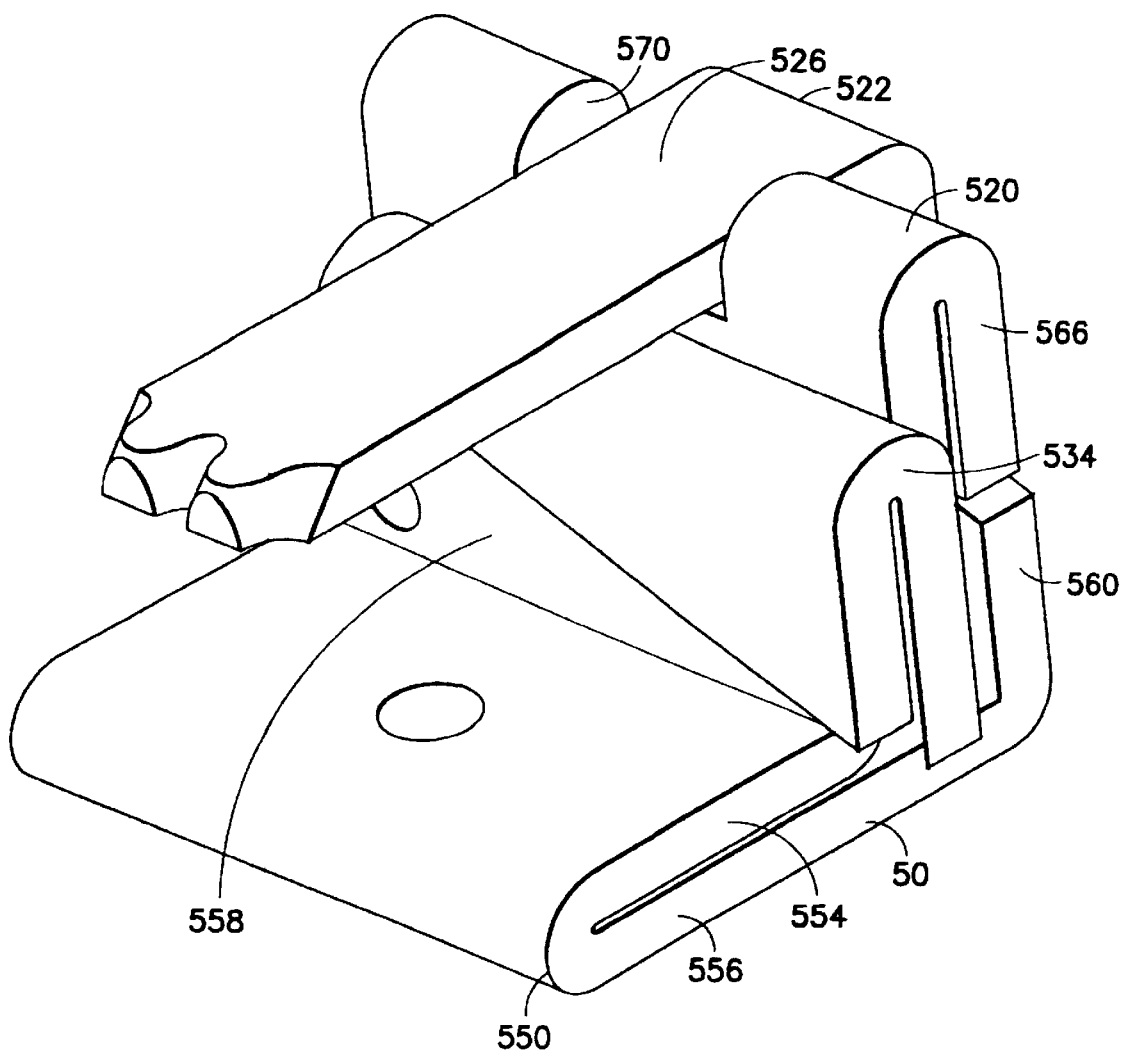
FIG. 57 is a perspective view of the support projection and the wear compensation arrangement of FIG. 55.
Figure 58:
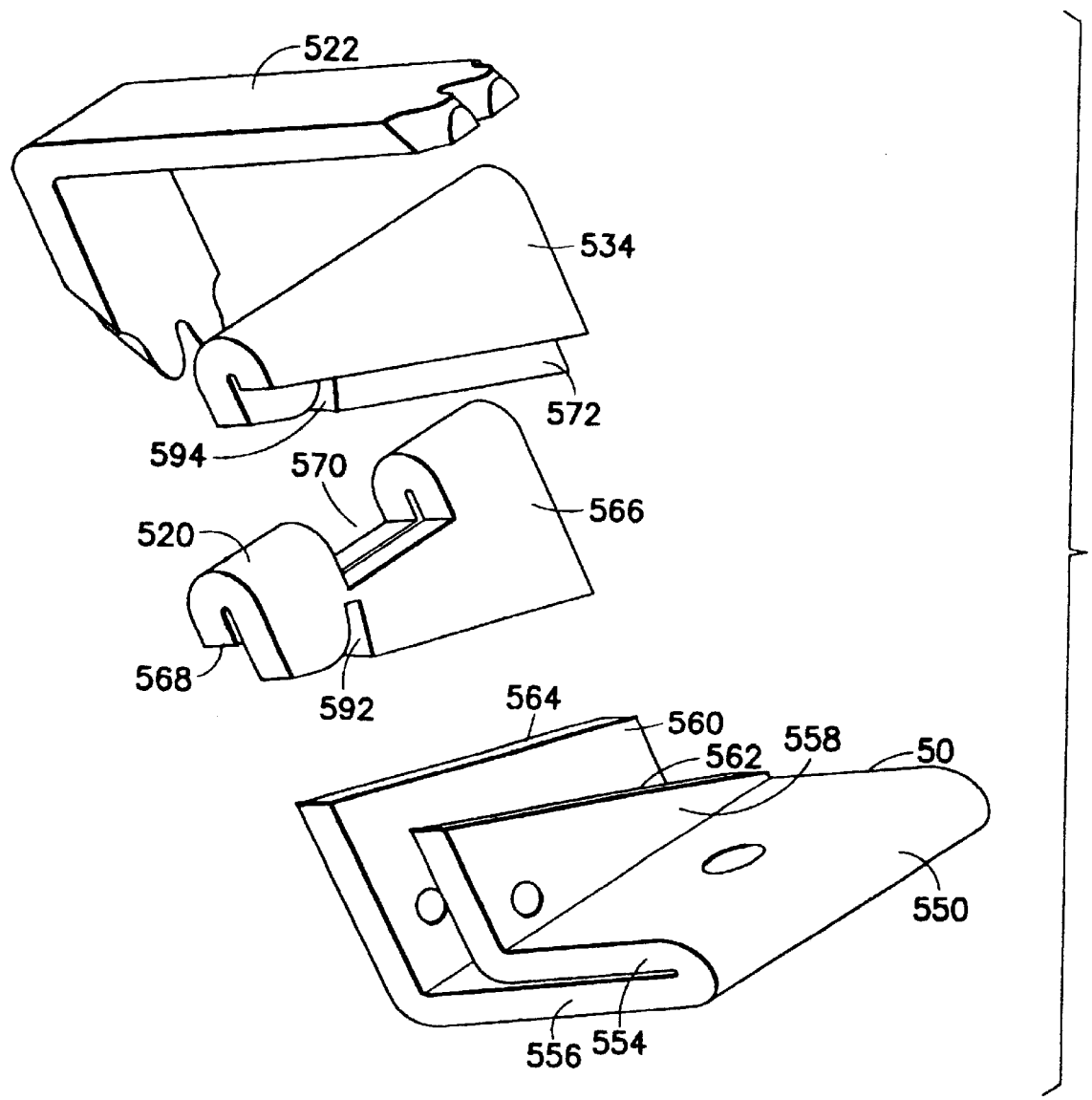
FIG. 58 is an exploded perspective view of the support projection and wear compensation arrangement of FIG. 55.
Figure 59:
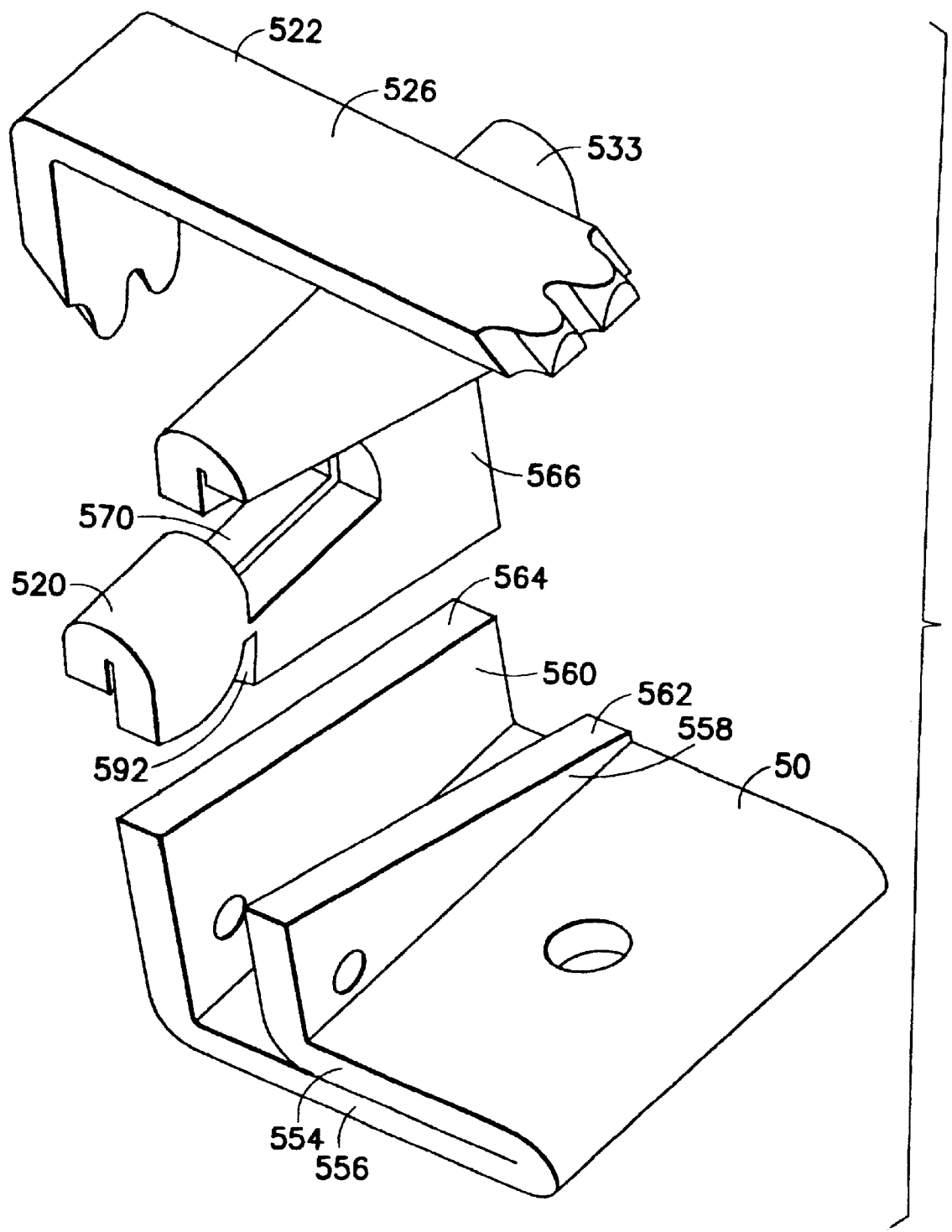
FIG. 59 is another exploded perspective view of the support projection and wear compensation arrangement of FIG. 55.

The first and second axial projections 558, 560 comprise respective inclined surfaces 562, 564 which extend approximately in the circumferential direction and have different axial positions. An adjustment element 566 with a corresponding inclined surface 568 is arranged displaceably on the inclined surface 564 of the second axial projection 560. Accordingly, movement of the adjustment element 566 in the circumferential direction changes the axial position of the adjustment element 566 as a result of the inclined surfaces 564, 568 sliding along one another. The surface 520 of the adjustment element 566 which interacts with the force accumulator 34 also moves with the adjustment element 566. Referring to FIG. 56, the blocking/detection element 522 in this embodiment engages a recess 570 in the adjustment element 566 via the blocking section 526 to provide access for the force accumulator 34. However, the recess 570 must comprise circumferential play to allow movement of the adjustment element 566 in the circumferential direction and along the inclined surface 564 of the second axial projection 560.

The locking element 534 of this embodiment moves on the inclined surface 562 of the first axial projection 558 via a complementary inclined surface 572 so that a movement of the locking element 534 in the circumferential direction also causes a corresponding axial displacement thereof.

Both the locking element 534 and the adjustment element 566 are under preloading force from respective spring elements 574, 576, so that the locking element 534 and the adjustment element 566 are preloaded to move in the circumferential direction which causes an axial movement away from the pressure plate 30.

The two spring elements 574, 576 may, for example, comprise leg spring elements. First leg regions 578, 580 of the spring elements 574, 576 may, for example, be supported on the support projection 50 with respetive coiled sections 582 or 584 surrounding a bolt 586 passing through the first and second axial projections 558, 560. Second leg sections 588, 590 of the springs 574, 576 are supported in respective notch-like recesses 592, 594 in the adjustment element 566 and the locking element 534.

It should be noted that in the embodiment of FIGS. 55–59, the blocking/detection element 522 may comprise any of the embodiments described above. If the blocking section 526 of this blocking/detection element 522 is lifted off from the adjustment element 566 in the axial direction, the locking element 534 first moves in the circumferential direction to maintain the set axial play between the blocking section 526 and the adjustment element 566. During the subsequent clutch release operation, the adjustment element 566 then moves in the axial direction under preloading from the spring element 576 until it contacts the blocking section 526.

The locking element 534 and the adjustment element 566 are likewise formed by bending a piece of sheet metal, so that two adjacent limb regions are formed, at a first of which the respective inclined surfaces are formed and at a second of which the respective notch-like recesses 594 and 592 are formed. The limb regions which have the respective notch cutouts engage sufficiently far radially inward to rest between the first and second axial projections 558, 560, thereby guiding the movement for the locking element 534 and the adjustment element 566 and providing support in the radially outward direction.

The embodiment of FIGS. 55 to 59 has the significant advantage that there is no need to fit an adjustment ring or the like between the diaphragm spring 34 and the housing 12 which saves space in the axial direction. To achieve an adjustment action which is uniform over the circumferential region, an arrangement of this type may be provided for each of the support projections 50. Each adjustment element 566 of the wear-adjustment device 502 is to be assigned a blocking/detection element 522 which detects the wear with respect to the housing 12, with respect to the flywheel 22 or even with respect to the force accumulator 34. This embodiment may be of modular design and fitted as a unit to the pressure plate 30.

The angles of inclination of the various inclined surfaces 562, 564 may differ according to the nature of the forces which arise in operation. In principle, the locking element 534 may comprise a wedge shape which can be seen in FIG. 51 instead of having the inclined surface 562. Furthermore, it is in principle conceivable for the individual locking elements 534 and/or adjustment elements 566 to be designed as a cohesive ring which, for example, provides a bearing surface 520 which is continuous in the circumferential direction and from which the tab-like sections and the sections having the respective surfaces and notches are then bent off. The result is a very small adjustment ring in which the ring sections connecting the individual adjustment elements only have to be sufficiently wide to ensure that they can transmit the circumferential force generated by the associated spring element.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

We claim:

1. A pressure plate subassembly for arrangement in a friction clutch having an abutment arrangement and at least one clutch disk with friction linings, said pressure plate subassembly comprising:
   a housing rotatable about an axis of rotation and connectable to the abutment arrangement of the friction clutch for joint rotation about the axis of rotation;
   a pressure plate operatively arranged in said housing so that said pressure plate is rotatable with said housing about the axis of rotation and is axially displaceable relative to said housing, wherein said housing comprises a rotational coupling recess and said pressure plate comprises a first rotational coupling projection extending essentially radially outward and engaging said rotational coupling recess such that said pressure plate is displaceable in the direction of the axis of rotation and has a first circumferential direction movement play relative to said housing;
   a force accumulator for generating a pressure force between said pressure plate and said housing, said force accumulator being supported on said housing and on said pressure plate wherein said force accumulator is arranged outside said housing; and
   a return arrangement operatively arranged relative to the rotational coupling recess for urging said first rotational coupling projection into a position in which there is essentially no mutual bearing contact between said first rotational coupling projection and said circumferential sides of said rotational coupling recess, wherein said housing comprises a further recess and said pressure plate further comprises a return projection which extends essentially radially outward and which engages said further recess such that said return projection is displaceable in the direction of the axis of rotation and has a second circumferential direction movement play relative to said housing, said return arrangement comprising a return force generating element acting between said return projection and said housing for prestressing one of said return projection and said first rotational coupling projection into a central position relative to the circumferential direction such that said first rotation coupling projection does not bear on the circumferential sides of said rotation coupling recess.

2. The pressure plate subassembly of claim 1, wherein said force accumulator is arranged on a side of said housing that faces away from said pressure plate.

3. The pressure plate subassembly of claim 1, further comprising at least one force accumulator support region arranged on said pressure plate such that said at least one force accumulator support region passes through an orifice in said housing and is positioned for receiving the pressure force generated by said force accumulator.

4. The pressure plate subassembly of claim 3, wherein said at least one force accumulator support region on said pressure plate comprises a surface region that is one of oblique and contoured relative to a radial direction and a circumferential direction of said housing.

5. The pressure plate subassembly of claim 3, wherein at least one force accumulator support region comprises a plurality of force accumulator support regions arranged on said pressure plate and succeeding one another in a circumferential direction on said pressure plate.

6. The pressure plate subassembly of claim 1, wherein said first circumferential direction movement play is smaller than said second circumferential direction movement play.

7. The pressure plate subassembly of claim 1, wherein said return force generating element comprises a tube spring element arranged on the two circumferential sides of said return projection and supported relative to said housing and said return projection.

8. A pressure plate subassembly for arrangement in a friction clutch having an abutment arrangement and at least one clutch disk with friction linings, said pressure plate subassembly comprising:
   a housing rotatable about an axis of rotation and connectable to the abutment arrangement of the friction clutch for joint rotation about the axis of rotation;
   a pressure plate operatively arranged in said housing so that said pressure plate is rotatable with said housing about the axis of rotation and is axially displaceable relative to said housing, wherein said housing comprises a rotational coupling recess and said pressure plate comprises a first rotational coupling projection extending essentially radially outward and engaging said rotational coupling recess such that said pressure plate is displaceable in the direction of the axis of rotation and has a first circumferential direction movement play relative to said housing;
   a force accumulator for generating a pressure force between said pressure plate and said housing, said force accumulator being supported on said housing and on said pressure plate wherein said force accumulator is arranged outside said housing; and
   a tube spring element arranged on the two circumferential sides of said return projection and supported relative to said housing and said return projection.

9. A pressure plate subassembly for arrangement in a friction clutch having an abutment arrangement and at least one clutch disk with friction linings, said pressure plate subassembly comprising:
   a housing rotatable about an axis of rotation and connectable to the abutment arrangement of the friction clutch for joint rotation about the axis of rotation;
   a pressure plate operatively arranged in said housing so that said pressure plate is rotatable with said housing about the axis of rotation and is axially displaceable relative to said housing;
   a force accumulator for generating a pressure force between said pressure plate and said housing, said force accumulator being supported on said housing and on said pressure plate wherein said force accumulator is arranged outside said housing;
   an intermediate plate arranged in said housing at an axial distance from said pressure plate, said intermediate plate being axially displaceable relative to said housing and being rotatable together with said housing about the axis of rotation wherein said housing comprises rotational coupling recess and said intermediate plate comprises a rotational coupling projection extending essentially radially outward and engaging said rotational coupling recess so that said intermediate plate is displaceable in the direction of the axis of rotation and has a first circumferential direction movement play relative to said housing; and a return arrangement operatively arranged relative to said rotational coupling recess for urging said rotational coupling projection into a position in which there is essentially no mutual bearing contact between said at least one rotational coupling projection and circumferential sides of said rotational coupling recess of said housing, wherein said housing comprises a further recess and said intermediate plate further comprises a return projection which extends essentially radially outward and which engages said further recess such that said return projection is displaceable in the direction of the axis of rotation and has a second circumferential direction movement play relative to said housing, said return arrangement comprising at least one return force generating element acting between said return projection and said housing for prestressing one of said return projection and said rotational coupling projection into a central position relative to the circumferential direction such that said rotational coupling projection does not bear on the circumferential sides of said rotation coupling recess.

10. The pressure plate subassembly claim 9, wherein said first circumferential direction movement play is smaller than said second circumferential direction movement play.

11. The pressure plate subassembly of claim 9, wherein said at least one return force generating element comprises a tube spring element arranged on the two circumferential sides of said return projection and supported relative to said housing and said return projection.

12. A pressure plate subassembly for arrangement in a friction clutch having an abutment arrangement and at least one clutch disk with friction linings, said pressure plate subassembly comprising:

a housing rotatable about an axis of rotation and connectable to the abutment arrangement of the friction clutch for joint rotation about the axis of rotation;

a pressure plate operatively arranged in said housing so that said pressure plate is rotatable with said housing about the axis of rotation and is axially displaceable relative to said housing;

a force accumulator for generating a pressure force between said pressure plate and said housing said force accumulator being supported on said housing and on said pressure plate wherein said force accumulator is arranged outside said housing;

an intermediate plate arranged in said housing at an axial distance from said pressure plate, said intermediate plate being axially displaceable relative to said housing and being rotatable together with said housing about the axis of rotation wherein said housing comprises rotational coupling recess and said intermediate plate comprises a rotational coupling projection extending essentially radially outward and engaging said rotational coupling recess so that said intermediate plate is displaceable in the direction of the axis of rotation and has a first circumferential direction movement play relative to said housing; and a tube spring element arranged on the two circumferential sides of the at least one return projection and supported relative to said housing and said return projection.

13. A pressure plate subassembly for arrangement in a friction clutch having an abutment arrangement and at least one clutch disk with friction linings, said pressure plate subassembly comprising:

a housing rotatable about an axis of rotation and connectable to the abutment arrangement of the friction clutch for joint rotation about the axis of rotation;

a pressure plate operatively arranged in said housing so that said pressure plate is rotatable with said housing about the axis of rotation and is axially displaceable relative to said housing, wherein said housing comprises a rotational coupling recess and said pressure plate comprises a first rotational coupling projection extending essentially radially outward and engaging said rotational coupling recess such that said pressure plate is displaceable in the direction of the axis of rotation and has a first circumferential direction movement play relative to said housing;

a force accumulator for generating a pressure force between said pressure plate and said housing, said force accumulator being supported on said housing and on said pressure plate wherein said force accumulator is arranged outside said housing;

an intermediate plate arranged in said housing at an axial distance from said pressure plate said intermediate plate being axially displaceable relative to said housing and being rotatable together with said housing about the axis of rotation, wherein said intermediate plate comprises a second rotational coupling projection which extends essentially radially outward, said second rotational coupling projection engaging said rotational coupling recess so that said intermediate plate is displaceable in the direction to the axis of rotation and has a first circumferential direction movement play relative to said housing; and a return arrangement operatively arranged relative to said rotational coupling recess for urging said first and second rotational coupling projections into a position in which there is essentially no mutual bearing contact between said first and second rotational coupling projections and said housing in the circumferential direction, wherein said housing comprises a further recess, said pressure plate comprises a first return projection and said intermediate plate comprises a second return projection, said first and second return projections extending essentially radially outward and engaging said further recess such that said first and second return projections are displaceable in the direction of the axis of rotation and have a second circumferential direction movement play relative to said housing, said return arrangement comprising at least one return force generating element acting between each of said first and second return projections and said housing for prestressing said first and second return projections and said first and second rotational coupling projections into a central position relative to the circumferential direction such that said first and second rotation coupling projections do not bear on the circumferential sides of said rotation coupling recess, wherein said first circumferential direction movement play is smaller than said second circumferential direction movement play.

14. A pressure plate subassembly for arrangement in a friction clutch having an abutment arrangement and at least one clutch disk with friction linings, said pressure plate subassembly comprising:

a housing rotatable about an axis of rotation and connectable to the abutment arrangement of the friction clutch for joint rotation about the axis of rotation;

a pressure plate operatively arranged in said housing so that said pressure plate is rotatable with said housing about the axis of rotation and is axially displaceable relative to said housing, wherein said housing comprises a rotational coupling recess and said pressure plate comprises a first rotational coupling projection extending essentially radially outward and engaging said rotational coupling recess such that said pressure plate is displaceable in the direction of the axis of rotation and has a first circumferential direction movement play relative to said housing;

a force accumulator for generating a pressure force between said pressure plate and said housing, said force accumulator being supported on said housing and on said pressure plate wherein said force accumulator is arranged outside said housing;

an intermediate plate arranged in said housing at an axial distance from said pressure plate, said intermediate plate being axially displaceable relative to said housing and being rotatable together with said housing about the axis of rotation, wherein said intermediate plate comprises a second rotational coupling projection which extends essentially radially outward, said second rotational coupling projection engaging said rotational coupling recess so that said intermediate plate is displaceable in the direction of the axis of rotation and has a first circumferential direction movement play relative to said housing; and a return arrangement operatively arranged relative to said rotational coupling recess for urging said first and second rotational coupling projections into a position in which there is essentially no mutual bearing contact between said first and second rotational coupling projections and said housing in the circumferential direction, wherein said housing comprises a further recess, said pressure plate comprises a first return projection and said intermediate plate comprises a second return projection, said first and second return projections extending essentially radially outward and engaging said further recess such that said first and second return projections are displaceable in the direction of the axis of rotation and have a second circumferential direction movement play relative to said housing, said return arrangement comprising at least one return force generating element acting between each of said first and second return projections and said housing for prestressing said first and second return projections and said first and second rotational coupling projections into a central position relative to the circumferential direction such that said first and second rotation coupling projections do not bear on the circumferential sides of said rotation coupling recess, wherein said at least one return force generating element comprises a tube spring element arranged on the two circumferential sides of said first and second return projections and supported relative to said housing and said first and second return projections.

15. A pressure plate subassembly for arrangement in a friction clutch having an abutment arrangement and at least one clutch disk with friction linings, said pressure plate subassembly comprising:

a housing rotatable about an axis of rotation and connectable to the abutment arrangement of the friction clutch for joint rotation about the axis of rotation;

a pressure plate operatively arranged in said housing so that said pressure plate is rotatable with said housing about the axis of rotation and is axially displaceable relative to said housing, wherein said housing comprises a rotational coupling recess and said pressure plate comprises a first rotational coupling projection extending essentially radially outward and engaging said rotational coupling recess such that said pressure plate is displaceable in the direction of the axis of rotation and has a first circumferential direction movement play relative to said housing;

a force accumulator for generating a pressure force between said pressure plate and said housing, said force accumulator being supported on said housing and on said pressure plate wherein said force accumulator is arranged outside said housing;

an intermediate plate arranged in said housing at an axial distance from said pressure plate, said intermediate plate being axially displaceable relative to said housing and being rotatable together with said housing about the axis of rotation, wherein said intermediate plate comprises a second rotational coupling projection which extends essentially radially outward, said second rotational coupling projection engaging said rotational coupling recess so that said intermediate plate is displaceable in the direction of the axis of rotation and has a first circumferential direction movement play relative to said housing; and a tube spring element arranged on the two circumferential sides of said first and second return projections and supported relative to said housing and said first and second return projections.

16. A pressure plate subassembly of for arrangement in a friction clutch having an abutment arrangement and at least one clutch disk with friction linings, said pressure plate subassembly comprising:

a housing rotatable about an axis of rotation and connectable to the abutment arrangement of the friction clutch for joint rotation about the axis of rotation;

a pressure plate operatively arranged in said housing so that said pressure plate is rotatable with said housing about the axis of rotation and is axially displaceable relative to said housing;

a force accumulator for generating a pressure force between said pressure plate and said housing, said force accumulator being supported on said housing and on said pressure plate wherein said force accumulator is arranged outside said housing;

a lifting force generating arrangement for generating a lifting force for prestressing said pressure plate toward said force accumulator; and an intermediate plate arranged in said housing at an axial distance from said pressure plate said intermediate plate being axially displaceable relative to said housing and being rotatable together with said housing about the axis of rotation, wherein said lifting force generating arrangement is further operatively arranged for generating a lifting force prestressing said pressure plate and said intermediate plate axially away from one another, wherein said lifting force generating arrangement is further operatively arrangeable for generating a force prestressing said intermediate plate toward said pressure plate when said housing is mounted on the abutment arrangement of the friction clutch.

17. The pressure plate subassembly of claim 16, wherein said lifting force generating arrangement comprises a first lifting spring arrangement arranged between said pressure plate and said intermediate plate and a second lifting spring arrangement arranged on a side of said intermediate plate facing away from said pressure plate.

18. A pressure plate subassembly for arrangement in a friction clutch having an abutment arrangement and at least one clutch disk with friction linings, said pressure plate subassembly comprising:

a housing rotatable about an axis of rotation and connectable to the abutment arrangement of the friction clutch for joint rotation about the axis of rotation;

a pressure plate operatively arranged in said housing so that said pressure plate is rotatable with said housing about the axis of rotation and is axially displaceable relative to said housing; and a force accumulator for generating a pressure force between said pressure plate and said housing, said force accumulator being supported on said housing and on said pressure plate wherein said force accumulator is arranged outside said housing wherein said housing comprises a plurality of passage orifices for the passage of fastening elements for connecting the pressure plate subassembly to said abutment arrangement of the friction clutch and wherein said force accumulator comprises a clearance for each passage orifice such that a respective fastening element is insertable through said clearance into said passage orifice when said force accumulator is mounted on said housing.

19. A pressure plate subassembly for arrangement in a friction clutch having an abutment arrangement and at least one clutch disk with friction linings, said pressure plate subassembly comprising:

a housing rotatable about an axis of rotation and connectable to the abutment arrangement of the friction clutch for joint rotation about the axis of rotation;

a pressure plate operatively arranged in said housing so that said pressure plate is rotatable with said housing about the axis of rotation and is axially displaceable relative to said housing;

a force accumulator for generating a pressure force between said pressure plate and said housing, said force accumulator being supported on said housing and on said pressure plate wherein said force accumulator is arranged outside said housing; and a plurality of holding elements for holding said force accumulator onto said housing, wherein said holding elements for holding said force accumulator on said housing are attachable to said housing when said housing is attached to said abutment arrangement.

20. A pressure plate subassembly for arrangement in a friction clutch having an abutment arrangement and at least one clutch disk with friction linings, said pressure plate subassembly comprising:

a housing rotatable about an axis of rotation and connectable to the abutment arrangement of the friction clutch for joint rotation about the axis of rotation;

a pressure plate operatively arranged in said housing so that said pressure plate is rotatable with said housing about the axis of rotation and is axially displaceable relative to said housing; and a force accumulator for generating a pressure force between said pressure plate and said housing, said force accumulator being supported on said housing and on said pressure plate wherein said force accumulator is arranged outside said housing, wherein a radially outward extent of said force accumulator corresponds approximately to a radially outward extent of said housing.

21. A method for assembling a friction clutch having a pressure plate subassembly and an abutment arrangement including a flywheel mass arrangement, wherein the pressure plate subassembly is connected to the abutment arrangement for joint rotation about an axis of rotation, said pressure plate subassembly comprising a housing connectable to the abutment arrangement of the friction clutch for joint rotation about an axis of rotation, a pressure plate operatively arranged in the housing so that the pressure plate is rotatable with said housing about the axis of rotation and is axially displaceable relative to the housing, and a force accumulator for generating a pressure force between the pressure plate and the housing, the force accumulator being supported on the housing and on the pressure plate wherein said force accumulator is arranged outside the housing, said method comprising the steps:

(a) attaching the housing and the pressure plate of the pressure plate subassembly to the abutment arrangement; and (b) attaching the force accumulator to the housing of the pressure plate subassembly after said step (a).

22. The method of claim 21, wherein said step (a) comprises attaching the housing to the abutment arrangement via a plurality of fastening elements.

23. The method of claim 21, wherein said step (b) comprises attaching the force accumulator to an outer side of the housing via a plurality of holding elements.

24. A method for assembling a friction clutch having a pressure plate subassembly and an abutment arrangement including a flywheel mass arrangement, wherein the pressure plate subassembly is connected to the abutment arrangement for joint rotation about an axis of rotation, said pressure plate subassembly comprising a housing connectable to the abutment arrangement of the friction clutch for joint rotation about an axis of rotation, a pressure plate operatively arranged in the housing so that the pressure plate is rotatable with said housing about the axis of rotation and is axially displaceable relative to the housing, and a force accumulator for generating a pressure force between the pressure plate and the housing, the force accumulator being supported on the housing and on the pressure plate wherein said force accumulator is arranged outside the housing, said method comprising the steps:

(a') attaching the force accumulator to an outer side of the housing of the pressure plate subassembly; and (b') attaching the pressure plate subassembly including the housing, the pressure plate, and the force accumulator to the abutment arrangement after said step (a') via a plurality of fastening elements by leading the fastening elements through passage orifices in the housing and clearances in the force accumulator which are assigned to the passage orifices.

* * * * *